F. L. FULLER.
CASH REGISTER.
APPLICATION FILED DEC. 21, 1914.

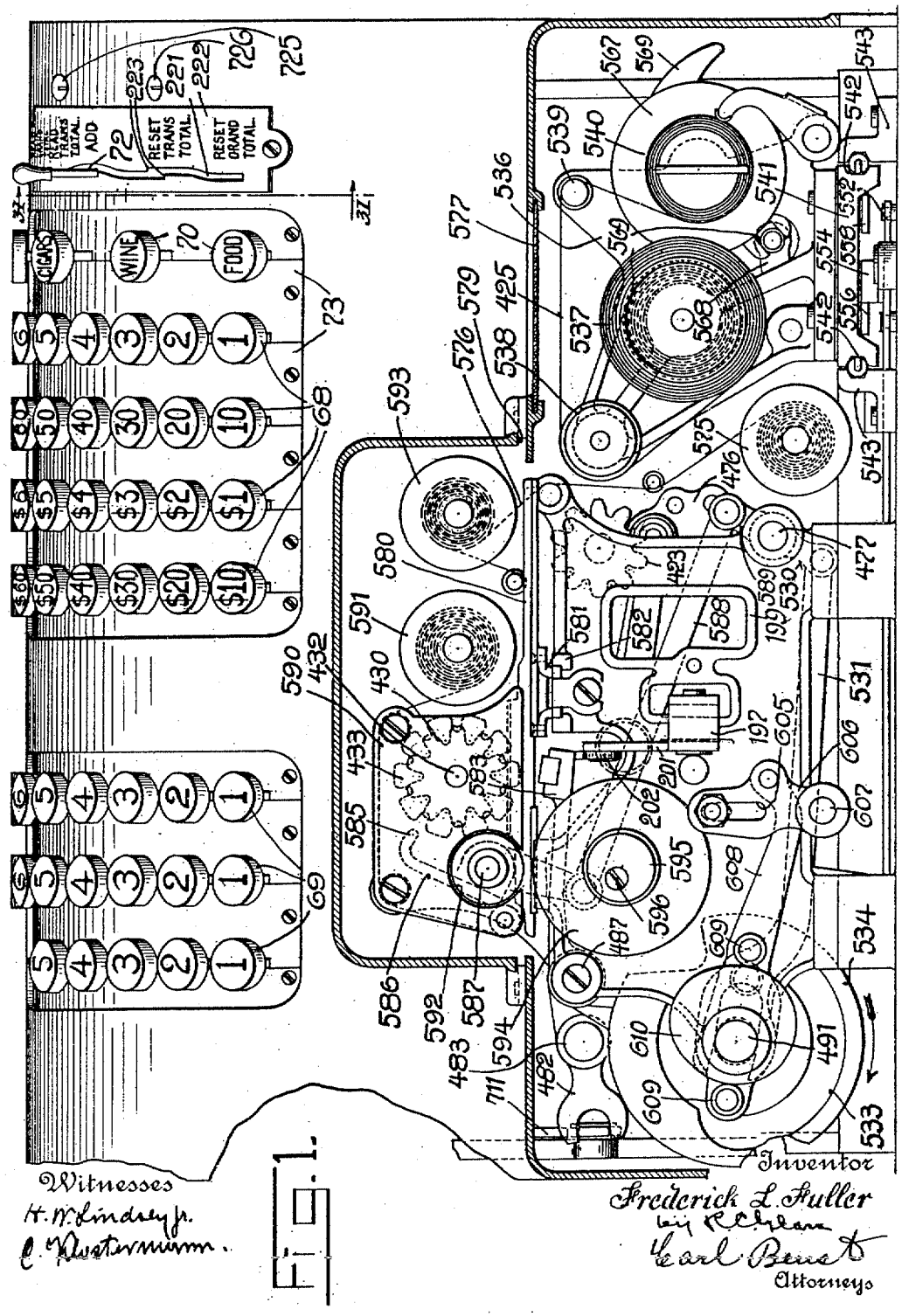

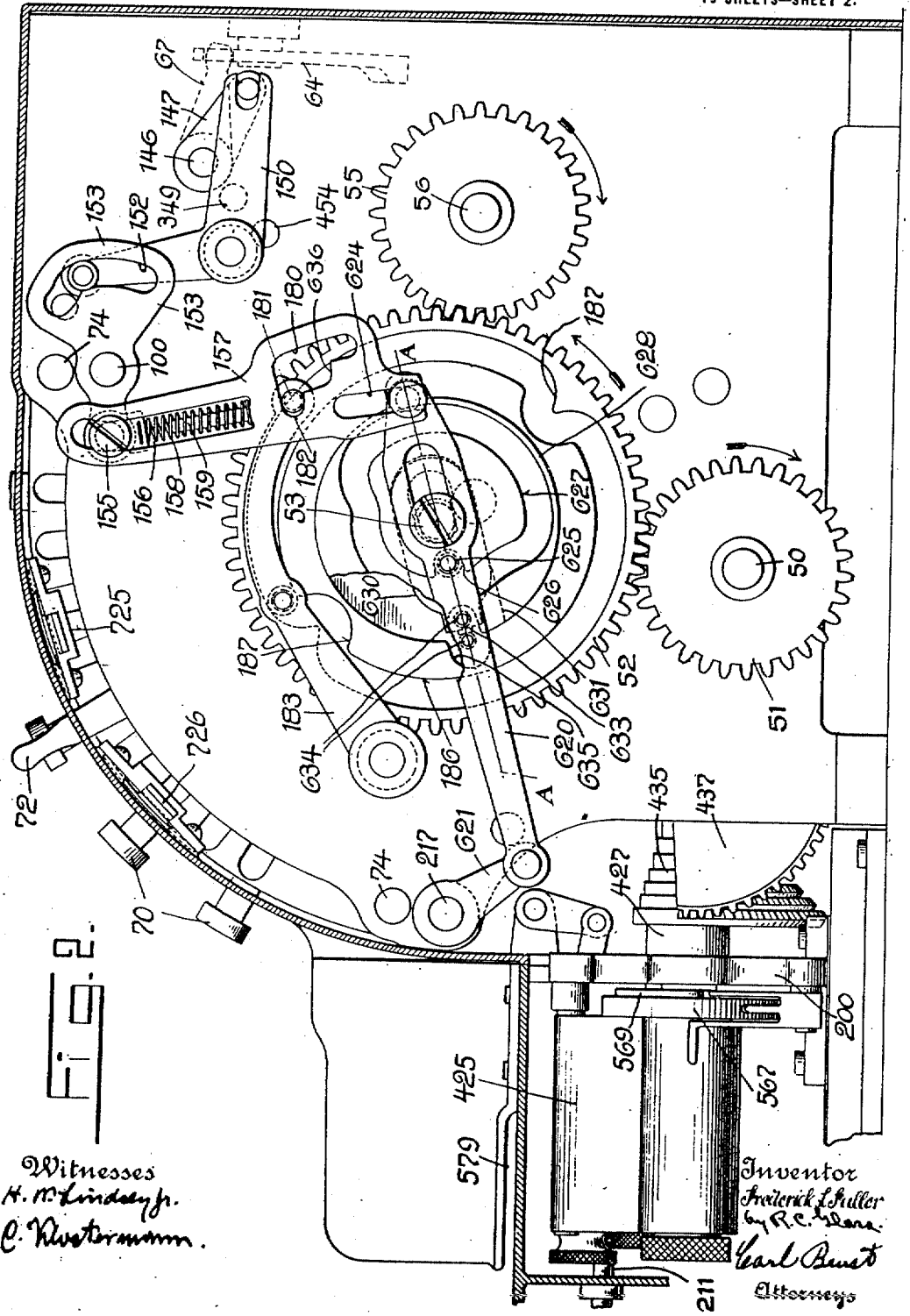

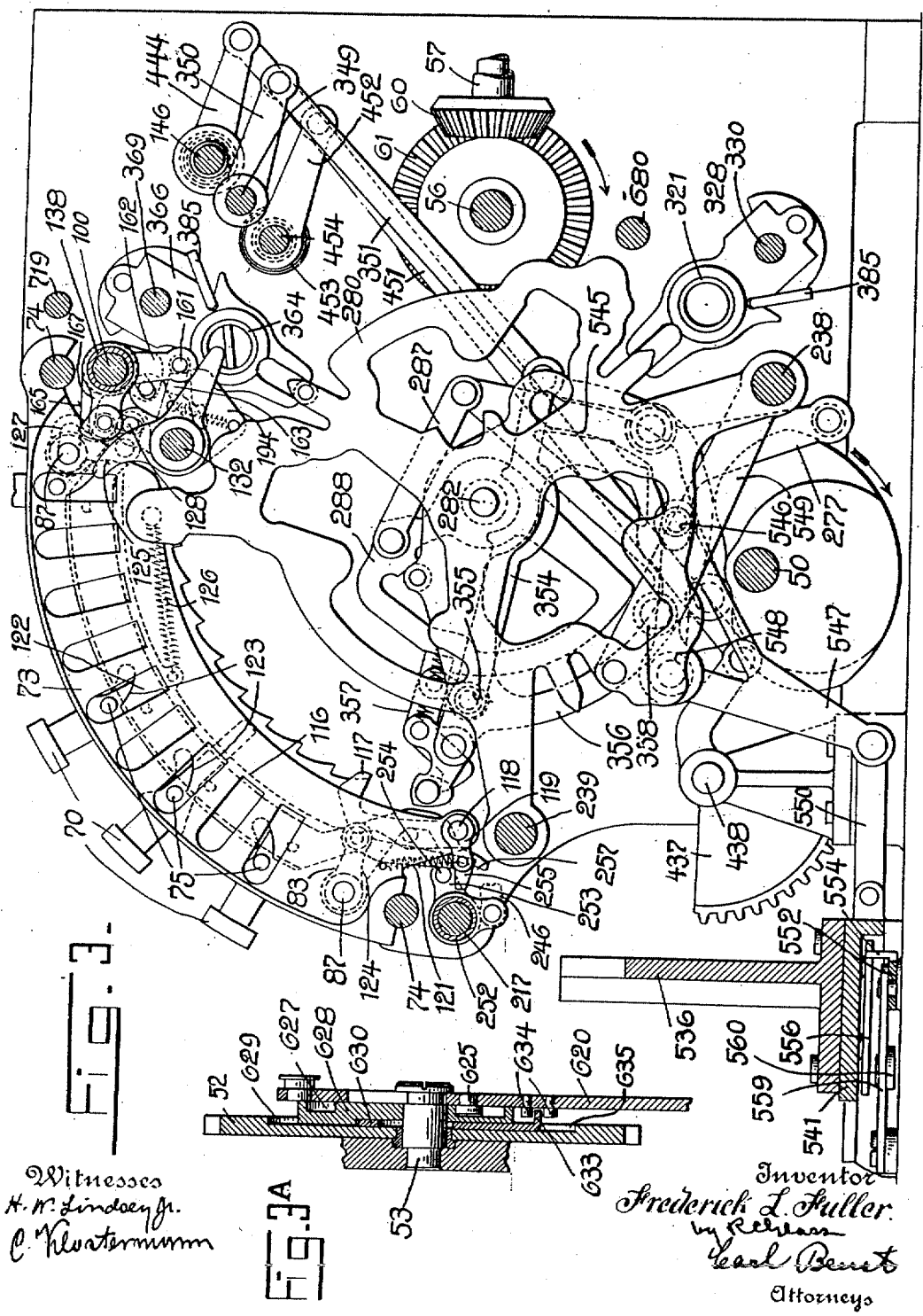

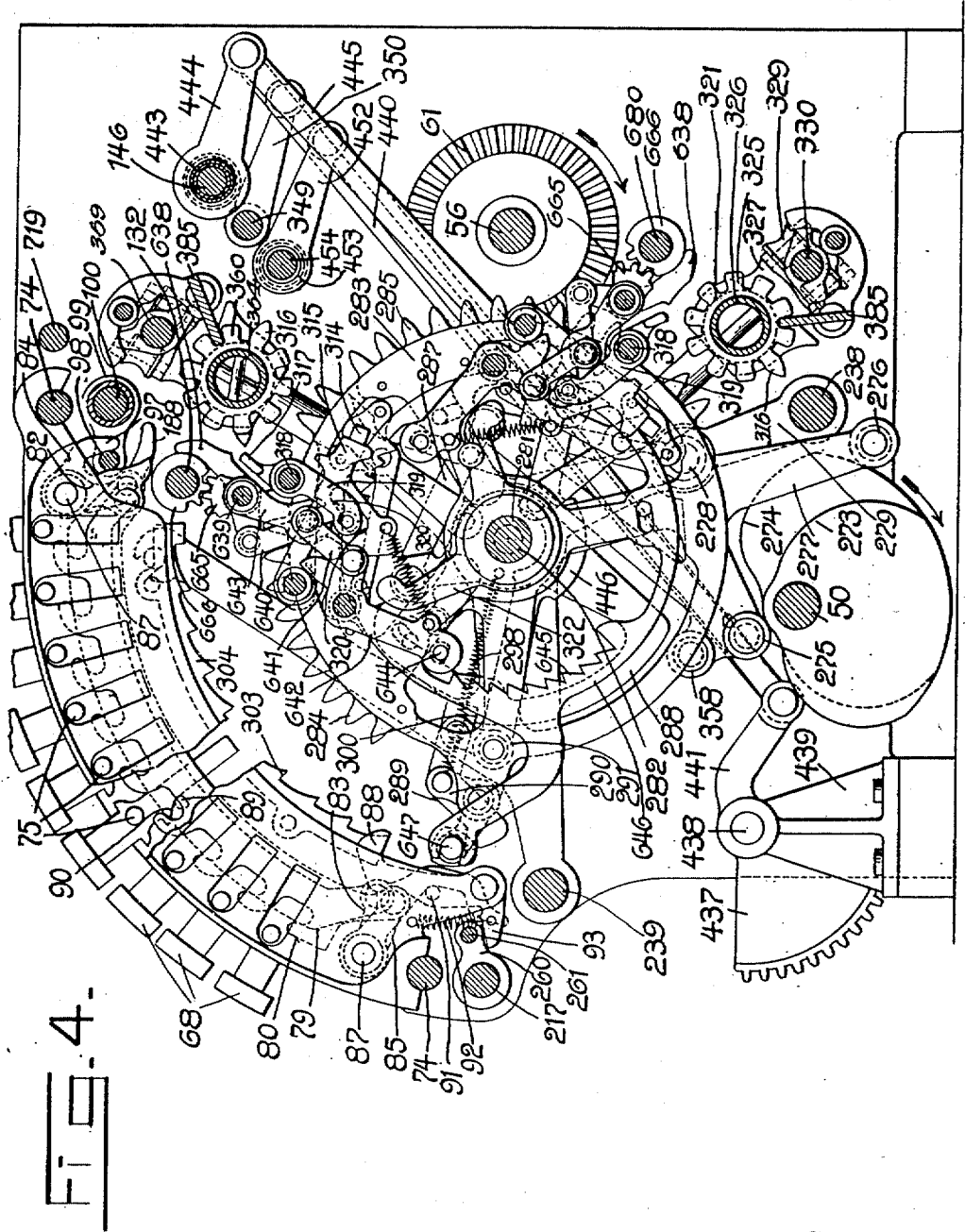

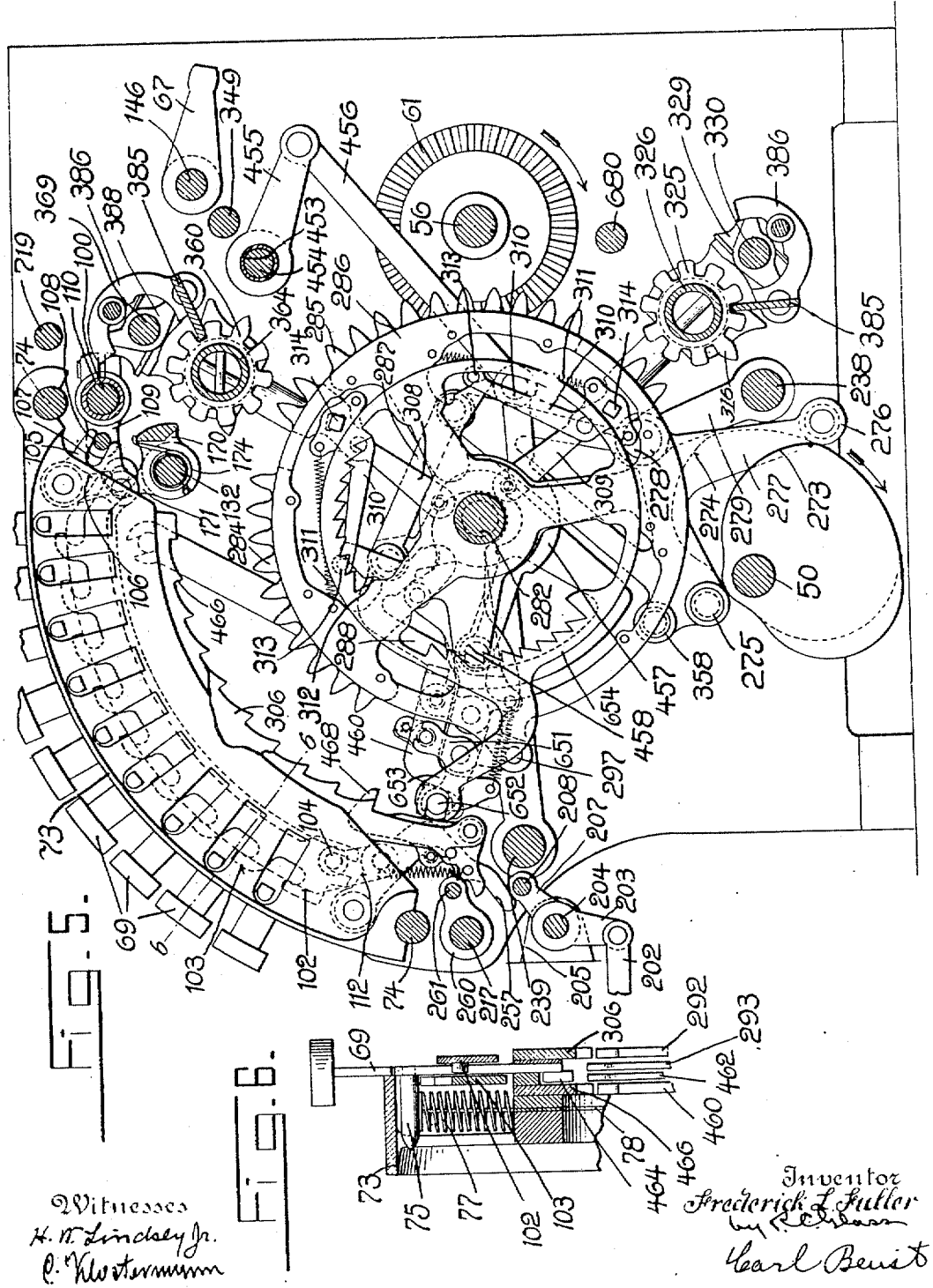

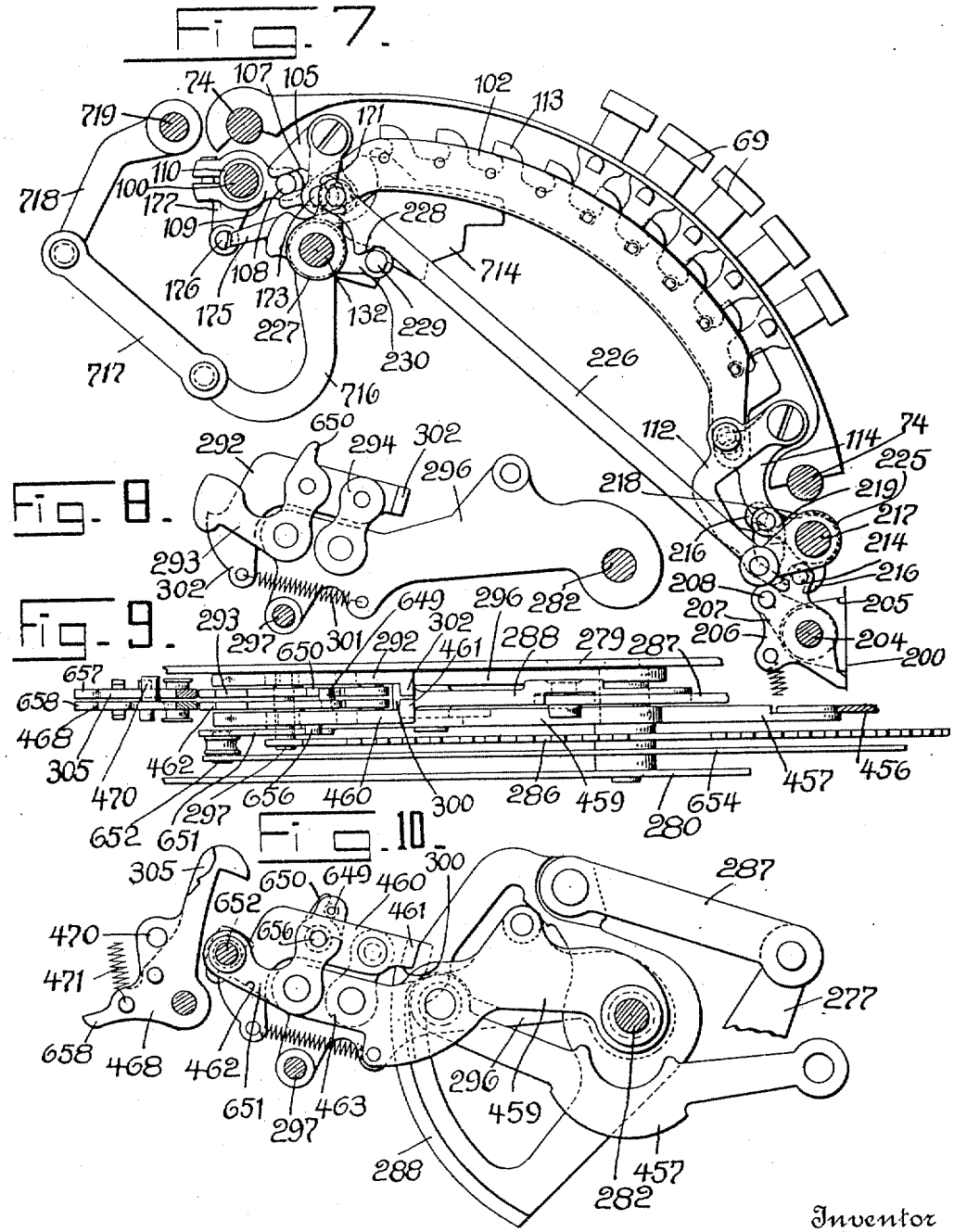

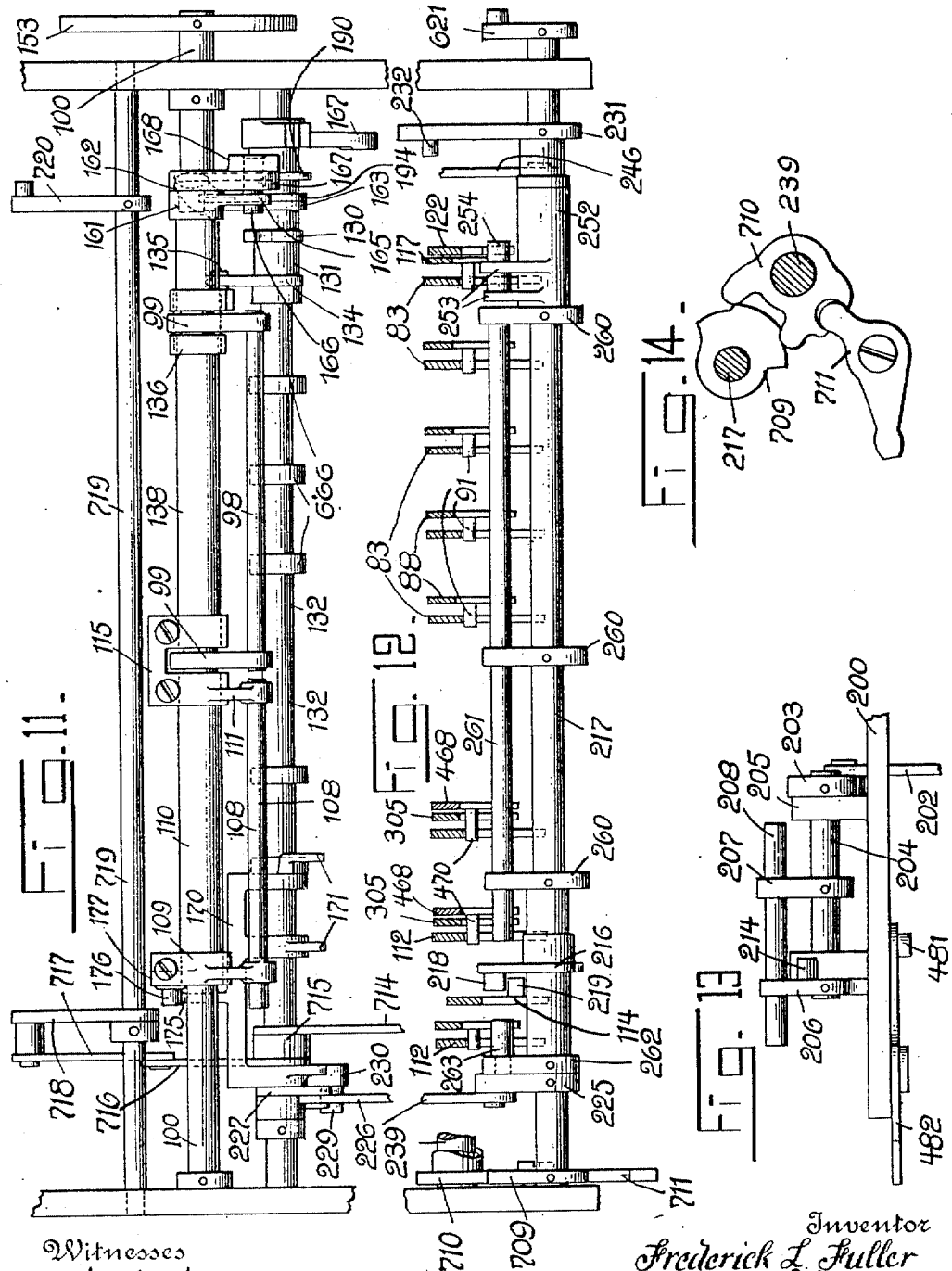

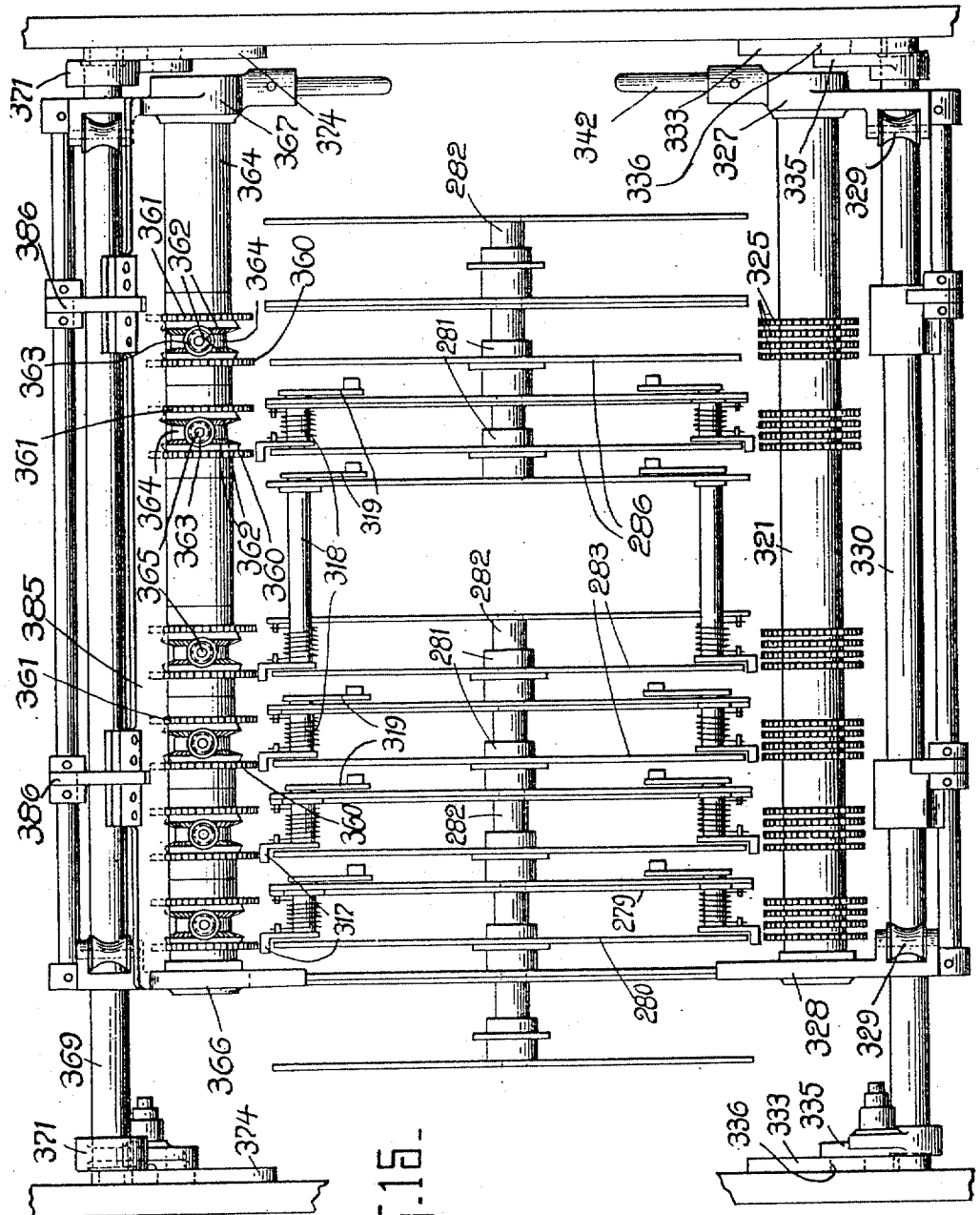

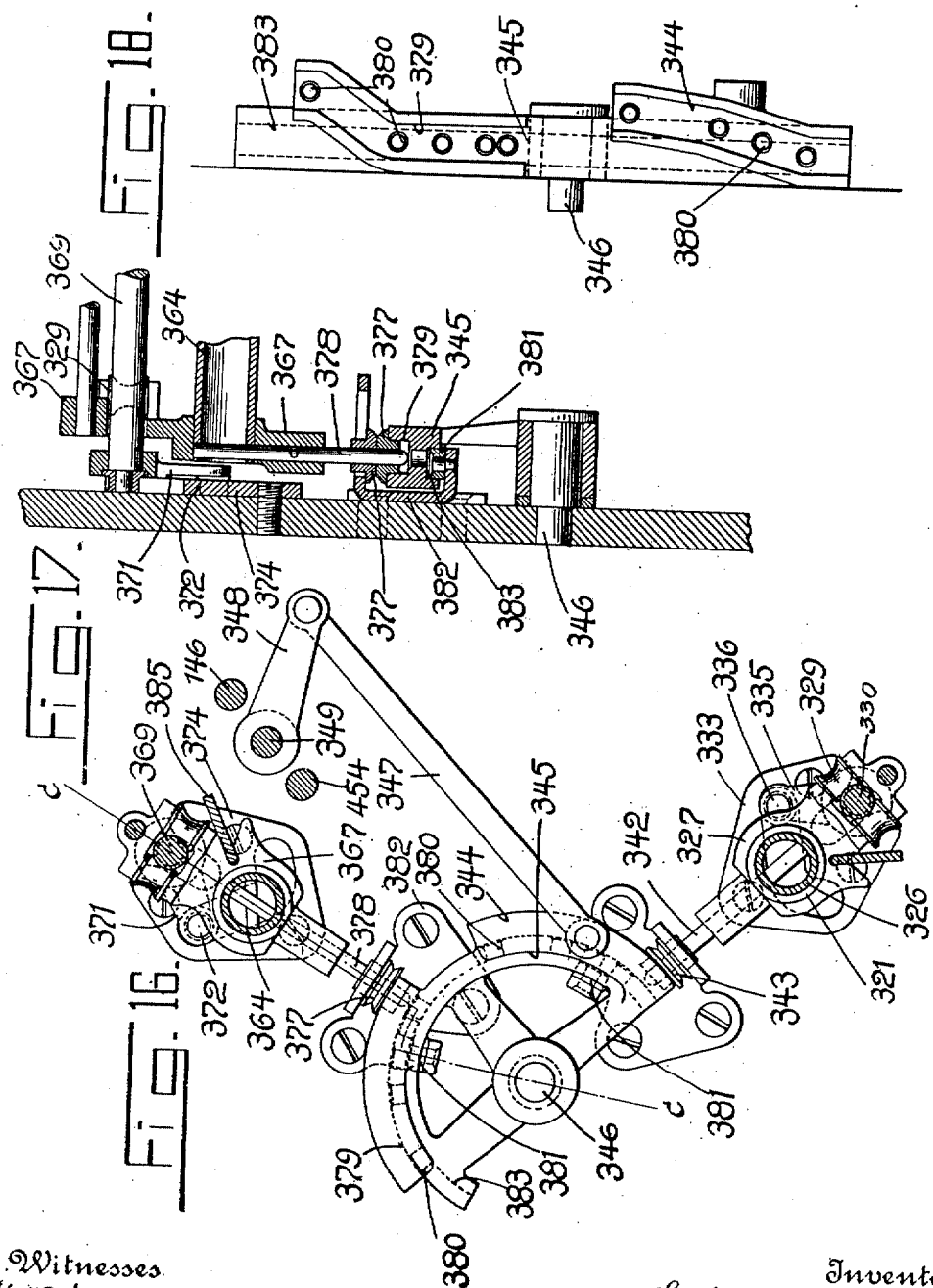

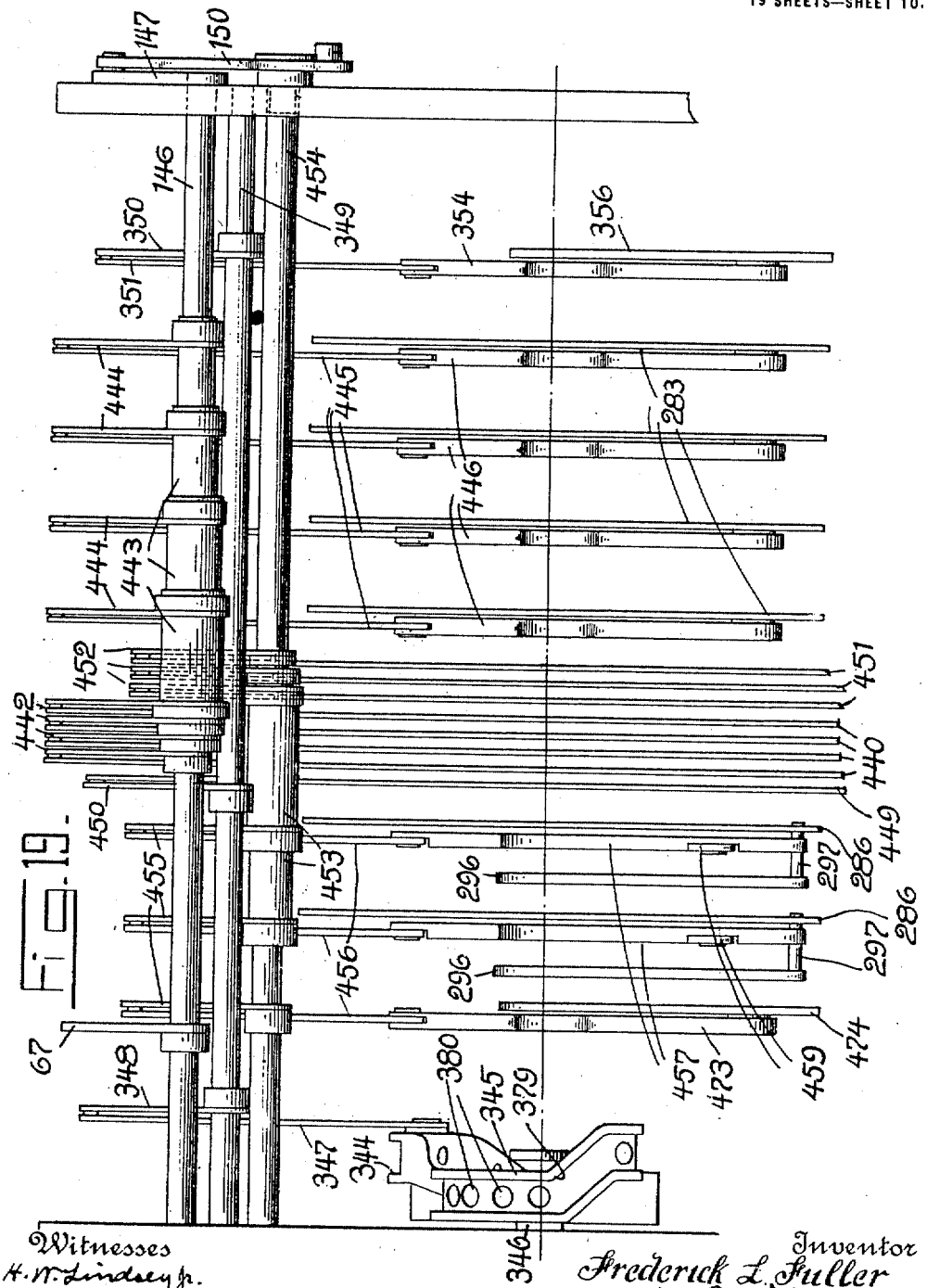

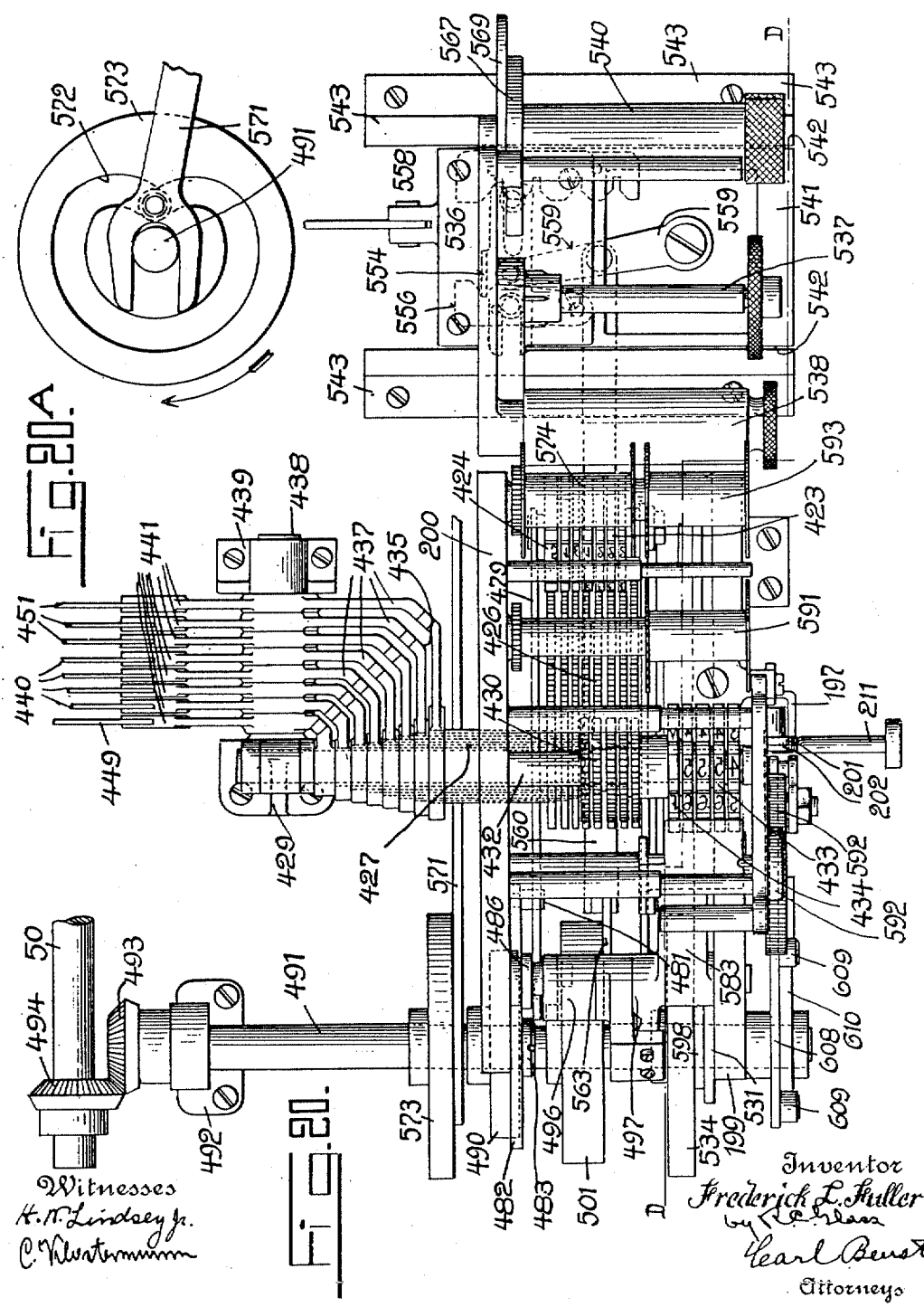

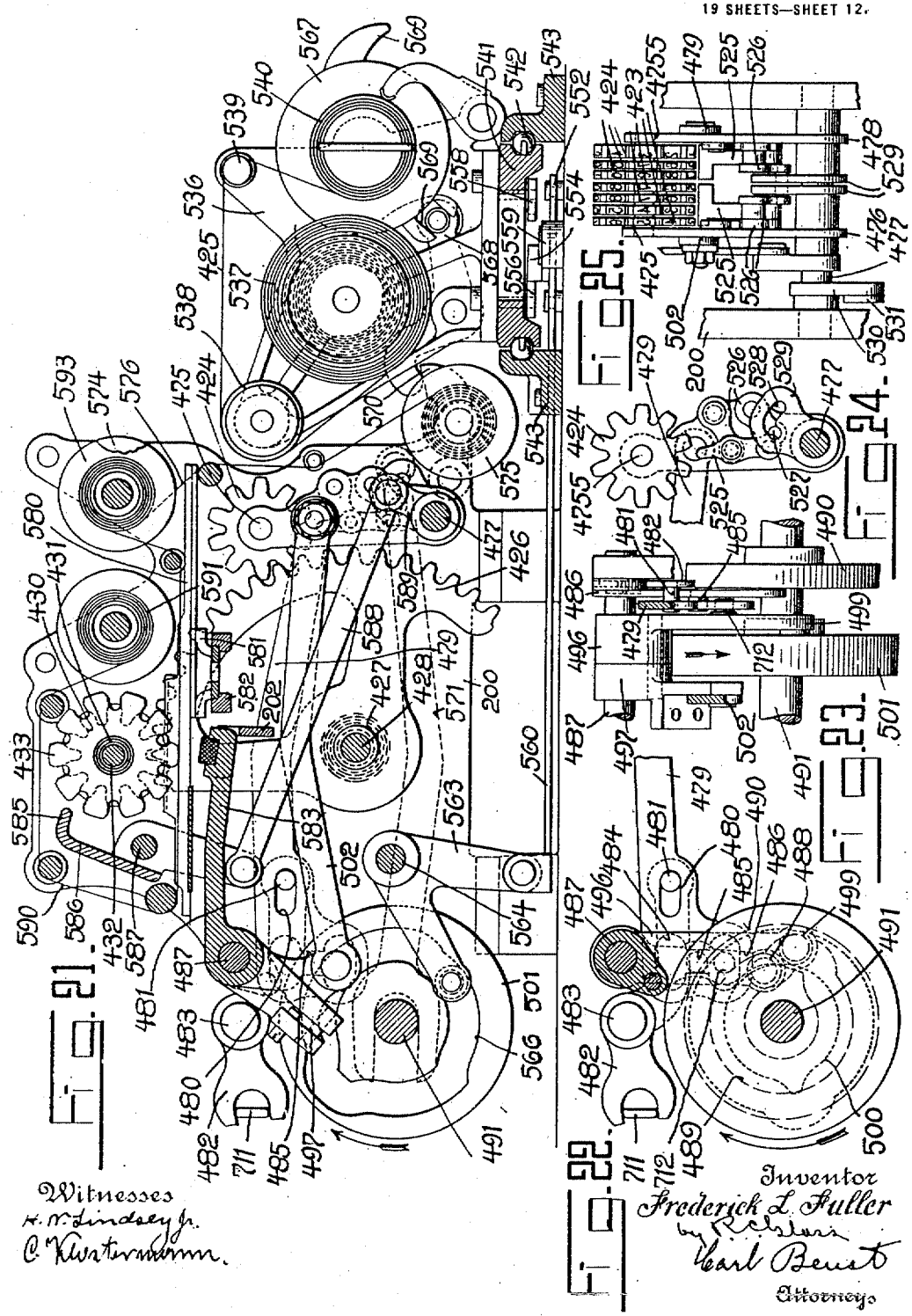

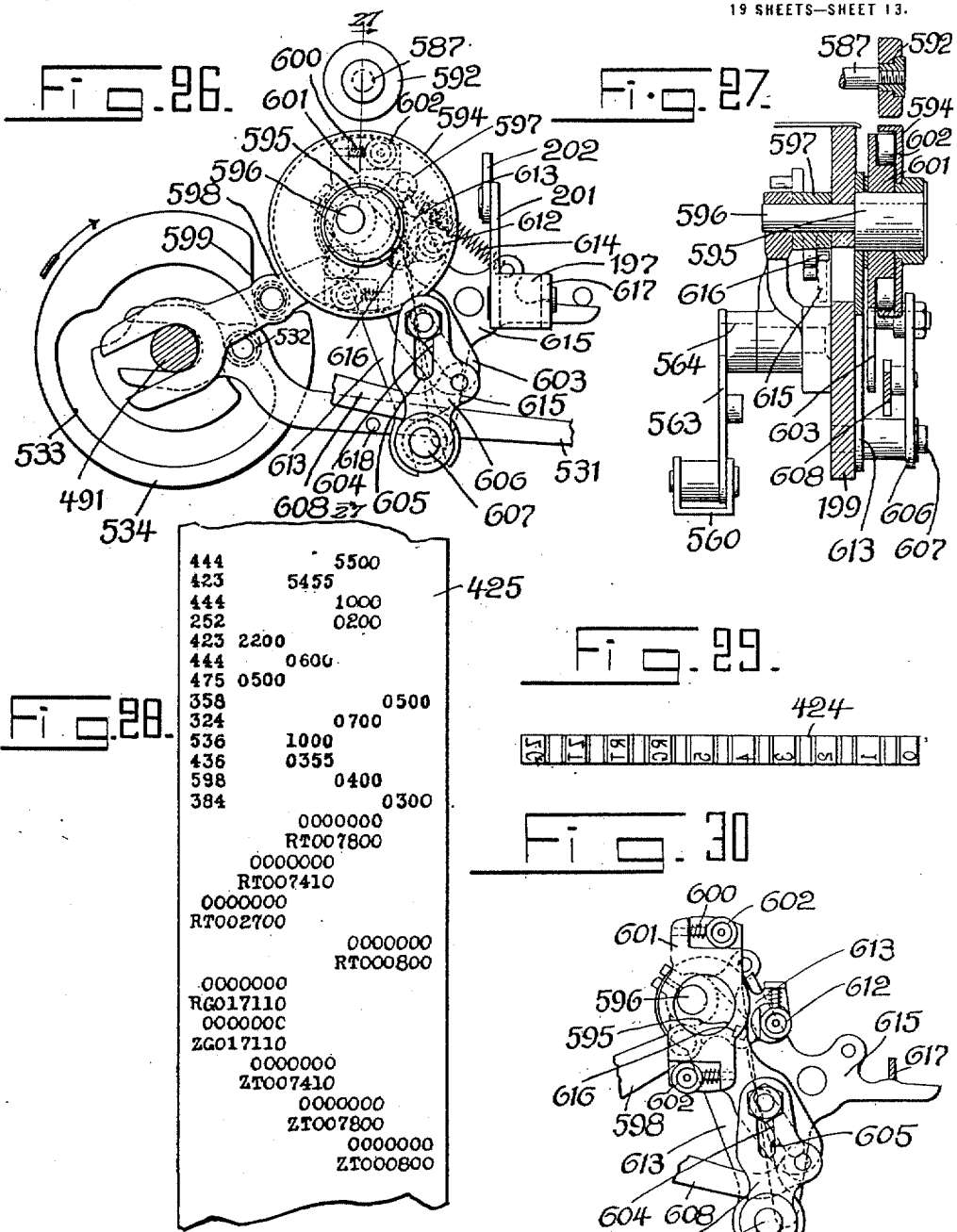

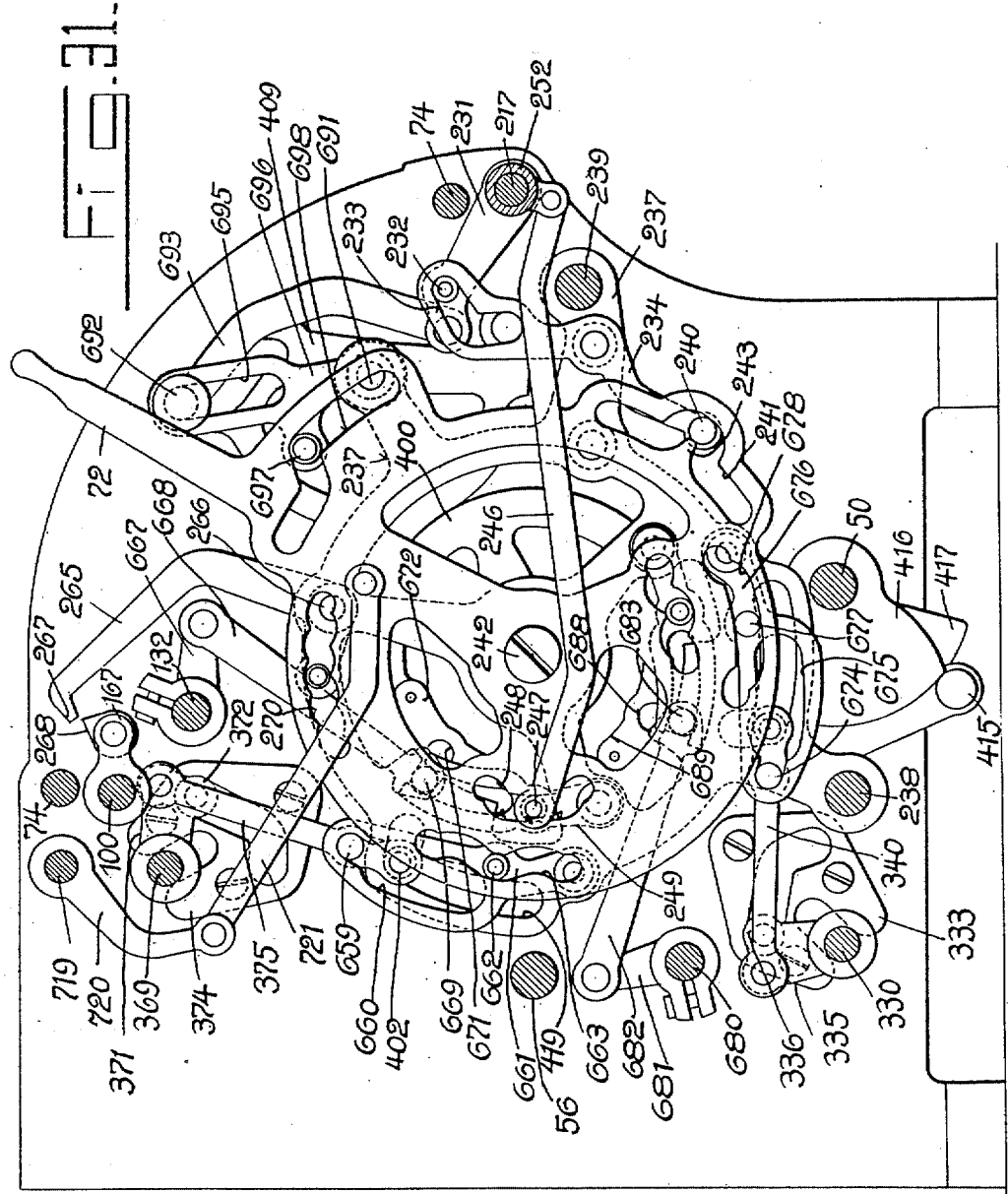

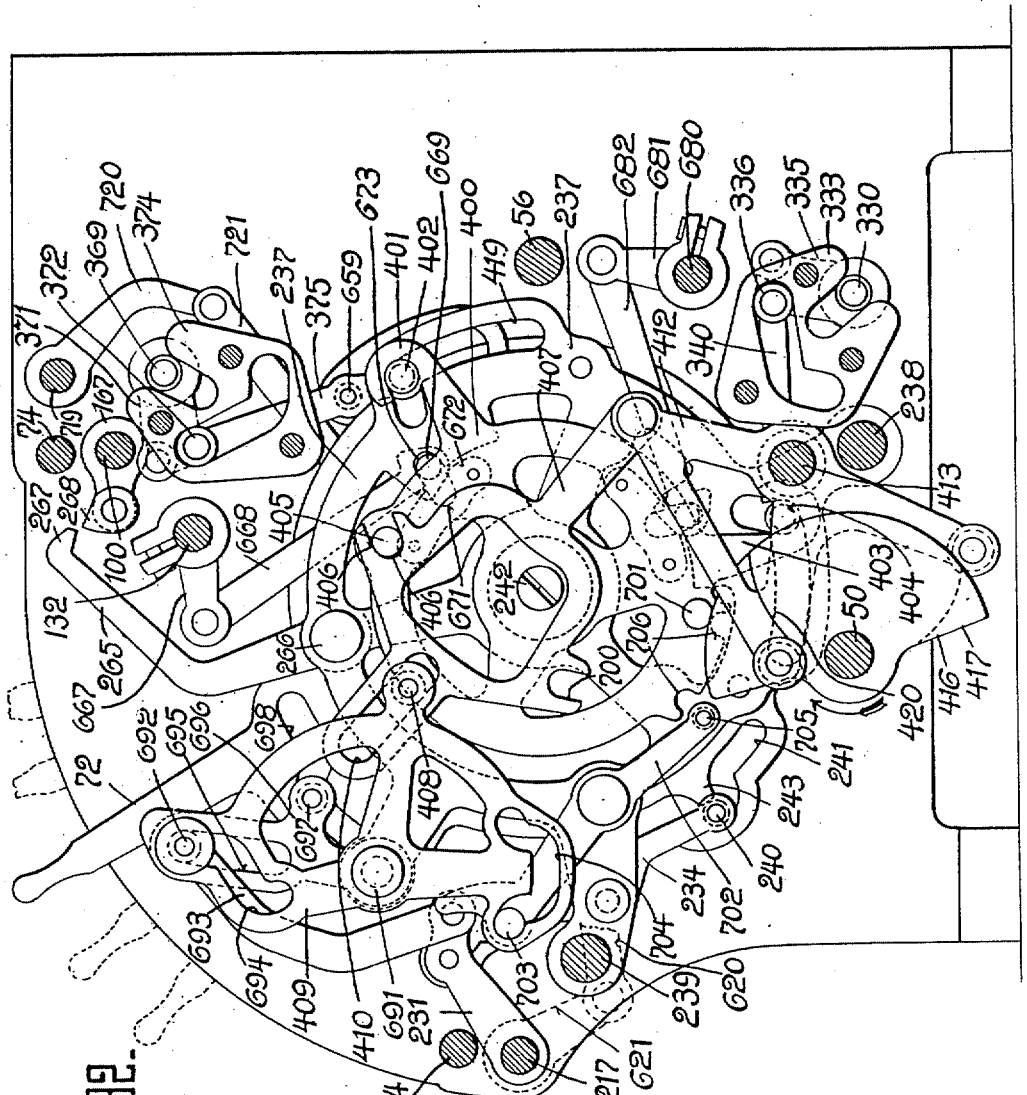

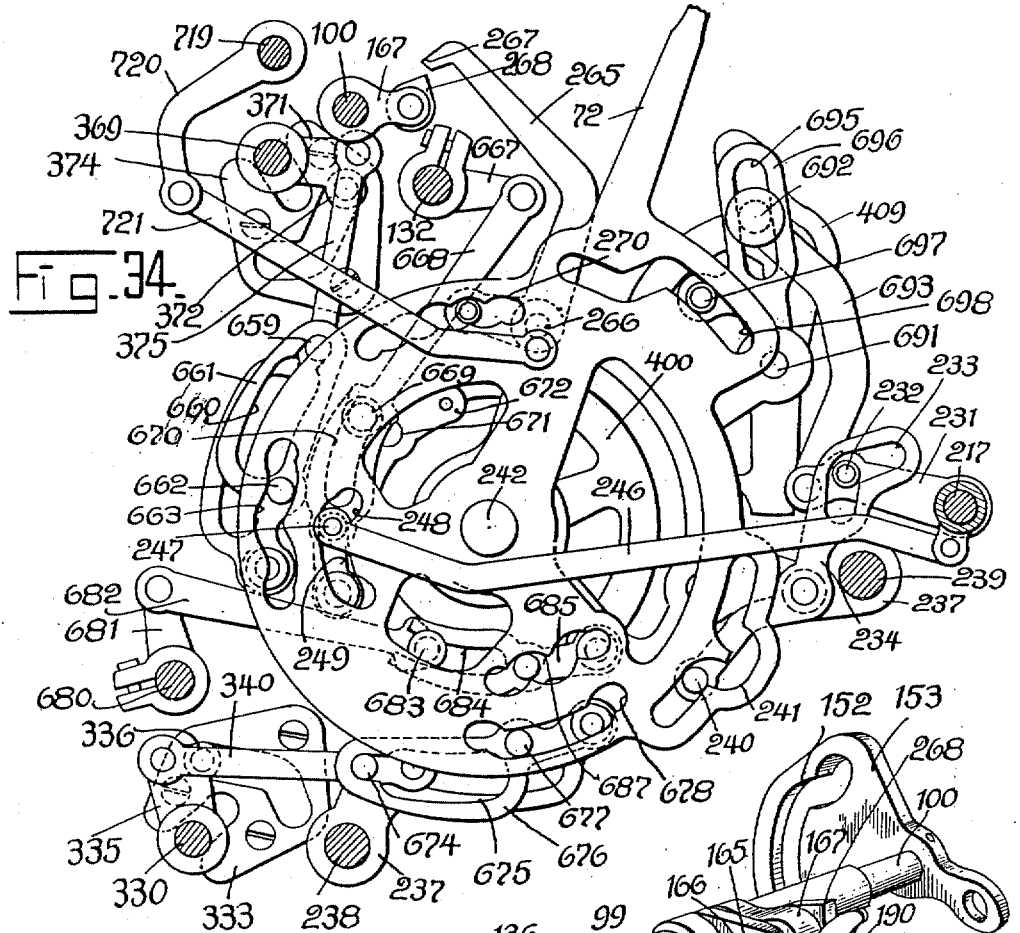

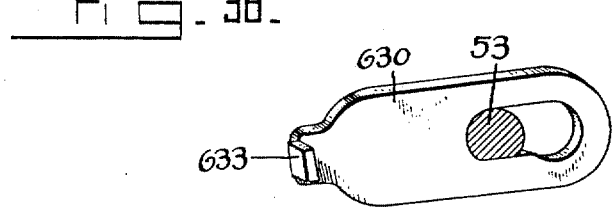

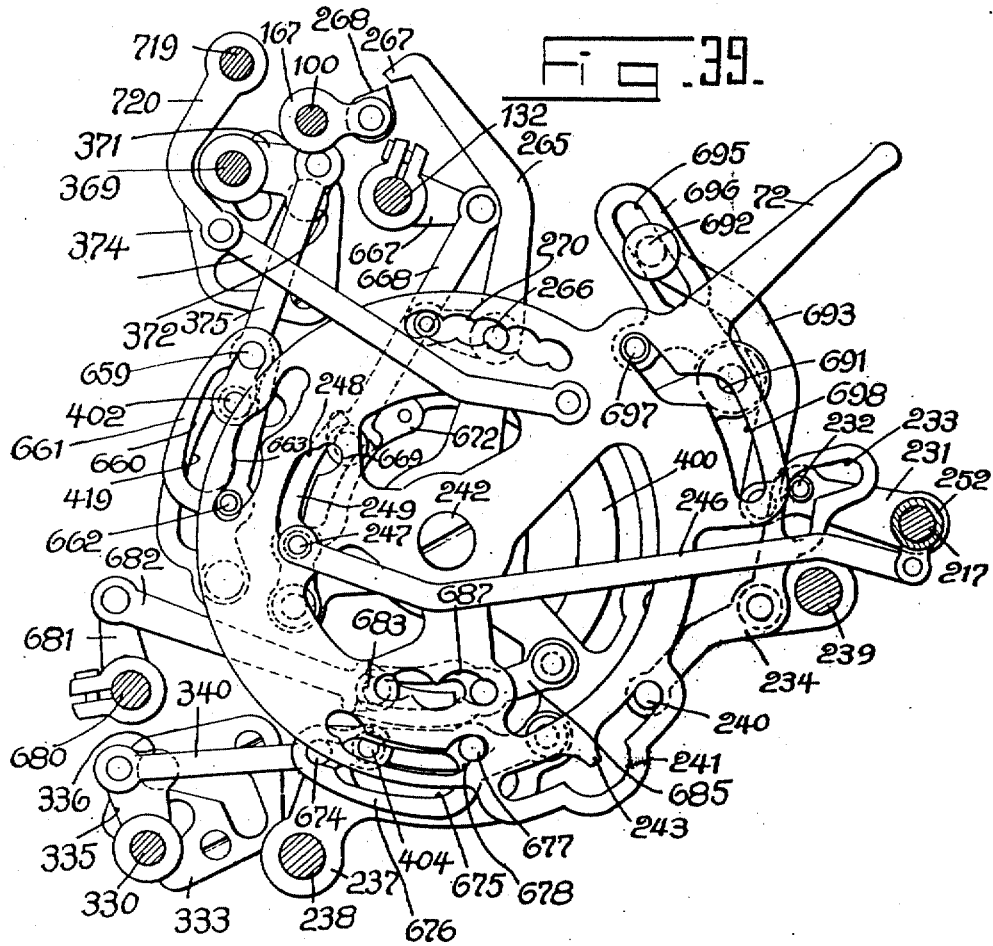

1,242,170.

Patented Oct. 9, 1917.
19 SHEETS—SHEET 19.

Witnesses
H. W. Lindsey Jr.
O. Westermann

Inventor
Frederick L. Fuller
by B. C. Moore
Earl Benst
Attorney

UNITED STATES PATENT OFFICE.

FREDERICK L. FULLER, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,242,170.  Specification of Letters Patent.  Patented Oct. 9, 1917.

Application filed December 21, 1914. Serial No. 878,401.

*To all whom it may concern:*

Be it known that I, FREDERICK L. FULLER, a citizen of the United States, residing at Dayton, in the county of Montgomery and State of Ohio, have invented certain new and useful Improvements in Cash-Registers, of which I declare the following to be a full, clear, and exact description.

This invention relates to improvements in accounting machines and more particularly to that class of machines known as multiple totalizer registers.

The principal object of this invention is to design a machine adapted more particularly for use in hotels, restaurants and the like. The machine embodies a plurality of individual totalizers for segregating the totals of the different classes of provisions sold and a grand totalizer for accumulating the difference between the grand total of these individual totalizers and the total of provisions returned, a separate totalizer being provided to accumulate the value of the provisions returned.

A further object of this invention is to provide an improved mechanism for controlling total and subtotal operations of machines having a plurality of totalizers.

Another object of the invention is to provide novel means for releasing the operating mechanism so as to compel a conjoint operation of a plurality of keys in an adding operation, this means being constructed to release the operating mechanism upon movement of the device, controlling total and subtotal printing operations, to one of its positions, preparing the machine for printing a total or subtotal from the grand totalizer, or by the conjoint operation of a key and the device to one of its positions preparing the machine for printing a total or subtotal from a transaction totalizer.

It is also an object of this invention to construct differential mechanism, to coöperate with other mechanism for positioning type carriers in total and subtotal printing operations under the control of the totalizer elements which are of the highest value and for which no banks of amount keys are provided, the type carriers and differential mechanism being controlled by special keys in adding operations.

The invention also embodies novel means whereby a differential unit and its corresponding type carrier are controlled, in total and subtotal printing operations, by the device controlling the machine for such operations, this differential mechanism and its type carrier being under the control of special keys in adding operations.

To construct the operating means for the type carriers so that an impression from the amount type carriers is taken at a different time than that from the type carriers for printing the waiter's number, for the purpose of columnar printing of the items in adding operations, and to operate them simultaneously to print a total or subtotal in a total or subtotal printing operation, is also an object of this invention.

This invention further presents novel means for feeding record material and means controlling said feeding means and the releasing of special keys.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of the said drawings,—

Figure 1 is a front view of the machine constructed according to the invention, the hood or casing for the printing mechanism being shown in cross section to expose this mechanism to view.

Fig. 2 is a right hand side elevation of the machine showing the cabinet in cross section.

Fig. 3 is a transverse vertical section of the machine, taken at the right side of the bank of transaction keys.

Figure 40:
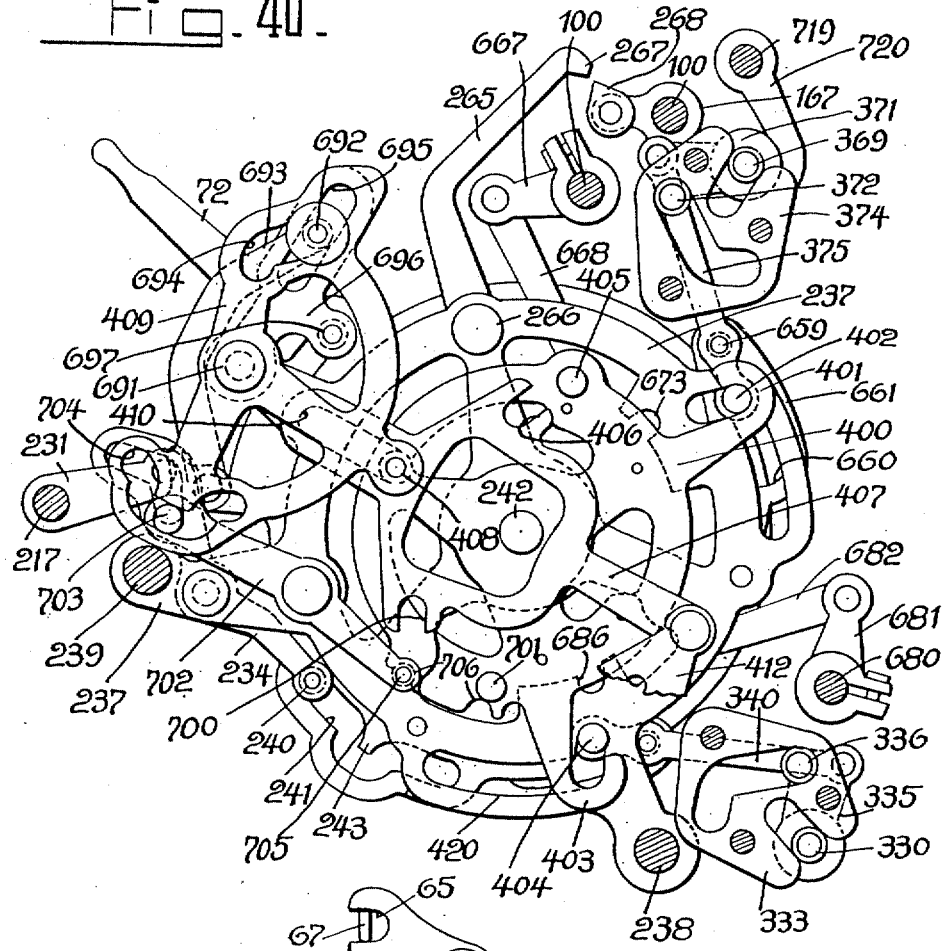

Fig. 3ª is a detail cross section taken on the line A—A of Fig. 2.

Fig. 4 is a transverse vertical section taken at the right side of one of the banks of amount keys.

Fig. 5 is a transverse vertical section taken at the right side of the units bank of waiters' keys.

Fig. 6 is a detail cross section taken through a units or tens bank of waiters' keys, as on the line 6—6 of Fig. 5, the key through which the section is taken being shown in full and portions of the latches adjacent the bank of keys being shown in moved positions opposite the key.

Fig. 7 is a detail left side view of the left hand or hundreds bank of waiters' keys.

Fig. 8 is a detail left side view of the latch mechanism and its carrying arms which are adjacent each of the units and tens banks of waiters' keys but are not controlled thereby.

Fig. 9 is a top plan detail view of the differential mechanism controlled by the units or tens bank of waiters' keys in an adding operation for positioning a type carrier, and the mechanism including the latch and arm shown in Fig. 8 and controlled by one of the totalizer elements of highest order in a total or subtotal printing operation to position the type carrier.

Fig. 10 is a detail side elevation of part of the mechanism shown in Fig. 9.

Fig. 11 is a top plan detail view of part of the mechanism for controlling the releasing of the operating mechanism and for effecting the locking and releasing of the keys.

Fig. 12 is a top plan detail view of the devices mounted on a shaft which is controlled by the device for preparing the machine for total and subtotal printing operations.

Fig. 13 is a top plan detail view of a device operated by a special key to release the waiters' keys.

Fig. 14 is a detail view of a device for controlling the simultaneous operation of the amount type carriers and the waiters' type carriers to print totals and subtotals on a detail strip in total and subtotal printing operations.

Fig. 15 is a rear elevation showing the transaction totalizers and the grand totalizer and part of the transfer mechanism. This view is a diagrammatic or extended one as the totalizers have been shown out of position for the purpose of showing the construction of their supporting frames and their relations to the transfer mechanism more clearly.

Fig. 16 is a detail side view of the totalizer shifting device.

Fig. 17 is a cross section taken on the line C—C of Fig. 16.

Fig. 18 is a view of the totalizer shifting cam member, the figure being developed and projecting so that the shifting cam grooves appear to be on the same plane.

Fig. 19 is a top plan view of part of the connections between the differential mechanism for the various banks of keys and their corresponding type carriers.

Fig. 20 is a detail top plan view of the printing mechanism, the detail strip and inking ribbons being removed for the sake of clearness.

Fig. 20ª is a detail view of the cam and pitman for operating the detail strip feeding mechanism.

Fig. 21 is a vertical cross section through the printing mechanism the view being taken on the line D—D of Fig. 20.

Fig. 22 is a detail view of the mechanism for operating the type carriers to make impressions on the detail strip.

Fig. 23 is a right end detail view of the mechanism shown in Fig. 22.

Fig. 24 is a detail view showing the frame for carrying the waiters' type carriers and the alining device for these carriers.

Fig. 25 is a right end view of all the type carriers for printing on the detail strip, the supporting frames and alining devices for these carriers also being shown.

Fig. 26 is a detail view of the device for feeding the waiters' slips.

Fig. 27 is a cross section taken on the line 27—27 of Fig. 26.

Fig. 28 is a view showing a portion of the detail strip printed by the machine.

Fig. 29 is a view of the type carrier controlled by the units or tens bank of waiters' keys in adding operations and also by the device controlling the machine in total and subtotal printing operations, the figure being developed and projected so that the type on the type carrier appear to be on the same plane.

Fig. 30 is a detail view of part of the feeding mechanism shown in Fig. 26, the lower feeding disk being removed to show its frictional driving device more clearly.

Fig. 31 is a transverse vertical section of the machine taken on the line 31—31 of Fig. 1, and showing the mechanism for controlling the machine in total and subtotal printing operations.

Fig. 32 is a transverse vertical section of the machine showing the mechanism shown in Fig. 29, and viewed from the opposite direction.

Fig. 33 is a view showing an illustrative form of waiters' slip printed by the machine.

Fig. 34 is a transverse vertical section similar to Fig. 31 and shows the mechanism in position for controlling the machine for printing a subtotal from one of the transaction totalizers.

Fig. 35 is a perspective view of part of the mechanism shown in Fig. 12 for controlling the releasing of the operating mechanism.

Fig. 36 is a detail view of the device for preventing two continuous adding and total and subtotal printing operations of the machine.

Fig. 37 is a transverse vertical section of the mechanism shown in Fig. 34, the mechanism being in the same position as in Fig. 34 but viewed from the opposite direction.

Fig. 38 is a detail view of the plate for coupling together a cam disk and a gear shown in Fig. 2.

Figs. 39 and 40 are transverse vertical sections similar to Figs. 34 and 37 respectively but showing the mechanism in position to control the machine for printing a total from the grand totalizer.

Figure 41:
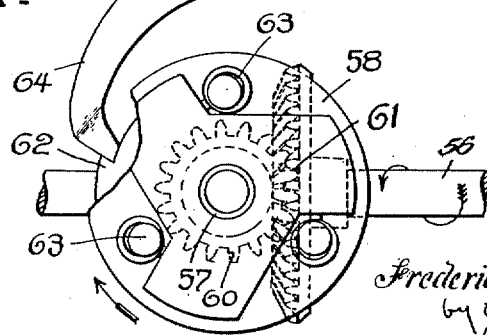

Fig. 41 is a detail view showing part of the motor clutch mechanism and the locking arm therefor.

Described in general terms the machine comprises a plurality of transaction totalizers mounted in a frame which is movable to bring any one of the totalizers into coöperative relation with differentially movable actuating members which in turn are controlled by banks of amount manipulative devices, such as keys. The movement of the frame carrying the transaction totalizers is controlled by transaction keys to select the desired totalizer for operation. In the illustrative form of embodiment disclosed herein, three of these transaction totalizers have been allotted to the different classes of provision sold such as "food," "wine" and "cigars" and one of them, called the "void" totalizer herein is allotted to accumulate the value of the provisions returned. A grand totalizer is provided with adding and subtracting elements. The adding elements are movable into engagement with the differentially movable actuating members, which, as previously stated are controlled by amount keys, each time one of the totalizers allotted to a class of provisions is moved into engagement with these members. The subtracting elements are moved into engagement with these members each time the "void" totalizer is operated. From this, it can be seen that the grand totalizer always has standing thereon the difference between the total accumulation of all the transaction totalizers allotted to the different classes of provisions and the accumulation of the "void" totalizer. Type carriers for printing the items entered on the totalizers are connected to the differentially movable actuating members controlled by the amount keys so that each transaction entered upon the totalizers will be recorded on a detail strip and a waiter's slip.

Three banks of keys for controlling the positioning of type carriers employed to print the waiters' numbers beside the printed items on the detail strip, and called waiters' key herein, are also provided. The differential mechanisms controlled by two of these banks of waiters' keys are operated in total and sub-total printing operations together with differentially movable members, which are similar to those controlled by the amount keys, under the control of the two totalizer elements of highest denominations so that the amounts on these elements will be transferred to the two type carriers controlled by these two banks of waiters' keys in adding operations. In this manner the amounts on the totalizer elements which are of highest denominations and only operated by the transfer mechanism on adding operations, together with the amounts on the other elements of the totalizer are set up on the amount type carriers and two of the waiters' type carriers so that the total amount accumulated will be printed thereby in total or subtotal printing operations.

The third bank of waiters' keys controls differential mechanism for positioning a type carrier in adding operations, and in total and subtotal printing operations this type carrier is controlled by a manipulative device controlling total and subtotal printing operations of the machine, so that characters will be printed in total and subtotal printing operations to indicate whether the printed amount is a total or a subtotal and whether it was taken from a transaction totalizer or the grand totalizer. It will be seen that the positions on this type carrier which are controlled by the keys do not coincide with the position controlled by the manipulative device controlling total and subtotal printing operations of the machine; in one case numbers and in the other case symbols being printed.

The manipulative device or lever forming part of the mechanism for controlling the machine in its total and subtotal printing operations and called the total lever herein, is constructed to be adjusted to five different positions. This total lever, when in its central position, controls the machine so that items may be entered on the main totalizer and the desired transaction totalizer. When the lever is in its lowest or uppermost position it controls the printing of a total or subtotal respectively from the grand totalizer. When the lever is in its position one step above or one step below its central position, the machine is in condition to print a total or subtotal respectively from the desired one of the transaction totalizers.

Novel interlocking mechanism between the various banks of keys and the total lever is provided. This mechanism is so constructed as to compel the operation of a waiter's key for an adding operation or the adjustment of the total lever to one of its positions either one step above or below its central position in which a total or subtotal respectively is to be printed from a transaction totalizer before a transaction key can be operated. This mechanism is also constructed to prevent the operation of the total lever from its central position after a waiter's or an amount key has been depressed and to lock the waiters' keys and the amount keys against operation after the total lever has been moved out of such position. The transaction keys, as well as the amount and waiters' keys, are locked against manipulation when the total lever is moved to either one of its two extreme positions. The releasing means for the operating mechanism is operated to release the machine by the operation of a waiter's key and a transaction key for an adding operation. The machine is released to print a total or subtotal, from a transaction totalizer, by the conjoint adjustment of the total lever to its position one step above or below its central position, and the subsequent operation of a transaction key and when a total or subtotal is to be printed from the grand totalizer, the machine is released by movement alone of the total lever to one of its extreme positions.

For the purpose of illustration, this invention has been shown applied to a type of machine the general principle of which is disclosed in a copending application for Letters Patent of the United States, filed by W. A. Chryst, on June 7, 1913, and Serial No. 772,276. While the invention is shown applied to this particular type of machine, it is to be understood that the invention is susceptible of use with other types of accounting machines, and therefore it is not intended to limit the scope of the invention to use with the particular type of machine shown.

*Operating mechanism.*

To impart power to the various mechanisms of the machine, the main driving shaft 50 (Fig. 2) is provided with a gear 51 which meshes with a gear 52, loosely mounted on a stud 53 projecting from the right hand side frame of the machine. This latter gear 52, which is twice as large as the gear 51, meshes with a gear 55 which is similar to the gear 51, and rigid on the shaft 56. The machine, for illustrative purposes is shown equipped with an electric driving device such as shown in Letters Patent of the United States, No. 1,144,418, issued June 29, 1915, to Charles F. Kettering and Wm. A. Chryst and for a detailed description of the driving device reference may be had to said patent. Only part of the clutch mechanism for this electric driving device is shown in the drawings of the present application. A sleeve 57 (Fig. 41) is connected to the armature shaft through a suitable clutch and gearing. This gearing is not shown in the drawings and only part of the clutch, which includes the clutch member 58 is shown. The sleeve 57 is provided with a bevel gear 60 which meshes with another bevel gear 61 rigidly secured to the shaft 56. The clutch member 58 is provided with rollers 63 and is connected thereby to the other member of the clutch as fully shown and described in the aforesaid Kettering and Chryst application. A locking disk 62 is provided with a locking shoulder which is engaged by the lower end of a locking lever 64 pivoted to the back of the frame of the machine. The lever 64 has a notch 65 into which the end of an arm 67 (Fig. 2) projects. When the arm 67 is rocked in a counter clockwise direction to release the machine, as will be described later, the locking pawl is raised out of engagement with the shoulder on the disk 62, whereupon this disk and other parts (not shown) are moved by spring action to effect a connection of the motor clutch and the closing of a circuit through the motor. The motor, through the bevel gears 60 and 61, shaft 56 and gears 55, 52 and 51, gives the main driving shaft 50 one rotation upon each adding operation of the machine. The locking lever 64, as will be described later, is restored to its normal locking position so as to disconnect the motor clutch at the end of a complete rotation of the shaft 50 in adding operations.

While in the illustrative form of embodiment disclosed herein an electric motor is used to operate the machine, it is evident that other forms of operating mechanism, such as a crank handle, can be employed and, therefore, it is not intended to limit the invention to an electrically driven machine.

*Key board.*

The key board comprises four banks of amount keys 68 (Fig. 1), three banks of waiters' keys 69, one bank of transaction keys 70 and a total lever 72, the total lever being employed to control the machine for total and subtotal printing operations. The construction of the key banks is very similar to that shown and described in the aforesaid Chryst application and, therefore, they will be described but briefly here. The keys of each bank are mounted in an individual frame 73 (Figs. 3 to 7 inclusive) mounted on cross rods 74. Each key is provided with a pin 75 which extends across the upper end of a spring 77 (shown only in Fig. 6) coiled about a recessed plate 78 adjacent the key and carried in the frame 73, these springs being employed to retain normally the keys in undepressed position.

The amount keys 68 (Fig. 4) coöperate with key detents 79 and locking plates 80. The detents 79 are supported at their upper and lower ends respectively by arms 82 and 83, and the plates 80 are supported at their upper and lower ends respectively by arms 84 and 85, the arms 82, 83, 84 and 85 being pivoted by pins 87 on the key frames 73. Each detent 79 temporarily retains the keys in its bank in depressed position and operates a zero stop pawl 88 for the differential mechanism and for this purpose is provided with a plurality of pins 89, which coöperate with shoulders 90 on the keys. When a key is depressed the inclined edge of the shoulder 90 engages the pin 89, thus moving the detent downwardly. Extending across the rear edge of the arm 83, for each bank of amount keys, is a pin 91 on the zero stop pawl 88 pivoted to the key frame and a spring 92 normally holds the pawl in the position shown in Fig. 4 and through the pin 91 retains the detent in its normal upper position. When a key is depressed downward movement of the detent 79 occurs until the shoulder 90 on the key has passed the pin 89 when the detent rises slightly under the action of the spring 92, retaining the key in depressed position.

The locking plates 80 for the banks of amount keys are provided with curved extensions which pass over the pins 75 on the depressed keys and under the pins 75 on the undepressed keys thereby preventing manipulation of the keys during an operation of the machine. In order to give the locking plates 80 the required upward movement the supporting arms 84 are provided with extensions 97, extending over a rod 98, which is carried by arms 99 (Figs. 4 and 11) and fast on a shaft 100. This shaft 100 is rocked clockwise, as viewed in Fig. 4, upon depression of a transaction key, as will be presently described, and as the rod 98 is carried with it, the rod will lift the locking plates 80 into locking position.

Key detents 102 and locking plates 103 for the units and tens banks of waiters' keys (Fig. 5) are like the detents 79 and locking plates 80 for the amount keys except that the lower ends of the locking plates 103 are slidably mounted on studs 104, and at their upper ends are supported by arms 105. The upper end of the detents 102 are supported by arms 106 and their lower ends by arms 112 which are like arms 83 for the detents for the banks of amount keys. The arms 105 are provided with recesses 107 passing over a rod 108 (Figs. 5, 7 and 11) supported at its ends by an arm 109 and an arm 111 of a yoke 115. The arm 109 is fast on the left hand end and the arm 111 is fast on the right hand end of a sleeve 110, surrounding the shaft 100. The detent 102 (Fig. 7) for the hundreds bank of waiters' keys is like the corresponding detents for the other banks of waiters' keys and a locking plate 113 which is provided for this hundreds bank of keys is supported at its upper end by an arm 105 which is like the arms 105 for the plates 103, and at its lower end is supported by an arm 114. The sleeve 110 is also rocked clockwise, as viewed in Fig. 5, upon depression of a transaction key, as will be described presently, and through engagement of the rod 108 in the recesses 107 formed in the arms 105, the locking plates 103 and 113 are raised to lock the waiters' keys against manipulation during an operation of the machine.

As shown in Fig. 3, a plate 116 which is similar to the detents 79 for the banks of amount keys and is supported in the same manner is lowered by depression of a transaction key to move a zero stop pawl 117 out of the normal position shown in this figure, but not for the purpose of temporarily locking the depressed key in depressed position and the keys, therefore, are not provided with locking shoulders as is the case with the amount and waiters' keys. The zero stop pawl 117 is rigidly mounted upon a pin 118 journaled in the lower end of the key frame and rigidly carrying an arm 119. A spring 121, which is connected at one end to the arm 119 and at the other end to the key frame, holds the zero pawl 117 and the plate 116 in normal position, in the same manner as the detents 79 are held in normal position. Coöperating with the pins 75, on the transaction keys, is a detent 122 provided with curved slots 123 which the pins 75 enter on depression of the keys. The detent 122 at its lower end is supported by an arm 124 pivoted on the pin 87 and at its upper end by an arm 125 the detent at its upper end being provided also with a slot 127 through which the pivotal pin 87 of the arm 125 projects. A spring 126 is employed to retain the detent 122 in normal position.

The arm 125 carries a pin 128 extending into a recess (Figs. 3, 11 and 35) in an arm 130 integral with a sleeve 131 mounted on a shaft 132. The sleeve carries an arm 134, the outer end of which is bifurcated to fork over a pin 135 projecting from the right hand side of a yoke 136. The right hand arm of the yoke 136 is loose on the shaft 100 and the left hand arm is rigidly mounted on a sleeve 138 loose on the shaft 100. The sleeve 138, at its left hand end is rigidly connected to the right hand arm of the yoke 115 and therefore this yoke 115 rigidly connects the sleeves 110 and 138. Through these yoke and sleeve connections it can be seen that the downward movement of the detent 122 (Fig. 3) upon depression of the transaction key rocks the sleeve 131 clockwise as viewed in Fig. 35 and thereby rocks the sleeves 138 and 110 in the opposite direction to raise the rod 108 and thereby raise the locking plates 103 and 113 for the three banks of waiters' keys to lock these keys against manipulation during the operation of the machine.

Upon depression of a transaction key the arm 67 (Fig. 2) is rocked counter clockwise to raise the locking pawl 64 (Fig. 41) out of locking position and thereby permit operation of the motor. This movement of the arm 67 is accomplished by the following mechanism. The arm 67 (Fig. 2) is rigidly mounted on a shaft 146, which at its right hand end carries a rigidly mounted arm 147.

This latter arm at its free end is provided with a pin which projects into a recess in the end of the rearwardly extending arm of a bell crank lever 150 which is loosely mounted on the side frame of the machine. The vertically extending arm of the bell crank 150 carries an anti-friction roller which projects into a cam slot 152 formed in a lever 153 rigidly mounted on the right hand end of the shaft 100. The forward end of the lever 153 carries a pin 155, which projects into a slot 156 formed in the upper end of a link 157. A spring 158, which is coiled about a pin 159, projecting lengthwise in the slot, is connected to the forward end of the lever 153 and tends to rock the lever 153 clockwise. This operation of the lever 153 is normally prevented by the engagement of a pin 161 (Figs. 3, 11, 35 and 36) on the lower end of an arm 162 loose on the shaft 100 with the outer end of an arm 163 rigidly mounted on the sleeve 131. A forwardly projecting finger 165, integral with the arm 162, engages over a stud 166 projecting laterally from an arm 167 rigidly mounted on the shaft 100. From this description of this mechanism it can be seen that when the sleeve 131 is rocked by the depression of a transaction key the arm 163 will be carried out of the path of the pin 161 whereupon the spring 158 (Fig. 2) rocks the lever 153 and shaft 100 clockwise, and because of the engagement of the pin 166 with the under side of the finger 165 the arm 162 will be rocked forwardly. The cam groove 152 formed in the lever 153 is so constructed that upon this rocking movement of the lever 153 the bell crank lever 150 will be rocked counter clockwise and thereby through the arm 147 and shaft 146 raise the arm 67 to elevate the motor locking arm 64 (Fig. 41) whereupon the motor is permitted to operate the machine, as described above.

As the pin 161 passes under the arm 163 upon depression of a transaction key it can be seen that the sleeve 131 and detent 122 cannot be moved back to normal position when the operator removes his finger from the key. As the slots 123 are curved each coöperates with the pin 75 on its corresponding key when the key is depressed to retain the key in depressed position while the plate 122 is in its moved position and as the slots for the undepressed keys move away from under their pins 75 these keys will be locked against depression during the operation of the machine.

It may happen that a careless waiter might forget or purposely neglect to depress the waiters' keys which control the printing of numbers assigned to the waiters, on a detail strip with the items printed to enable the proprietor to identify the waiters making the particular sales. For the purpose of compelling the depression of a waiter's key before a transaction key can be depressed and thereby call the waiter's attention to the fact that the keys representing his number have not been depressed the following described mechanism is provided. A yoke member 170 (Figs. 5, 7 and 11) is loosely mounted on the shaft 132 and has three upwardly extending fingers 171. The fingers normally engage pins 173 (Fig. 7) by which the upper end of the detents 102 for the three banks of waiters' keys are pivotally connected to the supporting arms 106. A spring 174 (Fig. 5) coiled about the shaft 132 retains the member 170 in the normal position shown in this figure and in Fig. 7 so that the outer end of a rearwardly projecting arm 175 of the member 170 is normally in front of a stud 176 carried by an arm 177 integral with the arm 109, which as above described is fast on the sleeve 110. Should it be attempted to release the machine by the depression of a transaction key without first depressing a waiter's key, it will be seen that the stud 176 will abut the end of the arm 175 and thereby prevent movement of the sleeves 110, 138 and 131 (Figs. 11 and 35) and hence prevent complete depression of a transaction key which is necessary to release the machine for an adding operation thereof. When a waiter's key in any bank is depressed, however, the pin 173 (Fig. 7) engages the corresponding finger 171 on the yoke member 170 and rocks the latter clockwise whereupon the arm 175 is moved away from in front of the stud 176 to permit the release of the machine upon the depression of a transaction key.

In order to prevent partial depression of a waiter's key, sufficiently to raise the arm 175 from in front of the stud 176, and subsequently effect the release of the machine by operation of a transaction key the ends of locking projections on the locking plates 103 and 113 are straight and as the pins on the keys are in the path of movement of these projections when the keys are but partially depressed the plates cannot be raised and therefore the machine cannot be released. It can be seen that if the ends of the projections on the plates 103 and 113 were curved as are the projections on the locking plates 80 for the amount keys and that if the pins on the waiters' keys were circular a waiter's key could be partially depressed and then upon release of the machine the curved projection would force the key to its normal position.

Inasmuch as it is usual in hotels, restaurants and the like for waiters to enter successively a number of items in the machine and record each item upon a waiter's slip, the waiters' keys are not released during the operation of the machine, the release of these keys being effected by the waiter while the machine is not in operation, and after the last item of the series has been recorded. As different amounts, however, are entered in the machine at different operations and different totalizers selected, the amount keys and the transaction keys are released at every operation of the machine.

To effect the release of the amount keys the mechanism shown in Figs. 2, 3, 11 and 35 is provided and this mechanism will now be described. A slot 180 (Fig. 2) is formed in the link 157 and a pin 181 rests in a set off 182 of the slot. The pin 181 is carried by the rear end of an arm 183 loosely mounted at its forward end on the right hand side frame of the machine. This arm 183 intermediate its ends carries a roller projecting into a cam groove 186 formed in the face of the gear 52 which, as already described, is given one half of a rotation at each adding operation of the machine. The cam groove 186 has two camming portions 187 each of which coöperates upon alternate operations of the machine with the roller on the arm 183 to rock the latter downwardly near the end of the operation of the machine. In this way the link 157 is lowered and as the pin 155 was moved into engagement with the upper end of the slot 156 in the link upon the releasing of the machine, the lever 153 and shaft 100 are rocked near the end of the operation of the machine, first counter clockwise past normal position and then clockwise to normal position. As the rod 98 (Fig. 4) is carried by the arms 99 fast on the shaft 100, the rod 98 is lowered past normal position and engages projections 188 (Fig. 4) of the arms 82 supporting the upper ends of the detents 79 for the amount keys and forces the detents downward and as the locking plates 80 are moved to normal position by this downward rocking of the rod 98 before it passes normal position and are retained in normal position during the continued movement of the rod 98 past normal position, the key springs are permitted to restore the depressed amount keys to undepressed position.

The above described counter clockwise (as viewed in Fig. 3) movement of the shaft 100 is also employed to effect the release of the depressed transaction key and the restoration of the locking plates 103 and 113 for the three banks of waiters' keys to normal position. To this end a bell crank lever 190 (Figs. 3, 11 and 35) is loosely mounted on the shaft 132 and the upper edge of the rearwardly extending arm of this lever engages the lower end of the arm 162 loose on the shaft 100. The rear edge of the upwardly extending arm of this lever 190 is engaged by the outer end of the arm 167 rigidly mounted on the shaft 100. This upwardly extending arm of the lever 190 is so curved that during the initial downward movement of the arm 167 with the shaft 100 the lever 190 is rocked counter clockwise as viewed in Fig. 3, the rearwardly extending arm of the lever during this time rocking the arm 162 rearwardly slightly past normal position so that the stud 161 is carried away from beneath the arm 163. Continued downward movement of the arm 167 with the shaft 100 after the arm 162 has been moved slightly past normal rocks the lever 190 no further. As the pin 161 is carried away from beneath the arm 163 the spring 126 (Fig. 3) raises the detent 122 whereby the sleeve 131 is rocked back to normal position so that the end of the arm 163 is again restored to its normal position in front of the stud 161. This upward movement of the detent 122 permits restoration of the depressed transaction key by its spring. The cross rod 108 (Figs. 5, 7 and 11) is lowered at the same time to normal position through the arm 134 (Figs. 11 and 35) yoke 136, sleeve 138, the yoke 115 and sleeve 110. This movement of the rod 108, of course, lowers the locking plates 103 and 113 for the three banks of waiters' keys to normal position because of the engagement of the rod in the recesses 107 formed in the arms 105 supporting the upper ends of these locking plates. The detents 102 for these banks of waiters' keys are not operated at this time. Means for effecting the movement of these detents to release these keys when desired will be described later.

When the lever 153 (Fig. 2) is rocked counter clockwise past normal position by the cam 186, the bell crank lever 150 is restored to normal position by the cam groove 152 and thereby through the arm 150, arm 147, shaft 146 and the arm 67, the motor clutch locking pawl 64 (Fig. 42) is restored to locking position. It can be seen from the shape of this cam groove that the lever 150 is rocked to normal position during the counter clockwise movement of the lever 153 to normal position. The continued counter clockwise movement and the return clockwise movement, to normal position, of the lever does not operate the lever 150 as the lower end of the cam groove 152 is formed on an arc struck from the shaft 100. It is understood, of course, that the spring 158 cannot again rock the lever 153 to release the machine until a transaction key is again depressed as the arm 163 (Figs. 3, 11 and 35) prevents movement of the arm 162 and thereby the arm 162 through the engagement of its finger 165 over the stud 166 on the arm 167 prevents the necessary rocking movement of the shaft 100 and lever 153 to release the machine.

In order to prevent the operator from retaining the depressed transaction key in depressed position until the end of one complete operation of the machine, and thereby prevent return of the detent 122 and sleeve 131 to normal for the purpose of causing an immediate second operation of the machine, an arm 194, best shown in Figs. 3 and 36, is employed. This arm is loosely mounted on the shaft 132 and a spring 195, which is connected at one end to the arm 194, and at its opposite end to the arm 163, normally retains the outer upper edge of arm 194 in engagement with the stud 161. The arm 194 is longer than the arm 163 so that when the arm 163 is raised out of the path of stud 161 to permit the release of the machine, as above described, the stud passes between the arms 163 and 194. It can be seen from this construction that if a transaction key is held in depressed position until the end of the operation, the detent 122 and sleeve 131 are held in moved position, and when the stud 161 is moved rearwardly slightly past normal position, as above described, the spring 195 will pull the arm 194 upwardly into engagement with a laterally projecting portion 196 of the arm 163 so that the rear end of the arm 194 is in front of the stud 161. Therefore, the arm 162 cannot be rocked forwardly again and in this way a second operation is prevented. Then when the operator removes his finger from the depressed transaction key the spring 126 for the detent 122 restores this detent and sleeve 131 to normal position, and the arm 163 moves the arm 194 downwardly from in front of the stud 161 so that the stud 161 can assume its normal position in engagement with the end of the arm 163.

The above mentioned means for releasing the waiters' keys after a series of items has been successively entered in the machine will now be described. This means includes a yoke 197 (Fig. 1) mounted on a lug projecting from a frame 199, which, together with a frame 200 (Fig. 20) supports the printing mechanism at the front of the machine. A vertical arm 201 of the yoke 197 is pivotally connected at its upper end to a link 202 (Fig. 1), and the link at its rear end (Figs. 5 and 13) is pivotally connected to the lower end of an arm 203 fast on a shaft 204. This shaft 204 is journaled in lugs 205 projecting rearwardly from the frame 200. A lever 206 (Figs. 7 and 13) is rigidly secured to the shaft 204 and a spring normally retains the lever in the position shown in Fig. 7 and in this position the downwardly and forwardly extending arm of the lever 206 engages the frame 200. The lever 206, together with an arm 207, also rigidly mounted on the shaft 204, carries a rod 208, which passes under the downwardly and forwardly extending portions of the arms 112 which support the lower ends of the detents 102 for the three banks of waiters' keys. A key 211 (best shown in Fig. 20) is mounted in the hood or casing for the printing mechanism (Fig. 21) and its rear end engages the arm 201 and the forward end of the link 202. When the key 211 is pressed in the link 202 is moved rearwardly to rock the shaft 204 clockwise as viewed in Fig. 7, whereupon the cross rod 208 engages and rocks the arms 112 forwardly lowering all the detents 102 for the banks of waiters' keys, and thereby permitting the springs for the depressed waiters' keys to restore the latter to undepressed position.

When these detents for the banks of waiters' keys are lowered in the manner just described by depression of the key 211 the yoke member 170 (Figs. 5, 7 and 11) is rocked in the same manner as when one of these keys is depressed and thereby the arm 175 of the yoke member 170 is carried away from in front of the stud 176. To prevent the release of the machine by the depression of a transaction key at the time that the arm 175 is moved away from the stud 176 by the depression of the key 211, the lever 206 carries a pin 214 (Figs. 7 and 13) which projects into a notch in an arm 216 (Figs. 7 and 12) loosely mounted on a shaft 217. The arm 216 carries a squared lug 218, which is normally out of the path of rearward movement of a squared lug 219 carried by the lower end of the arm 114 which as above stated supports the lower end of the locking plate 113 for the hundreds bank of waiters' keys. When the lever 206 is rocked by pressing in the key 211, the arm 216 is rocked downwardly thereby carrying the lug 218 behind the lug 219 and thereby the arm cannot be rocked rearwardly. As the arm 114 cannot be rocked rearwardly at this time the locking plate 113 cannot be raised and hence the rod 108 cannot be raised, it being remembered that this rod 108 is raised when the machine is released. In this manner release of the machine is prevented while the key 211 is in its pressed in position. When the machine is released in the proper manner, the locking plate 113 is raised as before described and thereby the lug 219 is moved rearwardly under the lug 218 to prevent downward movement of the arm 216 and hence operation of the key 211 and its connections during the operation of the machine.

The key board is provided with the lever 72 for controlling total and subtotal operations of the machine. The lever has five different positions, the central one in which it is shown in Fig. 1, being its adding position, as with the lever in this position the machine is in condition for accomplishing addition. This lever, which is called the total lever herein, is movable in a slot 221 formed in a plate 222 on the cabinet of the machine, the slot being provided with notches or shoulders 223 to assist the operator in positioning the lever to any one of its positions indicated on the plate 222. If the lever 72 is shifted one step above its central or adding position it will control the machine for printing a subtotal from the desired transaction totalizer. When the lever is in its uppermost position a subtotal will be printed from the grand totalizer whereas if the lever is shifted to its lowest position a total will be printed from the grand totalizer.

When a total or subtotal is to be printed, it is necessary, of course, that no waiter's key or amount key be operated. It is, therefore, necessary to provide mechanism controlled by the total lever for operating the yoke member 170 (Figs. 7 and 11) for the purpose of raising the arm 175 from in front of the stud 176 to permit the releasing of the machine when a total or subtotal is to be printed. This mechanism comprises an arm 225 (Figs. 7 and 12) which is rigidly mounted on the shaft 217 and has pivoted to the outer end thereof the lower end of a link 226, which at its upper end is pivotally connected to an arm 227, loosely mounted on the shaft 132 (Figs. 7 and 11). The link 226, near its upper end has a shoulder 228, engaging over a pin 229, projecting laterally from a forwardly extending arm 230 of the yoke member 170. An arm 231 (Figs. 12, 31, 34 and 39) which is fast to the shaft 217, near the right hand end of the latter, carries an anti-friction roller 232, which projects into a slot 233 formed in the upwardly extending arm of the lever 234. The lever 234 is centrally pivoted on a frame or plate 237 (best shown in Figs. 31 and 32) which is mounted on two cross bars 238 and 239, supported at their ends in the side frames of the machine. The lever 234, on the lower end of its downwardly extending arm carries a pin 240, which projects into a slot 241 formed in the total lever 72, which is in the form of a nearly circular plate having the finger piece or handle which projects through the slot 221 in the cabinet and is gripped by the operator. The total lever is pivoted on a stud 242 projecting from the frame 237. When the total lever 72 is in its adding position, as shown in Fig. 31, the pin 240 is in the center of the slot 241 and in engagement with the end of a projecting portion 243 and the roller 232 at this time is in the upper end of the slot 233. When the total lever is shifted upwardly one step in position to control the machine for printing a total from the desired transaction totalizer the pin 240 moves in the slot 241 to the position shown in Fig. 34, thereby rocking the lever 234 clockwise as viewed in the last mentioned figure. The slot 233, in the lever 234, through its coöperation with the roller 232 rocks the arm 231 and shaft 217 counter clockwise, the roller 232 being moved to the angle in the slot 233. The lower end of the slot 241 is circular so that when the lever is moved one step farther to its uppermost position the pin 240 will remain in the circular portion of the slot and thereby retain the lever 234, arm 231 and shaft 217 in the position shown in Fig. 34, and just described. When the lever is shifted one step below its central position, the pin 240 will be moved by the slot 241 so that it is in the same exact position as when the lever is shifted one step above its adding position, but the pin is now the same distance above the projecting portion 243 that it was below this projecting portion when the total lever was shifted one step above adding position. This movement of the pin 240 when the lever is shifted one step below its adding position, therefore, will rock the lever 234, arm 231 and shaft 217 to the same position as shown in Fig. 34. As the upper end of the slot 241 is also circular and on the same arc as the lower end of the slot, it can be seen that when the lever 72 is shifted to its lowest position as shown in Fig. 39, the lever 234, arm 231 and shaft 217 will be rocked no further. From the above description, it can be seen that whenever the total lever is moved out of central or adding position, the shaft 217 will be rocked counter clockwise as viewed in Fig. 7 and thereby the link 226 will be drawn downwardly. This movement of the link, through the engagement of the shoulder 228 with the pin 229 will rock the yoke member 170 and thereby permit the release of the machine by the operation of a transaction key if a total or subtotal is to be printed from a transaction totalizer or by the movement alone of the total lever to its uppermost or lowest positions, as will be presently described, when a total or subtotal is to be printed from the grand totalizer.

To release the machine to print a total or subtotal from a transaction totalizer, it is only necessary to move the lever 72 one step above or below its central position depending on whether a total or subtotal is to be printed and then depress the desired transaction key. Depression of the transaction key permits the releasing of the machine in the same manner as in an adding operation and therefore this operation need not be repeated here.

When a total or subtotal is to be printed from the grand totalizer, however, a transaction totalizer is not operated and, therefore, a transaction key is not depressed. The machine upon such operations is released by movement of the total lever to its uppermost or lowermost positions by the following means. A link 246 (Figs. 31, 34 and 39) at its rear end is pivotally supported by a pin 247 which projects through a slot 248 in the total lever and is carried by an arm 249 pivotally mounted at its lower end on the frame 237. The link 246, at its forward end, is pivoted to an ear integral with a sleeve 252, provided with two rearwardly extending arms 253 (Figs. 3 and 12) which carry a short rod 254, the right hand end of which projects over a forwardly extending projection 255 on the lower end of the detent 122 which is operated by the transaction keys in adding operations to release the machine. The slot 248 is so formed that the arm 249 and link 246 will be moved forwardly only when the total lever is moved to one of its extreme positions in which positions it controls the operation of the machine for printing a total or subtotal from the grand totalizer. The sleeve 252 is thereby rocked and the rod 254 lowered whereupon the rod 254 engages the projection 255 and draws the detent 122 downwardly. This downward movement of the detent is to the same extent as when a transaction key is operated, and therefore, it can be seen that the machine is released by this downward movement of the detent 122 in the same manner as when the transaction keys were operated.

A transaction key cannot be operated simultaneously with the positioning of the total lever to its uppermost or lowest position as when the rod 254 is lowered by the positioning of the total lever, it passes in front of a shoulder 257 formed on the arm 83 for supporting the lower end of the detent 122 for the transaction keys and when a transaction key is depressed, this shoulder passes under the rod 254. Therefore, a key cannot be operated at the same time the lever is moved to its uppermost or lowermost position.

In order to prevent operation of the amount keys or waiters' keys during a total or subtotal printing operation the shaft 217 rigidly carries three arms 260 which support a rod 261 (Figs. 4, 5 and 12) extending across the ends of the arms 83 which support the lower ends of the detents 79 for the banks of amount keys and the ends of the arms 112 which support the lower ends of the detents 102 for the units and tens banks of waiters' keys. As shown in Fig. 12, the shaft 217, also rigidly carries an arm 262 which carries a stud 263 projecting over the end of the arm 112 which supports the detent 102 for the hundreds bank of waiters' keys, shown in Fig. 7. When the shaft 217 is rocked by the adjustment of the total lever to a total or subtotal position as above described, the rod 261 and the stud 263 are lowered in front of the shoulders 257 formed on the arms 83 and 112 for the above mentioned banks of keys, and thereby the rod and stud prevent downward movement of the detents for these banks and hence operation of the keys. In an adding operation when an amount or a waiter's key is operated the corresponding detent 102 is lowered and the shoulder 257 is carried under the rod 261 or the stud 263 to prevent rocking movement of the shaft 217 and therefore adjustment of the total lever out of its central position.

Means are also provided for preventing the releasing of the machine when the total lever is not in one of its five predetermined positions. This means, which is shown in Figs. 31, 34 and 39, comprises a bell crank lever 265 pivotally mounted at 266 on the frame 237. The upwardly extending arm of this bell crank lever has a rearwardly extending projection which when the lever is in any one of its five predetermined positions, is just out of the path of upward movement of a projecting portion 268 on the previously described arm 167. The rearwardly extending arm of the bell crank lever 265 carries a pin which projects into a slot 270. When the total lever is in one of its five predetermined positions the pin on the lever 265 rests on one of the points formed in the lower side of the slot 270 and the projection on the upwardly extending arm of the lever 265 is thereby held out of the path of upward movement of the arm 167 to permit the release of the machine. If, however, the total lever is not in one of these five positions, it rests in one of the depressions between the points formed in the lower side of the slot, and the lever 265 is rocked slightly counter clockwise from its normal position so that its projection engages over the arm 167 thereby preventing upward movement of the arm 167 and hence the releasing of the machine.

*Amount differential mechanism.*

To drive the differential mechanism of the machine, the drive shaft 50 is provided with a plurality of pairs of cams 273 and 274 (Figs. 3, 4 and 5) each pair of which cooperates with rollers 275 and 276 respectively journaled on pins carried by the forwardly and downwardly extending arms respectively of Y-shaped levers 277 of which there is one for each bank of waiters' and amount keys and one for the bank of transaction keys. Each of these levers 277 is pivoted at 278 to a corresponding plate 279 (Figs. 4, 5 and 15) all of the plates 279 being mounted on the cross rods 238 and 239. These plates 279, together with plates 280 (Figs. 3 and 15), also mounted on the cross rods 238 and 239, and connected to the plates 279 by rods 282, form frames as fully described in the above mentioned Chryst application, for supporting the differential units for the various banks of keys. The pairs of cams 273 and 274 are arranged spirally on the shaft 50 as described in the aforesaid Chryst application for the purpose of effecting transfers from one totalizer element to another and to make the operation of the machine easier. Loosely mounted on the enlarged portions 281 of the rods 282 which connect the plates 279 and 280 for supporting the differential units adjacent the banks of amount keys are differentially movable members 283 (Fig. 4) carrying two pairs of racks 284 and 285 for respectively operating the main totalizer and the transaction totalizers. There is also one of these differentially movable members for each of the units and tens banks of waiters' keys the members adjacent these banks being numbered 286 (Fig. 5) to distinguish them for convenience from those controlled by the amount keys. As is usual in the art, there are provided totalizer elements for which no banks of amount keys are provided, these elements being of highest denominations and operated in adding operations only when transfers to them are necessary. These differentially movable members 286 and the transfer devices associated therewith are like those for the banks of amount keys, the transfer mechanism being used to effect transfers to these two totalizer elements of higher denomination in adding operations and the differentially movable members 286 being employed to operate and be controlled by these two totalizer elements in total and subtotal printing operations, as will be described later. The Y-shaped levers 277 at the upper ends of their upwardly extending arms are pivotally connected by links 287 to driving segments 288 loosely mounted on the rods 282.

The driving segments 288 adjacent the banks of amount keys are connected to the differentially movable members 283 by latches 289 (Fig. 4). These latches are pivoted to vertically extending arms of bell crank levers 290 and to arms 291, these levers and arms in turn being mounted pivotally on the members 283. Latches 292 (Figs. 8 and 9) for the members 286 (Figs. 5 and 9) are carried on bell crank levers 293 and arms 294, which in turn are pivoted to arms 296, loosely mounted on the rods 282. The arms 296 are rigidly connected to the differentially movable members 286 by rods 297. Springs 298 (Fig. 4) connected at their rear ends to the differentially movable members 283 and at their forward ends to the pins pivotally connecting the levers 290 with the latches, hold the rear ends of the latches 289 in engagement with shoulders 300 on the driving segments 288. Springs 301 (Fig. 8) hold lateral projections 302 formed on the rear ends of the latches 292 in engagement with the shoulders on the driving segments 288, for the differentially movable members 286. When the segments 288 for the banks of amount keys are driven by their cams 273 and 274 through their levers 277 and links 287 the differentially movable members 283 are carried with their latches up to points where the forwardly extending arms of the levers 290 engage depressed amount keys such engagement resulting in the disengagement of the latches from the driving segment and engagement of the forward ends of the latches with the particular notches 303 which are opposite the latches at the time and formed in plates 304. Upon return movement of the segments to normal position they pick up the differentially movable members 283 and return them to normal position as fully described in the Chryst application. If a key is not depressed in an amount bank the zero stop pawl 88 for that particular bank remains in operative position and operates the latch 289 to disconnect the differentially movable member from the driving segments when the segment is in zero position. When a key is depressed, however, the arm 83 engages the pin 91 on the pawl 88 and rocks the latter out of operative position.

Zero stop pawls 305 (Figs. 9 and 10) one for each of the differentially movable members 286 are loosely mounted on the lower ends of plates 306, which are similar to the plates 304 and carried in the key frames 73. These pawls are only moved out of operative position during total and subtotal printing operations in a manner to be presently described and therefore they are not connected in any way to the detents 102 for the banks of waiters' keys. Therefore, in adding operations the forwardly extending arms of the bell crank levers 293, supporting the latches 292, engage the pawls 305 and disconnect the latches 292 and therefore the members 286 from the corresponding driving segments 288, when the latter arrive at zero positions, the forward ends of the latches being adapted to engage the lowest notches formed in the plates 306.

The transfer mechanism is fully shown and described in the aforesaid Chryst application and so will be described but briefly here. Pairs of teeth are cut in arms 308 and 309 (Figs. 3 and 5) pivoted to the differentially movable members 283 and 286. Pivoted to the arms 308 and 309 are arms 310. Springs 311 are employed to hold the arms 310 in such position that during the movement of the differentially movable members 283 and 286 pins 313 are rocked in engagement with recesses 312 (Fig. 5) in the members 283 and 286, so that the pairs of teeth and the actuating racks 284 and 285 move as integral units. Squared pins 314 mounted on the arms 310, near their pivots abut the ends of transfer plates 315 (Fig. 4) when the differentially movable members 283 arrive at zero position on their return movement, but as these members are given an extra step of movement past zero to normal position the arms 310 are locked to disengage their pins 313 from the recesses 312 and thereby permit the additional movement of the differentially movable members. When a totalizer pinion passes from "nine" to "zero" its long tooth 316 engages a pawl 317 (Figs. 4 and 15) rigid on a stub shaft 318 which carries an arm 319 having a pin extending into a slot 320 in the transfer plate 315. The engagement of the long tooth with the pawl 317 rocks the arms 317 and 319 to permit a spring connected to the plate 315 and to a lever 642 to rock the plate 315 out of the path of movement of the squared pin on the arm 310. When this occurs the arm 308 or 309 remains locked to the differentially movable member and a transfer is effected thereby.

As already stated the transfer devices associated with the differentially movable members 286 adjacent the units and tens banks of waiters' keys are like those for the amount differentially movable members 283, and it will be understood readily that since these members 286 are always moved one step from normal to zero in adding operations, transfers are accomplished thereby in the same manner as those effected by a member 283 when an amount key in a corresponding bank is not operated.

After an adding operation all displaced transfer devices are restored to normal position at the next operation of the machine by two armed levers 322 (Fig. 4) loose on the rods 282. A pin on each of the rearwardly extending arms of the levers 322 is engaged by the driving segment 288 for the bank of next lower denomination as the segment in its upward stroke reaches its "9" position, thus rocking the ends of the two arms of the lever 322 into engagement with the transfer plates 315 to restore the transfer plates to normal position, so that upon the return of the differentially movable member the transfer arms are again stopped when the differentially movable member reaches zero position.

*Totalizers.*

As already stated there are four transaction totalizers, three of which in the illustrative form of embodiment shown herein are assigned to segregate the total values of food, wine and cigars sold, while the fourth or "void" totalizer accumulates the total value of provisions returned. The transaction totalizers consist of a plurality of groups of pinions 325 (Figs. 4, 5 and 15) loosely mounted on a tube 326 fixed in frames 327 and 328. Sleeves 321 are provided to prevent lateral movement of the pinions on the tube. Each totalizer consists of one pinion in each group, the pinions being denominationally arranged in groups as is well known in the art. The frames 327 and 328 are provided with rollers 329 engaging a shaft 380 on opposite sides. The ends of the shaft 380 project into slots in frames 333 (Figs. 15, 16, 31, 32, 33, 34, 37, 39 and 40) fixed to the side frames of the machine. Arms 335, rigid on the shaft 330 near its ends, carry rollers 336 extending into cam slots in the fixed plates 333. The right hand arm 335 is pivotally connected to a link 340, which is drawn forward in the direction of its length and then moved rearwardly to its normal position by mechanism to be described later. This operation of the link 340 rocks the arms 335 and shaft 330 and at the same time movement of the rollers on the arms 335, in the cam slots in the plates 333, moves the selected transaction totalizer opposite the racks 285 (Fig. 4) into engagement therewith.

To shift the transaction totalizers along the shaft 330, so that any desired totalizer may be brought opposite the actuating racks 285, the frame 327 carries a rod 342 (Fig. 16) provided with a roller 343, which extends into a groove 344 (Figs. 16 and 18) of a cam member 345. A link 347 connects the cam member 345 with an arm 348 fast on a shaft 349. An arm 350 (Figs. 3 and 19) is also fast on the shaft 349 and this arm is pivotally connected to the rear end of the link 351, the other end of the link being connected pivotally to the rear end of a beam 354, supported at its forward end by a pin 355, to a differentially movable member 356, which is controlled by a bank of transaction keys 70. The latch 357, for this differentially movable member 356 is like the latches 289 for the amount keys and is supported by the member 356 in the same manner, and the differentially movable member 356 is operated by one of the segments 288 in the same manner as the differentially movable members 283 under the control of the amount keys. As the forward end of the beam 354 is pivoted to the member 356, this end of the beam is positioned differentially with the member. When the beam 354 is moved in this manner a roller 358 carried by the Y-shaped lever 277 engages the beam 354 and carries it into engagement with the enlarged portions 281 on the rod 282 if the beam is not already in engagement therewith. In this manner as more fully described in the aforesaid Chryst application, the shifting cam 345 is rocked directly from one position to another under the control of the transaction keys and through the beam 354, link 351, arm 350, shaft 349, arm 348 and link 347, and thereupon the groove 344 shifts the transaction totalizers so that the desired one is opposite the actuating racks 285.

All of the amounts entered in the "wine," "food" and "cigar" totalizers are added in the grand totalizer but the amounts added on the "void" totalizer are subtracted from the grand totalizer. The grand totalizer, therefore, comprises a plurality of pairs of pinions 360 and 361 (Fig. 15). The subtracting pinion 361 and the adding pinion 360 of each pair carry bevel gears 362 meshing with a small intermediate bevel gear 363, as is well known in the art. The pinions 360 and 361 are mounted on a tube 364 (Figs. 4 and 15) which carries pins 365 (Fig. 15) supporting the bevel pinions 363. The tube 364 is mounted in frames 366 and 367 which are like the frames 327 and 328 carrying the transaction totalizers and these frames 366 and 367 also carry rollers which engage opposite sides of a shaft 369. Secured to the shaft 369, near its ends, are arms 371, which carry rollers 372 (Figs. 16, 31, 32, 34, 37, 39, and 40) projecting into cam grooves in plates 374 which are constructed like the plates 333. The right hand arm 371 is connected to a link 375 which is moved downwardly in the direction of its length to rock the arms 371, and thereby move the grand totalizer into engagement with the actuating racks 284.

In order to shift the grand totalizer to bring the subtracting pinions 361 opposite the racks 285 when the "void" totalizer is selected for operation or to bring the adding pinions 360 opposite the racks when any one of the other transaction totalizers is selected for operation, a roller 377 (Figs. 16 and 17) carried by a rod 378 on the frame 367 projects into a cam groove 379 of the cam member 345 the shape of this cam groove being best shown in Fig. 18. The cam groove 379 is so designed with relation to the cam groove 344 that when the cam member 345 is rocked as above described to move one of the transaction totalizers other than the "void" totalizer from its position opposite the racks 285 to bring another one of these totalizers to such a position the grand totalizer will not be shifted, the adding pinions 360 thereby being retained in position to be engaged by the actuating racks 284. When the cam member 345 is operated so that the cam groove 344 shifts the transaction totalizers to bring the "void" totalizer opposite the racks 285 the grand totalizer is shifted by the groove 379 to bring the subtracting pinions 361 opposite the racks 284. It will be readily understood, of course, that the adding pinions will always represent the difference between total accumulations on the "food," "wine" and "cigars" totalizers and the total on the "void" totalizer because the movements of the subtracting pinions through the bevel gears 362 and the bevel pinions 363 rotate the adding pinions 360 in the subtracting direction to a corresponding extent. It can also be seen that the subtracting pinions are provided with transfer teeth 316 which effect transfers in subtracting operations of the totalizer in the same manner as the adding pinions effect transfers when amounts are added on the grand totalizer.

The bases or peripheries of the cam grooves 344 and 379 are provided with holes 380 (Figs. 16, 17 and 18) through which the rods 378 and 342 pass when the totalizers are moved into engagement with the actuating racks to lock the totalizers against lateral movement, as fully explained in the description of the department totalizers in the aforesaid Chryst application. Rollers 381, mounted on a fixed frame 382, project into a cam groove 383 formed in the interior periphery of the cam member 345 for the purpose of relieving the pivot of the member from excessive strain due to the lateral shifting of the totalizers.

The mechanism for alining and locking the elements of the transaction totalizers against rotation when all of the latter are out of engagement with the actuating racks 285 is fully shown and described in the aforesaid Chryst application. This mechanism for the transaction totalizers comprises an alining plate 385 (Figs. 4, 5, and 15) carried by levers 386 and operated by cam members on the shaft 330 to rock the plate 385 out of engagement with the totalizer pinions when the totalizer frame is moved to carry the pinions of the totalizers into engagement with the actuating racks 285. The mechanism for alining the adding and subtracting pinions of the grand totalizer when both the adding and subtracting pinions are out of engagement with the actuating racks 284 is like that just described for the transaction totalizers and will not be described further here.

Both of the links 340 and 375 (Figs. 31, 32, 34, 37, 39 and 40) are reciprocated in the direction of their length in adding operations, to engage and disengage the selected transaction totalizer and the grand totalizer with their actuating racks 285 and 284 respectively by the operation of a plate 400, best shown in Figs. 32, 37 and 40. The plate 400, which is nearly circular and mounted on the stud 242, has a hook 401 normally engaging over a roller 402 on the lower end of the link 375 when the machine is in a condition for accomplishing an adding operation. The plate 400 also has a hook 403, in which a roller 404 on the forward end of the link 340 rests when the machine is in condition for accomplishing an adding operation. A stud 405 mounted on the plate 400 normally rests in a notch 406 formed in a plate 407. The plate 407 at its forward end is supported by a roller 408, which is mounted on a member 409 and projects through a slot 410 formed in the forward end of the plate 407. The plate 407, at its rear end is connected pivotally to the upper end of a Y-shaped lever 412 (Fig. 32) loosely mounted on a fixed rod 413. Rollers mounted on the downwardly and forwardly extending arms of the Y-shaped lever 412 coöperate respectively with cams 416 and 417 fast on a shaft 50. The cams 416 and 417 are so designed as to rock the lever 412 clockwise as viewed in Fig. 32, immediately after all the driving segments 288 for the differentially movable members 283 and 286 have come to rest at the end of their up strokes but before they begin their return movement in adding operations. This movement of the lever 412 draws the plate 407 rearwardly and because of the engagement of the stud 405 in a notch 406, the plate 400 is also rocked clockwise (Fig. 32). This movement of the plate 400 draws the link 375 downwardly and the link 340 forwardly so as to move the adding or substracting pinions of the grand totalizer and the pinions of the selected transaction totalizer into engagement with their actuating racks so that upon return movement of the differentially movable members 283 the totalizers will be actuated in accordance with the extents of movement of the members. After the differentially movable members are restored to normal position the cams 416 and 417 restore the lever 412, plate 407 and plate 400 to normal position and rock the totalizers out of position with their actuating racks. During the reciprocation of the links 375 and 340, the roller 402 moves in the circular and vertical portion of a slot 419 and the roller 404 moves in a corresponding circular and horizontal portion of a slot 420 to prevent disengagement of the rollers 402 and 404 from their respective hooks 401 and 403 during the engaging and disengaging movements of the totalizers. These slots 419 and 420 are formed in the frame 237.

*Recording mechanism.*

Type carriers 423 and type carriers 424 (Figs. 20, 21 and 25) for printing the amounts and the waiters' numbers, respectively on a detail strip 425 (Fig. 21) are in the form of pinions having type on the outer ends of their teeth. These type carriers 423 and 424 mesh with operating segment gears 426 rigidly mounted on the forward ends of nested sleeves 427 (Figs. 20 and 21) and a shaft 428 which at its forward end is supported by the frame 199 and at its rear end by a standard 429 mounted on the base of the machine. The segment gears 426 for the amount type carriers 423 also mesh with gears 430 rigid on nested sleeves 431 which are supported by a rod 432 and carry at their forward ends type wheels 438 for printing the amounts entered in the machine in adding operations on the inserted waiter's slip (Fig. 38). The segment gear 426, which is controlled by the transaction keys as will be described presently and which is the segment gear mounted on the shaft 428, meshes with the gear 430 on the outermost sleeve 431 and this sleeve at its forward end carries a special type carrier 434 for printing characters on the waiters' slips to designate the transaction totalizer operated during the operation in which each item is printed. The sleeves 427 and shaft 428 at their rear ends carry segmental bevel gears 435 (Figs. 2 and 20) which mesh with corresponding segmental bevel gears 437 (Figs. 2, 3, 4 and 21) loosely mounted on a shaft 438 supported by a standard 439 and the standard 429. The lower ends of four links 440 (Figs. 19 and 20) are pivotally connected to rearwardly extending arms 441 of the second, third, fourth and fifth segment gears 437 counting from the left, these four segment gears being employed to position the amount type carriers through their corresponding above described sleeve and gear connections. These links 440 at their upper ends are connected pivotally to the rear ends of arms 442 fast on the left hand ends of nested sleeves 443 supported by the shaft 146. Fast on the opposite ends of the sleeves 443 are arms 444 which are pivotally connected to the upper ends of links 445 (Figs. 4 and 19), the lower ends of which are connected pivotally to the rear ends of beams 446. These beams 446 at their forward ends (Fig. 4) are loosely mounted on pivotal pins for supporting the arms 291 on the differentially movable members 283. It can be seen from this description that the forward ends of the beams 446 are moved differentially with the members 283 and that rollers 358 on the Y-shaped members 277 engage the beams to carry them into engagement with the rods 282 if the beams are not already in engagement therewith to differentially position the amount type carriers 423 and 433 through the above described connections.

The arm 441 of the first segment gear 437 (Fig. 20) which is controlled by the transaction keys, is connected to the lower end of a link 449, which at its upper end is connected pivotally to an arm 450 (Fig. 19) rigidly mounted on the shaft 349, which as already described, is differentially adjusted under the control of the transaction keys by the mechanism shown in Fig. 3. Through these connections, therefore, the special type carrier 434 for printing on the waiters' slips is adjusted under the control of the transaction keys.

The arms 441 of the three right hand segment gears 437 (Figs. 4 and 20), which are controlled by the three banks of waiters' keys, are connected to links 451, which at their upper ends are pivotally connected to arms 452, rigidly mounted on sleeves 453 supported by a shaft 454 (Figs. 4 and 19). Arms 455 (Fig. 5) rigidly mounted on the left ends of the sleeves 453, are pivotally connected to links 456. The links 456 for the units and tens banks of waiters' keys are connected at their lower ends to beams 457. The forward ends of the beams 457 are pivotally connected at 458 to arms 459 (Figs. 5, 9 and 10) which are loosely mounted on the rods 282, which also support the above described differentially movable members 286, the arms 459 being mounted between the members 286 and the driving segment 288. A latch 460, which normally connects each arm 459 with its driving segment 288 is similar to the latch 292 shown in Fig. 8. Each latch 460, at its rear end, has a lug 461 projecting toward the lug 302 on the latch 292, these lugs being adapted to engage the shoulder of the driving segment 288. The latch 460 is supported by a bell crank lever 462 and an arm 463 which in turn is pivotally connected to the corresponding arm 459. Upon operation of the machine the driving segments 288 through the latches 460 carry the arms 459 with them until the forwardly extending arms of the bell crank lever 462 engage lugs 464 (Fig. 6) on the lower ends of the depressed waiters' keys in the units and tens banks, whereupon the latches are disconnected from the driving segments. The forward ends of the latches 460 when pulled forwardly engage notches formed in a plate 466 which is carried by the key frames for the units and tens banks of waiters' keys and are similar in construction to the plates 306. The rollers 358 mounted on the levers 277 for operating the driving segments 288 for the arms 459 engage the beams 457 to carry the latter into engagement with the rods 282 whereby the units and tens waiters' type carriers 424 are positioned differentially under the control of the units and tens banks of waiters' keys, through the beams 457, links 456 and the other connections described above.

Zero stop pawls 468, one for each of the latches 460, are loosely mounted on pins carried by the lower ends of the plates 466. These pawls carry pins 470, (Fig. 12) which are engaged by the arms 112 so that the detents 102 for the units and tens banks of waiters' keys are normally retained in normal position by springs 471 in the same manner as the detents 79 for the amount banks are retained in normal position. When a key is depressed in one of these banks of waiters' keys the pawl 468 through the detent 102 and arm 112, is moved rearwardly out of operative position but if no key is depressed the pawl will remain in operative position and operate its latch 460 to disconnect the arm 459 from its driving segment 288.

The link 456 (Fig. 19) which is controlled by the hundreds bank of waiters' keys is pivoted to a beam 473, which at its forward end is pivoted to an arm 474 which is similar to the arms 459 in construction. This arm 474 carries latch mechanism (not shown) like that for the amount banks and is controlled by the five keys in the left hand bank of waiters' keys upon adding operations. The beam 473 is positioned in the same manner as are the beams for the other banks of keys and through its connections, above described, differentially positions the hundreds waiter type carrier 424. This latter type carrier, as shown in Fig. 29, has the digits 1 to 5 inclusive on its periphery, these digits corresponding to the keys in the hundreds bank of waiters' keys. The periphery of the type carrier has also letter characters which are employed to print in total and subtotal printing operations as will be described later.

The amount type carriers 423 for printing on the detail strip are loosely mounted on a rod 475 (Figs. 21 and 25) projecting toward the rear of the machine from an arm 476 loosely mounted on a shaft 477 supported by the printer frame. The type carriers 424 for printing the waiters' numbers, are loosely mounted on a rod 475 in axial alinement with the rod 475 and carried by an arm 478, also loosely mounted on the shaft 477. A link 479 (Figs. 20, 21, 22, 23 and 24) is pivotally connected at its right end to the arm 478 and near its left end is provided with a slot 480 through which a pin 481 projects to guide the link in its reciprocation. The pin 481 is carried by the right hand end of a lever 482, loosely mounted on a stud 483. The left hand end of the link 479 is provided with a slot 484 which is narrower at the middle than at its ends, and a pin 485 projecting from an arm 486 normally projects into the middle of the slot. The arm 486 is loosely mounted on a rod 487 and at its lower end carries a roller 488, which projects into a cam groove 489 formed in a disk 490 the groove and the disk being shown by the dash lines in Fig. 22. The disk 490 is rigidly mounted on a shaft 491 which near its forward end (Fig. 20) is journaled in the frame 199 and at its rear end is journaled in a standard 492 and carries a bevel gear 493 meshing with a bevel gear 494 rigid on the shaft 50, whereby the shaft 50 on each complete rotation imparts a complete rotation to the shaft 491. The cam groove 489 is so designed as to rock the arm 478 toward the right to make an impression from the type carriers on the detail strip after the detail strip has been shifted differentially and then returned to normal position so that all of the waiters' numbers will be printed in the column near the left hand edge of the detail strip as shown in Fig. 28.

The detail strip, in a manner to be presently described, is first moved differentially from normal position under the control of the transaction keys, so that the desired column appropriate to the selected transaction totalizer is in position to be printed in by the amount type carriers 423. While the detail strip is in its differentially set position, the amount type carriers are rocked to make an impression by the following described mechanism. An arm 496 (Figs. 22 and 23) is loosely mounted on the rod 487 and connected to an arm 497 by a rod extending through the hubs of both arms. The lower end of the arm 496 carries a roller 499, which projects into a cam groove 500, shown in dotted lines in Fig. 22, and constructed in the rear face of a disk 501 (Fig. 20) rigidly mounted on the shaft 491. The arm 497 (Fig. 21) pivotally supports the left end of a link 502, which at its right end is pivoted to the arm 476. The cam groove 500 is so constructed that it rocks the arms 496 and 497 toward the right to rock the arm 476 through the link 502 and thereby cause the amount type carriers to make an impression on the detail strip while the latter is in moved position. The detail strip is then returned to normal position and the waiters' type carriers operated to make an impression as described above.

The set of amount type carriers 423 and the set of waiters' type carriers 424 are alined in their differentially set positions, while out of engagement with their actuating gears 426, by alining arms 525 (Figs. 24 and 25) there being one alining arm for each set of type carriers. The arms 525 are carried on the arms 476 and 478, the arms 525 being pivoted on pairs of links 526, which in turn are pivotally mounted on the arms 476 and 478. Each of the lower arms 526 carries a pin 527 projecting into a cam slot 528 formed in a corresponding arm 529, rigidly mounted on the shaft 477. An arm 530 (Fig. 1) is rigidly mounted on the shaft 477 and is pivotally connected to the right end of a pitman 531. The left end of the pitman 531 (as shown in Figs. 1 and 26) is bifurcated and straddles the shaft 491 and the pitman also carries a roller 532, which projects into a cam groove 533, formed in a disk 534, rigidly mounted on the shaft 491. The configuration of the cam groove 533 is such that the shaft 477 and the arms 529 are rocked counter clockwise as viewed in Figs. 21 and 24, just before the amount type carriers are rocked out of engagement with their actuating segments. The cam slots 528 in the arms 529 are formed so that when the arms are rocked counter clockwise the alining plates are raised into engagement with the teeth of the type carriers the right hand portion of the slots being circular so that the alining arms are retained in alining position during the movement of the type carriers to take impressions. After an impression has been taken from the waiters' type carriers and these carriers restored into mesh with their segment gears 426, the shaft 477 and arms 529 are rocked back to normal position by the cam groove 533 to move the alining arms out of alining position.

The detail strip 425 is carried on a frame 536 (Figs. 1, 3, 20 and 21) and passes, as shown in Figs. 1 and 21, from a supply roll 537 over a platen roller 538, over a guide roller 539, on to a storage roll 540, these rollers and rolls being mounted on rods projecting forwardly from the frame 536. The base 541 of the frame 536 has ways 542 opposite ways formed in tracks 543 mounted on the base of the machine and ball bearings are mounted in these ways so that the frame 536 may be shifted rearwardly and then returned to normal position at each operation of the machine. To shift the frame 536 differentially the differentially movable member 356, controlled by the transaction keys, (Fig. 3) has a cam slot 545 formed therein. Projecting into a slot 545 is a roller 546 mounted on the rear end of a lever 547, which is pivotally mounted at 548 to a bar 549 mounted at its rear end on the rod 238 and rigidly connected at its forward end to the frame 280. The downwardly and forwardly extending arm of the lever 547 is connected by a link 550 to the base 541 of the detail strip frame. The cam slot 545 is so shaped that the lever is rocked slightly clockwise and to the same extent when the latch 357 is tripped either by the zero stop pawl 117 or by the "food" key. When the "wine", "cigars" or "void" key is operated, the lever 547 is rocked one, two or three steps respectively further. This movement of the lever 547 is imparted to the detail strip frame so that the column corresponding to the transaction totalizer selected for operation has the item printed therein. As the differentially movable member 365 is always restored to normal position at each operation the detail strip will always be restored to normal position so that the clerk's numbers can be printed in the column near the rear edge of the strip.

For the purpose of alining the detail strip frame 536 in its moved and normal positions, a plate 552 (Figs. 3, 20 and 21), slidably mounted on pins projecting upwardly from the base of the machine and under the detail strip frame, is provided. The plate 552 has a vertical projection 554 for cooperating with a notch (Fig. 20) formed in a plate 556, when the frame is in normal position and with notches formed in a plate 558 when the frame is in its differentially set positions. The plates 556 and 558 are mounted on the under side of the base 541 of the frame 536. The plate 552 is centrally pivoted to the rear end of an arm 559, pivoted at its forward end to the base of the machine. A link 560 is pivoted to the arm 559 intermediate the ends of the latter and the left end of the link is loosely connected to the lower end of the downwardly extending arm of a bell crank lever 563 mounted on a rod 564 (Fig. 21). The outer end of the other arm of the bell crank lever 563 carries a roller which projects into a cam groove 566, which is formed in the front face of the disk 501 and so constructed as to move the plate 552 to the right to carry the vertical projection 554 to an intermediate position out of engagement with the notch in the plate 556 during the rearward shifting movement of the strip frame 536, and then to move the plate 552 still farther to the right after the frame has been positioned to carry the vertical projection 554 into engagement with one of the notches in the plate 558. Before return movement of the frame 536 is begun the cam groove 566 moves the plate 552 to the left to its intermediate position and then after the frame has reached normal position the plate 552 is moved to its normal position so that the projection 554 again enters the notch in the plate 556.

Only part of the mechanism for feeding the detail strip at each operation is shown in the drawings as this mechanism is old and well known in the art. In order to operate this mechanism, which includes a lever 569 and disk 567, mounted on the rod supporting the storage roll 540, a lever 568 (Fig. 21) is pivotally mounted on the frame 536 and carries at its right hand end a roller projecting into the bifurcated end of the lever 569. The left hand end of the lever 568 is curved and projects over the horizontal arm of a bell crank lever 570 pivoted to the frame 200. The vertical arm of the lever 570 is pivotally connected to a pitman 571, which at its rear end is forked over the shaft 491. As shown in Fig. 20ᵃ, the pitman 571 carries a roller projecting into a cam groove 572 formed in a disk 573 rigidly mounted on the shaft 491. The cam groove 572 is so designed as to rock the lever 569 through the levers 568 and 570 and the pitman 571 before the detail strip is shifted rearwardly out of normal position, the rocking movement of the lever 569 being employed to feed the detail strip, as is well known in the art.

The inking ribbon 576 through which the type carriers print on the detail strip, is fed in any desired manner from a spool 574 (Fig. 20) between the type carriers and the platen roll 538 onto a spool 575 (Fig. 21). As shown in Fig. 1, a glass plate 577 is carried by the hood for the printing mechanism and is above the detail strip so that the printed amounts may be viewed by the operator.

It has already been stated that the segment gears 426 controlled by the amount banks and the bank of transaction keys mesh with gears 430 rigidly mounted on the sleeve 431 which carries the amount type carriers 433 and the special type carrier 434. These amount carriers are provided for the purpose of printing the amount of the different classes of transactions entered in the totalizers on a waiter's slip (Fig. 33) the slip being presented to the guest for his inspection when the bill is paid. This slip before the machine is operated is slid through an opening 579 (Fig. 2) under the upper portion of the printer hood until it engages a right angled bar 580, (Figs. 1, 20 and 21). The bar 580 is rigid with a slide 581, adjustable on tracks 582, toward the front and rear of the machine, so that any form of slip may be used in this machine by adjusting the bar and slide accordingly.

A platen lever 583, which carries the platen near its right hand end, for carrying the waiter's slip into engagement with the type carriers, is loosely mounted on the rod 487 and is connected by adjustable screws to the arm 497. This arm, as above described, is rocked by the cam groove 489 through the arm 496 and as the platen lever is connected to this arm 497, the platen will be raised upon operation of the arm 497 to carry the waiter's slip against the type carriers 433 and 434 to make an impression thereon.

An alining frame 586 (Figs. 1 and 21) for the type carriers 433 and 434 is loosely mounted on a rod 587, and its arm projecting downwardly from its rear side is pivotally connected to a link 588, which at its right hand end is pivoted to an arm 589 fast on the shaft 477. When the shaft 477 is rocked counter clockwise, as above described, it will be seen that the alining frame 486 will be rocked clockwise to move its alining edge 585 into engagement with the teeth of the type carriers, and thereby aline the type carriers while a printing impression is being taken.

An ink ribbon 590 (Figs. 1 and 21) through which an impression is taken from the type carriers 433 and 434 on the waiter's slip is fed from a supply spool 591 over the type carriers, thence between the type carriers and the platen onto a spool 593 (Fig. 20) this ribbon being fed also in any desired manner.

A novel form of feeding mechanism is provided to advance the waiter's slip one space or line at each operation of the machine so that a series of amounts may be printed by successive operations of the machine. This mechanism comprises a feeding roller or disk 592 mounted to rotate on the rod 587 (Figs. 1, 26 and 27) and coöperating with a feeding disk 594 loosely mounted on an eccentric 595, which is rigid on a shaft 596, journaled in the frame 199. Rigidly mounted on the shaft 596 is a member 597 (Figs. 26, 27 and 30) which is pivotally connected to a pitman 598 forked over the shaft 491 (Fig. 26) and carrying a roller normally seated in a notch 599 formed in the disk 534. It can be seen from this that when the disk 534 is rotated the roller is moved out of the notch 599, thereby rotating the shaft 596 and eccentric 595 to raise the feeding disk 594 and thereby grip the waiter's slip between the feeding disks 592 and 594. Mounted within the disk 594 and loose on the eccentric is a member 601 on which are mounted rollers 602, operated by spring plungers 600, for frictionally connecting the member 601 and disk 594, as is well known in the art. The member 601 has a downwardly extending arm 603, having a slot 604 through which a pin, adjustable in a slot 605, formed in an arm 606, projects. The arm 606 is loosely mounted on a stud 607 and is pivotally connected to a pitman 608, which has a slot through which the shaft 491 passes, as shown in Fig. 1. The pitman 608 carries a pair of rollers 609 engaging opposite sides of a cam 610 fast on the shaft 491. The cam 610 is so constructed as to rock the member 601 clockwise before a printing impression is taken, but as the rollers 602 at this time, because of the clockwise movement of the member, do not frictionally connect the disk 594 with the member 601 the disk is not rotated. After a printing impression has been taken the member 601 is rocked counter clockwise by the cam 610 and as the rollers 602 at this time frictionally connect the member and the disk 594, the latter is rotated to feed the slip one space toward the left.

In order to prevent any clockwise rotation of the disk 594 during the clockwise movement of the member 601, a roller 612, operated by a spring plunger, is provided. This roller is carried by a plate 613, which at its upper end is loosely mounted on the eccentric 595 and its lower end is forked over the stud 607. It can be seen that when the eccentric is turned to elevate the disk 594, the plate 613 will be raised and the concentric arrangement of rollers 602 and 612 with regard to disk 594 is maintained, and when the member 601 is rocked clockwise the roller 612 frictionally connects the plate 613 with the disk 594 to prevent clockwise movement of the latter.

Near the end of the operation of the machine when the notch 599 (Fig. 26) arrives opposite the roller on the pitman 598, a spring 614, which is connected at one end to the member 597 and at its opposite end of a three armed lever 615 tends to rock the shaft 596 and eccentric 595 clockwise to normal position. The spring is prevented from rocking the eccentric and shaft in this manner by the engagement of the upper end of an upwardly extending arm of the three-armed lever 615, which is pivoted centrally to the printer frame, with a squared stud 616 carried by the member 597, and thereby the disk 594 is held in elevated position at the end of the operation of the machine. When the member 597 is rocked counter clockwise as above described the stud engages the upwardly extending arm of the lever 615, thereby rocking the latter clockwise against the action of its spring 614 until the lug 616 is raised above the end of the lever whereupon the spring 614 rocks the lever to normal position so that the upper end of the upwardly extending arm is under the lug. When the lug 616 is raised above the vertical arm of the lever 615 a pin 618 on the pitman 581 engages the downwardly extending arm of the lever 615 to insure movement of the vertical arm to its position under the lug 616. In order to permit the spring 614 to rock the member 597 and eccentric 595 to normal and thereby lower the feeding disk 594 to permit removal of the waiter's slip, a rearwardly extending arm 617 of the yoke member 197 engages over the horizontal arm of the lever 615. The yoked member 197, as already described, is rocked upon depression of the special key 211 (Fig. 20) to release the depressed waiter's keys and as the arm 617 extends over the horizontal arm of the lever 615, the rocking of the member 197 rocks the lever 615 clockwise to carry its vertically extending arm away from under the lug 616 whereupon the spring 614 rocks the member 597 to lower the feeding disk 594 and also restore the roller on pitman 598 in the notch 599 formed in the disk 534.

*Total and subtotal mechanism.*

As the tripped transfer devices are not restored to untripped positions before a succeeding operation, as above described, and in order to allow sufficient time for the selection of a desired transaction totalizer and the engagement of such totalizer or of the grand totalizer with their actuating racks on the members 283 and 286 when a total or subtotal is to be printed therefrom, the main drive shaft 50 is given two continuous rotations in total and subtotal printing operations instead of one as is the case in adding operations. During the first rotation of the shaft 50 the tripped transfer devices are restored to untripped position and one of the totalizers is moved into engagement with its racks on the differentially movable members and during the second rotation of the shaft the engaged totalizer elements control the extent of movement of the differentially movable members and hence the setting up of the type carriers to print a total or subtotal on the record strip.

To permit two rotations of the drive shaft 50 in total and subtotal printing operations the total lever 72 controls mechanism shown in Figs. 2 and 3ª, to prevent the restoration of the motor locking arm 64 (Fig. 41) to normal locking position until near the end of the second rotation. This mechanism includes a pitman 620 (Fig. 2) which at its forward end is pivotally connected to an arm 621 rigidly mounted on the shaft 217 and near its rear end the pitman is provided with a slot through which the stud 53 projects, the slot being provided to permit reciprocation of the pitman. At its rear end the pitman 620 carries a pin projecting into a slot 624 formed in the lower end of the link 157. A roller 625 on the pitman 620 is normally seated in a set off 626 in a cam groove 627 formed in a disk 628 loosely mounted on the stud 53. This disk 628 is normally not connected to the gear 52 but its left hand side is seated in a circular depressed portion 629 formed in the right hand face of the gear as shown in Figs. 2 and 3ª. A plate 630 (Figs. 2, 3ª and 38) is slidably mounted in a groove 631 formed in the left hand face of the disk 628 the plate having a slot through which the stud 53 projects. The forward end of the plate 630 is provided with a lug 633 normally projecting toward the right between two pins 634 projecting laterally from the left hand side of the pitman 620. When the machine is in condition for adding one of two set-offs 635 of the circular depressed portion 629 of the gear 52 is normally opposite the forward end of the plate 630. From this construction, it can be seen that when the total lever is moved from its adding position which results in the rocking of the shaft 217, as already described, the pitman 620 will be drawn forwardly to carry the forward end of the plate 630 into engagement with one of the set-offs 635, to move the roller 625 forwardly out of the set-off 626 and into the cam groove 627 and to rock the link 157 forwardly to carry the set-off 182 of the slot 180 away from the roller 181. As the forward end of the plate 630 is seated in one of the set-offs 635 when the lever is in one of its total or subtotal positions, the disk 628 upon operation of the machine, will rotate with the gear 52. As can be seen in Fig. 38, the lower forward end of the slot in the plate 630 engages the lower flattened portion of the stud 53, when the total lever is in adding position, so that the plate 630 and therefore the cam disk 628 are locked against rotation. When the plate 630 is drawn forwardly, however, the rear circular portion of the slot encircles the stud 53, whereby the rotation of the plate 630 and disk 628 with the gear 52 is permitted.

The cam groove 627 is so shaped that upon rotation of the disk 628 the pitman 620 is moved still farther forwardly to rock the link 157 further forwardly so that when the arm 183 is lowered during the first rotation of the shaft 50, the roller 181 will move idly in the rear elongated portion of the slot 180. Near the end of the second rotation of the shaft 50, that is, near the end of the first rotation of the gear 52, the pitman 620 is restored to the position to which it was adjusted by the total lever so that when the arm 183 is rocked downwardly the second time the roller 181 engages a shoulder 636 in the slot 180 to lower the link 157 sufficiently to rock the lever 153 and shaft 100 counter clockwise slightly past normal position, but not as far past normal position as in adding operations. When the lever 153 in this manner is moved past normal position the locking arm 64 (Fig. 41) will be restored to normal locking engagement through arm 67, shaft 146, arm 147 and lever 150, for the purpose of stopping the operation of the machine as in adding operations. It is desired to rock the shaft 100 slightly past normal position so that the stud 161 (Figs. 3 and 36) is carried to the rear of the arm 194 to prevent an immediate second operation of the machine when the total lever is in its uppermost or lowest position, as the arm 194 is raised in front of the stud 161 and when the total lever is moved, the spring 126 moves the detent 122 and sleeve 131 to lower the arm 163 in front of this pin. In adding operations the shaft 100 is rocked further past normal position than in total and subtotal printing operations for the purpose of releasing the operated amount keys but as no amount keys are operated in total and subtotal printing operations, it is not necessary to rock the shaft to the same extent.

To print a subtotal from the grand totalizer or from the desired transaction totalizer, the totalizer is moved into engagement with its actuating racks on the differentially movable members 283 and 286 near the end of the first rotation of the shaft 50 and is retained in engagement therewith while the differentially movable members are rocked upwardly and differentially under the control of the totalizer elements and then returned to normal position, the disengagement of the totalizer from the differentially movable member being effected near the end of the second rotation of the shaft. In total printing operations the desired totalizer is moved into engagement with the differentially movable members at the same time as in subtotaling operations but as the totalizer is to be left at zero, it is disengaged before the members begin their return movement to normal position. The operation of the totalizer elements and their control over the differentially movable members in such operations are fully described in the above mentioned Chryst application and, therefore, will be described but briefly here. The novel mechanism for controlling the time of engagement of the totalizer with the differentially movable members will be described later.

In total and subtotal printing operations movement of the differentially movable members 283 and 286, and consequently the setting of the corresponding type carriers is determined by the long teeth 316 on the pinions of the transaction totalizer or by the long teeth on the adding pinions 360 of the grand totalizer. As the zero stop pawl 117 (Fig. 3) trips the latch 357 when a total or subtotal is printed from the grand totalizer the cam member 345 (Fig. 16) is adjusted so that the cam groove 379 will shift the grand totalizer to move its adding pinions 360 opposite the actuating racks 285 if the subtracting pinions 361 are in such position at the beginning of the operation of the machine. Although a transaction totalizer is not moved into engagement when a total or subtotal is taken from the grand totalizer, yet it is necessary to release the machine, during such operation, by the movement of the total lever rather than transaction keys, as depression of the "void" key would cause the subtracting pinions of the grand totalizer instead of the adding pinions to be engaged for operation. These long teeth for the grand totalizer, when the pinions arrive at zero, engage pawls 638 (Fig. 4) which are loosely mounted on a shaft 639. The forwardly extending arms of the pawls 638 are pivoted to links 640, which together with link 641, pivoted at their lower ends to levers 642 form toggles. The shaft 639 loosely carries arms 643, which at their lower ends have notches engaging over pins pivotally connecting the pairs of links 640 and 641. The arms 643 are rocked clockwise in the manner to be presently described when the totalizer is moved into engagement with its actuating racks whereupon the pawls 638 are moved into the path of movement of the teeth 316. When the totalizer pinion arrives at zero, its long tooth 316 engages its appropriate pawl 638 to rock the latter counter-clockwise and thereby push down on the links 640 and 641. Thereby the arm 642 is swung clockwise causing a flat sided pin 644 thereon to engage one of a series of teeth 645 cut in a plate 646. The plates 646, one for each member 283 have forwardly extending arms provided with notches engaging over pins 647 carried by the bell crank levers 290 supporting the latches 289, mounted on the members 283. By this arrangement, when the totalizer pinion arrives at zero and its respective plate is stopped by the pin 644, the first thing that occurs is a slight relative movement between the plate 646 and the differentially movable member thus causing the lever 290 to rock counter-clockwise and disengage the latch 289 from the driving segment 288, as fully described in the aforesaid Chryst application. The mechanism controlled by the transaction totalizers for stopping the plates 646 is identical to that for the grand totalizer and hence the corresponding parts are given like reference numbers.

It will be remembered that the differentially movable members 286 (Fig. 5) controlled by the two totalizer pinions of highest order are connected by the rods 297 to the arms 296 (Figs. 8, 9 and 10) carrying latches 292, which are always tripped in adding operations by the zero stop pawls 305. The beams 457, controlled by the units and tens banks of waiters' keys are connected to the arms 459, as already described. As the waiters' keys are not operated in total printing operations, these two type carriers controlled by the units and tens banks of waiters' keys in adding operations are used to print the amount standing on the two totalizer elements of highest denomination in total and subtotal printing operations. To accomplish this result the two latches 292 and 460, adjacent each of these banks of keys and carried respectively by arms 296 and 459, must be disengaged from their common driving segment 288 at the same time under the control of one of the totalizer pinions of highest denominations so that the forward end of the beam 457 will be moved differentially with the differentially movable member 286. To this end the vertical arm of each bell crank lever 462 carries a pin 649, engaging the rear edge of a vertical finger 650 on the vertical arm of the bell crank lever 293, supporting the forward end of the latch 292. A bell crank lever 651 is pivoted to the forward end of the arm 459 by the pivot pin on which the lever is mounted, and its forwardly extending arm carries a pin 652, projecting through a notch (Fig. 5) formed in the forward end of an arm 653, of a plate 654, which is like plates 646 in construction and is mounted independently of the differentially movable member 286 on the rod 282. As the zero stop pawls 305 and 468 are moved forwardly out of their normally operative positions in total and subtotal printing operations just before the driving segments begin their upward movement, as will be presently described, it will be seen that the latches 292 and 460 and therefore the differentially movable member 286 and the arm 459 will be moved together by their common driving segment 288, until movement of the plate 654 is stopped when the corresponding totalizer pinion arrives at zero, the plates 654 being stopped by the same method as are the plates 646 when their corresponding pinions arrive at zero. Slight continued movement of the arm 459 with arm 296, after the plate 654 has been stopped causes the lever 651 to rock counter clockwise and as the vertical arm of the lever 651 is bifurcated over the pivot pin 656 on the latch 460 the latter is drawn forwardly to disengage the arm 459 from the driving segment. Upon this forward movement of the latch 460, the pin 649, through its engagement with the finger 650, on the bell crank lever 293 draws the latch 292 forwardly at the same time to disconnect the member 286 from its driving segment. From this description, it can be seen that the latches 292 and 460 are both drawn forward at the same time and therefore in total and subtotal printing operations the positioning of the beam 457 is under the control of one of the totalizer pinions of highest denomination. It is understood, of course, that the units and tens waiters' type carriers are moved differentially, through the same connections by which they are moved in adding operations, so that the amounts on the two totalizer pinions of highest order are set up on their type carriers under the control of the members 286, which in turn are controlled by the totalizer elements.

During the first rotation of the shaft 50 in total and subtotal printing operations, the zero stop pawls for all of the banks of amount and waiters' keys are in operative position so that all of the differentially movable members 283 and 286 are stopped in zero position. In order to move all of these zero stop pawls out of effective position before the differentially movable members 283 and 286 begin their up-stroke during the second rotation of the shaft 50, the rod 261 by rocking the shaft 217, is swung downward sufficiently to engage the tails 93 (Figs. 4 and 12) of the pawls 88 for the banks of amount keys, tails 657 of the pawls 305, and tails 658 of pawls 468 (Figs. 9, 10 and 12) adjacent the units and tens banks of waiters' keys and rock these pawls forwardly out of operative position so that the differentially movable members may be controlled by the totalizer pinions. As the arm 262 (Fig. 12) carrying the stud 263, is fast to the shaft 217, the stud 263 will be lowered at the same time to move a zero stop pawl, which is operated by the hundreds bank of waiters' keys in adding operations and like pawls 88, out of operative position. It has already been described how the shaft 217 is rocked to swing the rod 261 downwardly to lock the keys against operation when the total lever is out of adding position. It has also been described how the cam 628 (Fig. 2) through the pitman 620 and arms 621 rocks the shaft 217 still further clockwise during the first rotation of the shaft 50. This further rocking of the shaft by the cam 628 is sufficient to lower the rod 261 and stud 263 far enough to rock the above mentioned zero stop pawls out of operative position.

The mechanism under the control of the total lever 72 for preparing the machine for printing a total or subtotal from the grand totalizer or a selected transaction totalizer will now be described. It was previously stated that the roller 402 (Fig. 32) on the link 375 for rocking the grand totalizer into and out of engagement with its actuating racks normally engages in the hook 401 when the machine is in condition for adding and that the roller 404 on the link 340 for moving the desired transaction totalizer into and out of engagement with the actuating racks at the same time rests in the hook 403 of the plate 400. This plate 400 is rocked clockwise and then counter clockwise to engage the grand totalizer and the transaction totalizer with the actuating racks by the reciprocation of the plate 407 effected by the pairs of cams 416 and 417 through the lever 412, as above described. The link 375 carries a pin 659 (Figs. 31, 34, 37 and 39) which normally rests in the upper end of a slot 660 formed in an arm 661, this end being narrower than the lower portion so that the pin 659 cannot normally move laterally therein. The arm 661 is pivoted at its lower end to the frame 237 and intermediate its ends carries a roller 662 projecting into a slot 663 formed in the total lever 72 the roller being in the center of the slot when the lever is in adding position as shown in Fig. 31. The slot 663 is so formed that when the lever is shifted one step to either side of adding position the arm 661 will be rocked forwardly, thereby rocking the lower end of the link 375 forwardly to carry the roller 402 out of the hook 401, as shown in Fig. 37. With the roller 402 in this position it can be seen that when the plate 401 is rocked the link 375 will not be reciprocated and therefore the grand totalizer will not be engaged with its actuating racks, it being essential, when the lever is in one of these positions, to engage only the desired transaction totalizer. The ends of the slot 663, however, are so formed that when the totalizer lever 72 is moved to its uppermost or lowest position to control the machine for printing a total or subtotal respectively from the grand totalizer, the arm 661 is moved to its normal position so that the roller 402 again rests in the hook 401, as shown in Fig. 40.

In order to rock the arms 643 to move the pawls 638 into operative position at the same time the grand totalizer is engaged with the actuating racks in total and subtotal printing operations, small toothed sectors 665 (Fig. 4), which are loose on the shaft 639, but rigid with their corresponding arms 643, mesh with toothed members 666, fast on the shaft 132. The shaft 132, as shown in Figs. 31, 34 and 39, has an arm 667, rigidly mounted thereon, the forward end of the arm being connected pivotally to a link 668. The lower end of the link 668 carries a pin 669 projecting into a circular slot 670 formed in the arm 249, which as already described, is rocked forwardly by the slot 248 when the total lever is moved to its uppermost or lowest position. This forward movement of the arm 249 rocks the link 668 so that the pin 669, which also projects beyond the right side of the link 668, is moved into a notch 671 formed in a small plate 672, rigidly mounted on the plate 400. From the above description, it can be seen that whenever the plate 400 is rocked to engage the grand totalizer the link 668 will be drawn downwardly to rock the shaft 132 and thereby rock the arms 643 through the members 666 and sectors 665 (Fig. 4), to move the pawls 638 into position to be engaged by the long teeth 316 on the adding pinions 360 of the grand totalizer. When the total lever is in its adding position or one step above or below such position, the pin 669, as shown in Fig. 32, rests in a notch 673 (best shown in Fig. 40) formed in the frame 237 to lock the link 668 against reciprocation.

The link 340 for the transaction totalizers (Figs. 31, 34 and 39) carries a pin 674, which normally rests in the rear end of a slot 675, which is similar to the slot 660 and formed in an arm 676 loosely pivoted at its forward end to the frame 237. The arm 676, intermediate its ends, carries a roller 677, which projects into the center of a slot 678 when the total lever is in adding position, as shown in Fig. 31. The middle portion of the slot 678 is circular so that movement of the total lever to its position either one step above or one step below adding position, does not move the arm 676 and therefore the roller 404 on the link 403 is retained in engagement with the hook 403 to effect engagement of the selected transaction totalizer by the operation of the plate 400. At this time the roller 662 is intermediate one end and the center of the slot 663, so that the grand totalizer will not be engaged as above described. When, however, the lever is in its uppermost or lowest positions in which positions the grand totalizer is engaged, upon operation of the machine, the pin 677 is in one end or the other of the slot 678, the ends being formed to rock the arm 676 upwardly and thereby move the roller 404 out of the hook 403, as shown in Fig. 40, so that a transaction totalizer will not be moved in engagement when the grand totalizer is moved into engagement. When the link 375 is rocked forwardly, the roller 402 moves into the horizontal portion of the slot 419 and when the link 340 is rocked upwardly, its roller 404 enters the vertical portion of the slot 420 and thereby the grand totalizer is locked against engagement when a total or subtotal is to be taken from the transaction totalizer and the transaction totalizers are locked against engagement when a total or subtotal is to be taken from the grand totalizer. In order to rock the pawls 638 for the transaction totalizers into position to be engaged by the long teeth 316, a shaft 680 (Fig. 4) which carries toothed members 666 engaging toothed sectors 665 for the transaction totalizers carries an arm 681 (Figs. 31, 32, 34, 37 and 39). The arm 681, at its upper end is pivotally connected to a link 682 carrying a pin 683 at its forward end. The pin 683 projects into a slot 684 formed in an arm 685 pivoted at its forward end to the frame 237. The arm 685 intermediate its ends carries a roller projecting into a slot 687, formed in the total lever. This slot 687 is so formed that when the total lever is moved one step above or below its adding position the arm 685 will be rocked upwardly to carry the pin 683 into a notch 688 formed in a plate 689 rigidly mounted on the plate 400. Therefore, when the plate 400 is operated to move a transaction totalizer into engagement with its actuating racks the pawls 638 for these transaction totalizers will be moved into operative position at the same time. When the lever 72 is in its uppermost or lowest positions the roller on the arm 685 is in one of the ends of the slot, these ends being designed to move the roller to normal so that the pin 683 will be moved out of the notch 688 into engagement with a notch 686, (best shown in Figs. 37 and 40) in the frame 237. Therefore, the shaft 680 will be rocked to move the pawls 638 into position to be engaged by the long teeth on the selected transaction totalizer elements only in operations in which a total or subtotal is taken from a transaction totalizer.

From the above description, it can be seen that in operations in which a subtotal or total is to be taken from the grand totalizer the grand totalizer only is moved into engagement with the differentially movable members and the pawls 638 for this totalizer at the same time are rocked into position to be engaged by the long teeth on the adding pinions 360. When a total or subtotal is to be taken from a transaction totalizer, only the desired transaction totalizer is moved into engagement with the differentially movable members and the pawls 638 for the transaction totalizers are moved at the same time into position to be engaged by the long teeth on the selected totalizer elements.

The total lever also controls the time of engagement of the totalizer to be operated in total and subtotal printing operations.

As already stated the engagement of the totalizer is effected by the movement of the plate 400, which is operated by the reciprocation of the plate 407. The member 409 (Figs. 32, 37 and 40) supporting the forward end of the plate 407, is pivotally mounted on a pin 691 which projects from the frame 237 and the plate is retained in the position shown in Fig. 32 when the total lever is in adding position by a pin 692, which projects from a link 693 into a slot 694 formed in the member 409. The pin 692 also projects beyond the right hand side of the link 693 into a slot 695 (Figs. 31, 32, 34 and 39) formed in an arm 696 also pivoted at 691. The arm 696 carries a roller 697 projecting into a slot 698 formed in the total lever, the roller 697 being in the upper end of the lower circular portion of the slot when the total lever is in adding position. The link 693, at its lower end is pivotally mounted on the rear end of the arm 231, above described. As the arm 231 is not rocked in an adding operation, the member 409 is retained in the position shown in Fig. 32 so that during the complete reciprocatory movement of the plate 407 the pin 405 on the plate 400 will remain in the notch 406 whereby during clockwise movement (as viewed in Fig. 32) of the plate 400 the grand totalizer and the selected transaction totalizer will be engaged by the actuating racks and during the counter clockwise movement of the plate to normal position these totalizers will be moved out of engagement as has been described fully above.

When the total lever is moved upwardly from its central position to either of its subtotal positions, the roller 697 (Fig. 34) remains in the lower circular portion of the slot 698 and therefore the arm 696 is not rocked but movement of the total lever from its central position rocks the arm 231 as before described, and thereby the pin 692 is moved to the lower end of the upper vertical portion of the slot 694, as shown in Fig. 37. This movement of the pin 692 does not move the member 409 out of normal position so that when the plate 407 is drawn rearwardly during the first rotation of the shaft 50, the plate 400 will be rocked as in an adding operation to engage the selected transaction totalizer if the lever is moved one step above normal position or to engage the grand totalizer if the lever is moved to its uppermost position. After the plate 407 has been drawn rearwardly and before its return movement is begun, the arm 231 is rocked still farther downward by the cam 628 (Fig. 2) as described above, the pin 692 thereby being moved into engagement with the lower end of the slot 694. This slot 694 is so formed that during this downward movement of the pin the plate 409 is rocked clockwise as viewed in Fig. 37, and thereby the plate 407 is rocked downwardly about its pivotal connection with the lever 412 to disengage the notch 406 from the pin 405. The member 409 is retained in this position during the first forward movement of the plate 407 and during the rearward movement of the plate 407 at the next rotation of the shaft 50. After the plate 407 has been moved rearwardly during the second rotation of the shaft the arm 231 is raised to the position to which it was adjusted by the total lever, thereby raising the pin 692 to the position shown in Fig. 37, so that the plate 409 is rocked to normal position, this movement of the member 409 serving to rock the plate 407 upwardly to engage again the notch 406 with the pin 405. It can, therefore, be seen that during the forward movement of the plate 407, during the second rotation of the shaft 50, the plate 400 will be rocked to disengage the totalizer from which a subtotal is printed. As the second forward movement of the plate 407 does not occur until after the differentially movable members have been restored to normal position the amount standing on the totalizer at the beginning of the operation of the machine will be restored thereon.

When the total lever is moved downwardly from its adding position to either of its total positions, the roller 697 (Fig. 39) moves into the upper circular portion of the slot 698 rocking the arm 696 rearwardly about its pivot. This movement of the arm 696 through the pin 692, which is moved to the position shown in Fig. 40, rocks the member 409 clockwise swinging the plate 407 downwardly to a central position so that the notch 406 is carried away from its pin 405. During the first movement of the plate 407 to its rear position it moves idly. While the plate 407 is in this rear position the pin 692 is lowered in the slot 694 as in subtotal printing operations and the member 609 is thereby rocked still further clockwise to lower the plate 407 past its central position and in the lowered position of the plate 407 a notch 700 formed in its lower side engages a pin 701 projecting from the plate 400. It can be seen that with the plate 407 in this lowered position its forward movement will rock the plate 400 clockwise to engage either the selected transaction totalizer or the grand totalizer with the differentially movable members. While the plate 407 is in its forward position the differentially movable members are moved upwardly under the control of totalizer elements and then before the members begin their downward movement the plate 407 is moved rearwardly to disengage the totalizer from the members and thereby leave the totalizer pinions in zero position. After the totalizer is disengaged and before the plate 407 begins its second forward movement the arm 231 is raised, thereby moving the pin 692 into the position shown in Fig. 40 to raise the plate 407 to its central position. Therefore, when the plate 407 is moved forwardly the second time the plate 400 remains in normal position.

In order to aline the plate 400 while it is at rest at the end of its clockwise movement (Fig. 32) during subtotal printing operations and to aline the plate in its normal position in total printing operations, a lever 702 is centrally pivoted to the frame 237 and at its forward end carries a pin 703 projecting into a slot 704, formed in the lower end of the member 409. At its rear end the lever 702 carries a pin 705 for engaging in either one of the two notches 706 formed in plate 400. The cam slot 704 is so shaped that when the member 409 is rocked clockwise during subtotal printing operations by the lowering of the pin 692 in the slot 694, the pin 703 moves into the center of the slot to raise the pin 705 into engagement with the rear notch 706, the plate 400 at this time being at rest at the end of its clockwise movement. When the member 409 is moved counter clockwise to its normal position by the raising of the pin 692 in the slot 694, the plate 407 is raised to engage the pin 405 with the notch 406, and the alining lever 702 is returned to normal position to lower the pin 705 out of engagement with the rear notch 706. When the total lever 72 is moved downwardly to one of its total positions the plate 409 is rocked to the position shown in Fig. 40, as above described, thereby rocking the lever 702 so that the pin 705 engages in the forward notch 706 to aline the plate 400 during the first rearward movement of the plate 407. The further clockwise movement of the member 409, during the operation of the machine moves the pin 703 into the rear end of the slot 704, thereby rocking the lever 702 to normal position to permit clockwise movement of the plate 400 by the forward movement of the plate 407. The clockwise movement of the member 409 to the position to which it was positioned by the lever 72, again rocks the lever 702 to raise the pin 705 into engagement with the forward notch 706.

In total and subtotal printing operations, the type carrier connections shown in Figs. 19 and 20, and above described, are adjusted as in adding operations. During the first rotation of the shaft 50 all of the type carriers except the special type carrier 434, when a total or subtotal is to be printed from a transaction totalizer, are adjusted to zero position because all of the zero stop pawls for the differential units controlling these type carriers remain in operative position. During the second rotation of the shaft 50 all of the zero stop pawls, except that for the transaction bank, are moved out of operative position and therefore all of the amount type carriers and the units and tens waiters' type carriers are adjusted to the positions representing the total on the totalizer at the beginning of the operation of the machine.

As all of the type carriers are adjusted to zero position during the first rotation of the shaft a series of zeros will be printed as shown in Fig. 28, and as the detail strip is fed at each rotation of the shaft 50, the total will be printed under the series of zeros during the second rotation of the shaft. As two of the waiters' type carriers 424 are employed to print the amounts on the two totalizer elements of highest order, it is desirable to rock the amount type carriers 423 and the waiters' type carriers 424 at the same time to print the entire total in the column appropriate to the totalizer selected for operation, totals and subtotals from the grand totalizer being printed in the left hand column. The mechanism for controlling this simultaneous operation of the type carriers will now be described. This mechanism comprises a cam disk 709 (Figs. 12 and 14) rigidly mounted on the shaft 217. Fingers of a member 710, loosely mounted on the rod 239, engage the periphery of the cam disk 709, the disk being so formed that when the shaft 217 is rocked by movement of the total lever out of adding position the member 710 will be rocked counter clockwise, as viewed in Fig. 14. A lever 711, pivotally mounted on the left hand side frame of the machine, engages at its rear end in a notch formed in the member 711, and at its forward end projects into the left hand bifurcated end of the lever 482 (Fig. 22) above described. It can be seen that when the member 710 is rocked as just described, the lever 482 will be rocked clockwise thereby lowering the rear end of the link 479. In this manner the narrow central portion of the slot 484, formed in the link 479, is moved so that a pin 712 projects therein. This pin 712 projects from the arm 496 which, as above described, is rocked by the cam groove 489 to carry the amount type carriers into engagement with the detail strip while the latter is in its differentially moved position in adding operations. When the link 479 is moved downwardly so that the pin 712 projects into the central portion of the slot 484 the pin 485 on the arm 486 projects into the upper enlarged portion of the slot 484 so that upon rocking movement of the arm 486 the pin 485 will move idly. When the machine is in condition for adding the pin 712 moves idly in the lower enlarged portion of the slot 484. In total and subtotal printing operations, however, the rocking movement of the arm 496, because of the pin 712 projecting into the central narrow portion of the slot 484, moves the link 479 to the right at the same time that the link 502 is moved to the right whereby both the waiters' type carriers and the amount type carriers are rocked to make an impression on the detail strip at the same time.

When a total or subtotal from the grand totalizer is to be printed no transaction key is operated and, therefore, the zero stop pawl 117 (Fig. 3) for the bank of transaction keys disconnects the differentially movable member 356 from its driving segment 288 when the member arrives at zero position, the cam groove 545 being constructed so that the detail strip frame is shifted very slightly toward the rear of the machine during this movement of the member 356. It is understood, of course, that this zero stop pawl 117 is not disabled in an operation of the machine in which a total or subtotal is printed from the grand totalizer, as the rod 261 does not coöperate therewith.

The type carrier, shown in Fig. 29, and controlled by the hundreds bank of waiters' keys in adding operations, carries special type, as above mentioned, to print characters, as shown in Fig. 8, designating whether the amount printed in total and subtotal printing operations is a total or subtotal and whether it has been taken from a transaction totalizer or the grand totalizer. To control movement of this type carrier to print the proper character in total and subtotal printing operations, the latch mechanism which is controlled by the hundreds bank of waiters' keys, in adding operations, is controlled by a stepped plate 714 (Figs. 7 and 11) which is adjusted by the total lever. The plate 714 is rigidly connected to a short sleeve 715 (Fig. 11) supported by the shaft 132 and the sleeve is also rigid with an arm 716. The arm 716 is connected by a link 717 to an arm 718 rigidly mounted on a shaft 719. The shaft 719, near its right hand end, as shown in Figs. 31, 34 and 39, rigidly carries an arm 720, which at its lower end is pivotally connected to the link 721, the latter being pivoted at its forward end to the total lever. It can be seen from this description that when the total lever is shifted to one of its total or subtotal positions, the plate 714 (Fig. 7) will be positioned accordingly. The appropriate step on the plate 714 being moved in this manner into position to operate the latch mechanism, which is controlled by the waiters' keys in the hundreds bank in adding operations, the waiters' hundred type carrier (Fig. 29) is positioned under the control of this plate and through the same connections (Figs. 19 and 20) in total and subtotal printing operations as in adding operations.

In order to prevent unauthorized persons operating the total lever 72 to effect a total or subtotal printing operation of the machine, two locks 725 (Fig. 2) mounted on the cabinet of the machine and beside the slot 222 (Fig. 1) for the total lever, are provided. When the locks are in locking position, one of the bolts is above the handle of the total lever, when the latter is in adding position, and the other bolt is below the handle when the lever is in such position, to prevent movement of the lever. The bolts of the locks are operated by keys insertible into the key barrels 726 (Fig. 1).

*Operation.*

To enter an item in the machine, it is necessary that the total lever be in adding position. With the lever in this position, the waiters' keys representing the number of the waiter, and the amount keys, corresponding to the amount to be entered, are first depressed. Depression of a waiter's key rocks the yoke 170, through the detent 102 (Fig. 7) to raise its arm 175 from in front of the stud 176 to permit the rocking of the shaft 100 by the spring 158 (Fig. 2) when the arm 163 is moved away from in front of the stud 161. Depression of a transaction key moves the detent 122 downwardly to carry the arm 163 (Figs. 3 and 36) away from in front of the stud 161 on the arm 162, to permit the spring 158 (Fig. 2) to rock the lever 153 and thereby effect the release of the machine. The operation of the amount keys (Fig. 4) moves the corresponding zero stop pawls 88 out of operative position and operation of the two detents 102 for the units and tens banks of waiters' keys, moves the zero stop pawls 468 out of operative relation with the latches 460, but in adding operations the zero stop pawls 305 are always in position to operate the latches 292 when the differentially movable members 286 reach zero position. During the up-stroke of the operating segments the shifting cam member 345 (Figs. 16, 17 and 18) is differentially positioned under the control of the transaction keys to shift the selected transaction totalizer into operative relation with the differentially movable members 283 and to move the subtracting or adding elements of the grand totalizer into operative relation with these members, depending upon whether the "void" totalizer, or the other transaction totalizer is to be operated. The type carriers are differentially positioned through connections shown in Figs. 19 and 20, while the forward ends of the beams 354, 446, 457 and 473 for the corresponding banks of keys are in their differentially set positions.

Movement of the differentially movable member 356 (Fig. 3) is controlled by the transaction keys and this member differentially shifts the detail strip through the lever 547 and link 550 so that the column corresponding to the transaction totalizer selected will be printed in by the amount type carriers. While the detail strip is in its differentially moved position the amount type carriers are rocked by the cam groove 500 through its connections shown in Figs. 21 and 22, to print the amount of the item thereon in the selected column and after the detail strip is restored to normal position the waiters' type carriers 423 are rocked by the cam groove 489, through its connections to print the waiter's number in the column near the rear edge of the detail strip. When the arm 497 is operated by the cam groove 489, the platen lever 583 (Fig. 21), which is connected to the arm 497, is operated to make an impression on the waiter's slip, and then after an impression is taken on the waiter's slip, the slip is fed to the left one space or line by the operation of the frictional feed device shown in Figs. 26, 27 and 30.

After the differentially movable members 283 have been positioned and before they begin their return movement to normal position the plate 407 is drawn rearwardly by the pair of cams 416 and 417 (Fig. 32) through the lever 412 and thereby rocks the plate 400 clockwise because of the engagement of the pin 405 in the notch 406. As the roller 402 on the link 375 rests in the hook 401 and the roller 404 rests in the hook 403, during this clockwise movement of the plate 400, the grand totalizer and the selected transaction totalizer are moved into engagement with the actuating racks 284 and 285 respectively. After the members 283 have been returned to normal position the plate 400 is rocked clockwise back to normal position to disengage the totalizers, which are actuated during the return movement of the members 283.

Movement of the total lever from its adding position to any one of its four other positions rocks the shaft 217 through the lever 234 (Fig. 34) and the arm 231. This movement of the shaft 217, through the arm 621 (Fig. 2) draws the pitman 620 forwardly to bring the roller 625 into the cam groove 627, to move the forward end of the plate 630 into engagement with one of the set-offs 635 in the gear 52, and to rock the link 157 to carry the set-off 182 of the slot 180 away from the pin 181. In order to prevent the grand totalizer from being moved into engagement with its actuating racks when the total lever is positioned to control the machine for printing a total or subtotal from a transaction totalizer, the arm 661 (Fig. 34) is rocked by the cam slot 663 to move the roller 402 out of engagement with the hook 401. To release the machine after the total lever has been so positioned, it is only necessary to press a transaction key to release the machine, the yoke member 170 (Fig. 7) having been moved by the link 226 to carry the arm 175 away from in front of the stud 176, when the shaft 217 is rocked by the movement of the total lever. During the first rotation of the drive shaft 50 in a total or subtotal printing operation, the shaft 217 is rocked still farther by the cam groove 627 (Fig. 2) through the pitman 620 and arm 621 to lower the rod 261 and the stud 263 (Fig. 12) for the purpose of moving all the zero stop pawls except that for the bank of transaction keys, out of operative position, the movement of the pawls being effected after they have operated their corresponding latch mechanisms during the first rotation of the shaft 50. The zero stop pawl for the bank of transaction keys is moved out of operative position upon depression of the key when a total or subtotal is printed from the transaction totalizer and this pawl operates its corresponding latch mechanism when a total or subtotal is printed from the grand totalizer as in such operations no key is operated. During the first rotation of the shaft 50 the desired transaction totalizer is shifted opposite its actuating racks by the totalizer shifting cam 345. If the total lever has been moved one step above normal position, as shown in Figs. 34 and 37 the member 409 is not moved thereby and hence the notch 406 in the plate 407 remains in engagement with the pin 405 on the plate 400. Therefore, when the plate 400 is carried rearwardly during the first rotation of the shaft 50, the plate 400 is rocked counterclockwise and as the roller 403 rests in the hook 404 the desired transaction totalizer is moved into engagement with its actuating racks. After the totalizer is so engaged the pin 692 is lowered in the cam groove 694 by the rocking of the shaft 217, and thereby the member 409 is rocked clockwise, as viewed in Fig. 37 to rock the plate 407 downwardly, this movement being effective to move the notch 406 away from the stud 405. The member 409 is retained in its moved position during the first forward movement of the plate 407 and rearward movement of the latter during the next rotation of the shaft 50, and during this time the differentially movable members 283 are moved upwardly under the control of the totalizer elements and then returned to normal position to return the totalizer elements to their original positions. While the plate 407 is in its rearmost position, during the second rotation of the shaft 50 the pin 692 is raised in the slot 694 to rock the member 409 to its normal position and thereby raise the plate 407 so that the notch 406 again engages the pin 405. Then, upon return forward movement of the plate 407, the plate 400 is rocked to normal position to move the operated transaction totalizer out of engagement with its actuating racks.

When the total lever is moved one step below its central position the arm 696 is rocked clockwise as viewed in Fig. 40 by the movement of the roller 697 into the upper circular portion of a cam slot 698, and through the pin 692, the member 409 is rocked clockwise with the arm 696. This movement of the member 409 rocks the plate 407 downwardly to its central position, thereby moving the notch 406 away from the pin 405, so that during the first rearward movement of the plate 407 the plate 400 will not be moved. While the plate 407 is in its rearmost position the pin 692 is lowered in the slot 694 by the rocking of the shaft 217 and the plate 407 is thereby rocked below its central position so that its notch 700 is moved into engagement with the pin 701. Then, during the first forward movement of the plate 407, the plate 400 is rocked to engage the selected transaction totalizers so that the differentially movable members 283 and 286 turn the totalizer elements to zero. After the totalizer elements are so turned to zero and before the differentially movable members begin their return movement to normal position, the plate 407 is moved rearwardly the second time and as the notch 700 remains in engagement with the pin 701 the plate 400 is returned to normal position to disengage the transaction totalizer. Before the plate 407 begins its second forward movement, the pin 692 is raised in the slot 694 thereby rocking the member 409 to the position to which it was positioned by the total lever and as this movement of the member 409 raises the plate 407, the latter moves forwardly without again rocking the plate 400. To take a total or subtotal from the grand totalizer, it is only necessary to move the total lever to its uppermost or lowest position. When the total lever is moved to one of these two positions, the sleeve 251 (Fig. 3) is rocked by the cam groove 248 (Fig. 39) through the link 246 and thereupon the rod 254 (Fig. 3) carried by the arms 253 on the sleeve, engages a projection 257 on the detent 122 and thereby lowers the detent to release the machine.

The movement of the total lever to either of these positions also rocks the arm 676 (Figs. 31 and 39) to carry the roller 404 on the link 340 out of the hook 403 (Fig. 40) and the slot 663 is so formed that the arm 661 is moved to normal position so that the roller 402 on the link 375 rests on the hook 401. Therefore, operation of the plate 400 moves the link 375 to engage the grand totalizer with its actuating racks but the link 340 is not operated and therefore a transaction totalizer is not moved into engagement with its actuating racks. The pin 669, on a link 668, is also moved in the notch 671 through the rocking of the arm 249 so that the pawls 638 for the grand totalizer are moved into operative position when the grand totalizer is moved into engagement with its actuating racks. The slot 687, at the same time rocks the arm 685 to normal position so that the pin 683 on the link 682 is moved out of engagement with the notch 688 and therefore the shaft 680 is not rocked to move the pawls 638 for the transaction totalizer into operative position when the grand totalizer is moved into engagement.

As the roller 697 (Fig. 34) remains in the lower circular portion of the slot 698 when the total lever is moved to either one of its two positions above its adding position the operation of the engaging mechanism, comprising the plates 400 and 407, is identical to that when a transaction totalizer is moved into engagement in total printing operations and, therefore, this operation need not be repeated here.

The roller 697 is in the upper circular portion of the slot 698 when the lever is in either one of its two positions above its adding position so that the operation of the engaging mechanism to engage the grand totalizer in subtotal printing operations is the same as that above described when a transaction totalizer is engaged in subtotal printing operations.

In total and subtotal printing operations the latches 292 (Figs. 8 and 9) are operated with the latches 460, carried by the arms 459 (Figs. 5, 9 and 10) when the two totalizer elements of highest denomination reach zero positions. Therefore, the forward ends of the beams 457 which are controlled by the units and tens banks of waiters' keys in adding operations are moved with the members 286 under the control of the totalizer elements in total and subtotal printing operations. The type carriers controlled by these two banks of waiters' keys in adding operations are set in this manner differentially in accordance to the amount on these two totalizer elements of highest denomination in total and subtotal printing operations.

The differential mechanism for the left hand bank of waiters' keys is controlled by the stepped plate 714 positioned differentially by the total lever so that a special character is printed opposite the total.

All of the type carriers are set up differentially through their beam and link connections in the same manner as in adding operations. However, both the waiters' type carriers and the amount type cariers for printing on the detail strip are operated simultaneously instead of at different times as in adding operations. This simultaneous operation of the type carriers is effected as the adjustment of the total lever out of adding position lowers the left hand end of the link 479 (Figs. 21 and 22) so that the pin 712 on the arm 496 is in the middle of the slot 484, so that then when the arm 496 is rocked by the cam groove 500, both of the links 502 and 479 are operated to carry all the type carriers against the detail strip at the same time. The first time the type carriers are rocked to make an impression only zeros are printed but during the second rocking movement of the type carriers the totals and subtotals are printed, the type carriers being set differentially between the two printing impressions.

At the end of the first rotation of the shaft 50 the locking mechanism is not restored to normal position as in adding operations, as the pin 181 (Fig. 2) on the arm 183, which is operated by the cam groove 187, at this time moves idly in the rear end of the slot 180 formed in the link 157. The link 157 having been rocked forwardly to the position to which it was positioned by the total lever, by the operation of the pitman 620 by the cam groove 627, near the end of the second rotation of the shaft 50 the pin 181 engages the shoulder 636 when the pin 181 is lowered the second time, thereby drawing the link 157 downwardly. This downward movement of the link 157 is sufficient to rock the lever 153 to normal position and thereby the motor locking arm 64 (Fig. 41) is rocked back to normal locking position so that at the end of the second rotation of the shaft the motor clutch is disconnected and the motor circuit broken.

Although the keys employed to identify the waiters operating the machine have been called "waiters' keys" in the specification and the claims, it is obvious that they may be used by clerks and called "clerks' keys" or have any other classification in the various systems for which the invention is susceptible of use. It, therefore, is intended that the term "waiters' keys" should have a sufficiently broad interpretation to include these various classifications.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is,—

1. In a machine of the class described the combination with a type carrier, of an accounting element, manipulative means, differential mechanism carrying a latch for positioning the type carrier under the control of the manipulative means, and differential mechanism carrying a second latch for coöperating with the first mentioned mechanism to operate the type carrier under the control of the accounting element.

2. In a machine of the class described the combination with a type carrier, of an accounting element, manipulative means, differential mechanism carrying a latch for positively positioning the type carrier under the control of the manipulative means, and differential mechanism carrying a second latch for coöperating with the first mentioned mechanism to position positively the type carrier under the control of the accounting element.

3. In a machine of the class described the combination with a type carrier, of an accounting element, manipulative means, differential mechanism for positioning the type carrier under the control of the manipulative means, a driving element for the differential mechanism, a differentially movable member, controlled by the accounting element, for also controlling the positioning of the differential mechanism, and means for rendering said member ineffective when the differential mechanism is under the control of the said manipulative means.

4. In a machine of the class described the combination with a type carrier, of an accounting element, manipulative means, differential mechanism for positioning the type carrier under the control of the manipulative means, a driving element for the differential mechanism, a differentially movable member, driven by said driving element and controlled by the accounting device, for controlling the positioning of the differential mechanism, and means for rendering said member ineffective when the differential mechanism is under the control of the manipulative means.

5. In a machine of the class described the combination with a type carrier, of an accounting element, manipulative means, differential mechanism including a latch for positioning the type carrier under the control of the manipulative means, a driving member for the differential mechanism coupled thereto by the latch, mechanism including a second latch for coöperating with said differential mechanism to position the type carrier under the control of the accounting elements the second latch being constructed to couple its mechanism to said driving element; and means controlled by the accounting mechanism for operating both the said latches when the type carrier is under the control of the accounting element.

6. In a machine of the class described, the combination with a type carrier, of manipulative means for controlling the type carrier in certain accounting operations, an accounting element for controlling the type carrier in certain other accounting operations, driving means, a differential mechanism including two latching devices coupling the differential mechanism to the driving means for positioning the type carrier, one of the latching devices being controlled by the manipulative means in the first mentioned accounting operations and the other being controlled by the accounting element in the second mentioned accounting operations.

7. In a machine of the class described, the combination with a type carrier, of manipulative means for controlling the type carrier in certain accounting operations, an accounting element for controlling the type carrier in certain other accounting operations, driving means, a differential mechanism including two latches coupling the differential mechanism to the driving means for positioning the type carrier, one of the latches being controlled by the manipulative means in the first mentioned accounting operations and both being controlled by the accounting element in the second mentioned accounting operations.

8. In a machine of the class described, the combination with a type carrier, of manipulative means for controlling the type carrier in certain accounting operations, an accounting element for controlling the type carrier in certain other accounting operations, driving means, a differential mechanism including two latching devices coupling the differential mechanism to the driving means for positively positioning the type carrier, one of the latching devices being controlled by the manipulative means in the first mentioned accounting operations and the other being controlled by the accounting element in the second mentioned accounting operations.

9. In a machine of the class described the combination with a type carrier, of an accounting element, manipulative means, differential mechanism including a latch for positioning the type carrier under the control of the manipulative means, a driving member for the differential mechanism coupled thereto by the latch, mechanism including a second latch for coöperating with said differential mechanism to position the type carrier under the control of the accounting element the second latch being constructed to couple its mechanism to said driving element, means controlled by the accounting element for operating both the said latches when the type carrier is under the control of the accounting element, and independent means for operating the second mentioned latch when the type carrier is under the control of the manipulative means.

10. In a machine of the class described the combination with a type carrier, of manipulative means for controlling the type carrier in certain accounting operations, an accounting element for controlling the type carrier in certain other accounting operations, driving means, a differential mechanism including two latches coupling the differential mechanism to the driving means for positioning the type carrier, one of the latches being controlled by the manipulative means in the first mentioned accounting operations and both being controlled by the accounting element in the second mentioned accounting operations, and independent means for operating the latch not controlled by the manipulative means, when the type carrier is under the control of the manipulative means.

11. In a machine of the class described the combination with a type carrier, of an accounting element, manipulative means, differential mechanism including a latch for positioning the type carrier under the control of the manipulative means, a driving member for the differential mechanism coupled thereto by the latch, mechanism including a second latch for coöperating with said differential mechanism to position the type carrier under the control of the accounting element, the second latch being constructed to couple its mechanism to said driving member, means controlled by the accounting element for operating both of said latches when the type carrier is under the control of the accounting element, zero stop pawls, one for each latch, the zero stop pawl for the first latch being controlled by the keys when the type carrier is under the control of said manipulative means, and means for controlling both zero stop pawls when the type carrier is under the control of the accounting element.

12. In a machine of the class described, the combination with a type carrier, of manipulative means for controlling the type carrier in certain accounting operations, an accounting element for controlling the type carrier in certain other accounting operations, driving means, a differential mechanism including two latches coupling the differential mechanism to the driving means for positioning the type carrier, one of the latches being controlled by the manipulative means in the first mentioned accounting operations and the other being controlled by the accounting element in the second mentioned accounting operations, zero stop pawls, one for each latching device, the zero stop pawl for the latch controlled by the manipulative means being controlled by the latter in the first mentioned accounting operations, and means for controlling both zero stop pawls in the second mentioned accounting operations.

13. In a machine of the class described the combination with a type carrier, of manipulative means for controlling the type carrier in certain accounting operations, an accounting element for controlling the type carrier in certain other accounting operations, driving means, a differential mechanism including two latches coupling the differential mechanism to the driving means for positioning the type carrier, one of the latches being controlled by the manipulative means in the first mentioned accounting operations and the other being controlled by the accounting element in the second mentioned accounting operations, normally effective zero stop pawls, one for each latch, the zero stop pawl for the latch controlled by the manipulative means being moved out of effective position by the operation of the keys, and means for moving both zero stop pawls out of effective position during the second mentioned accounting operations.

14. In a machine of the class described, the combination with an accounting device constructed to perform different kinds of accounting operations, of mechanism for differentially actuating the accounting device in each of the different kinds of accounting operations, type carriers differentially positioned independently of the accounting device upon certain of said actuations of the device and positioned to represent the actuation of the accounting device upon others of said actuations, and means for positively positioning the type carriers in all accounting operations.

15. In a machine of the class described the combination with a totalizer, of means for entering items therein, two sets of type carriers, and means constructed to operate positively the type carriers so that one set prints items entered on the totalizer and the other prints identifying characters in connection with the items and both sets print the total of the items entered on the totalizer when desired.

16. In a machine of the class described the combination with a totalizer, comprising a plurality of denominational elements, of actuators for operating the elements of lower denominations in adding operations and for turning these elements to zero in total printing operations, transfer mechanism for operating the elements of higher denominations in adding operations, type carriers controlled by the actuators in adding operations and total printing operations, means for turning the totalizer elements of higher denominations to zero in total printing operations, type carriers controlled by the totalizer elements of higher denominations in total printing operations, manipulative means for controlling the last mentioned type carriers in adding operations, and means for disabling said turn to zero means for the totalizer elements of higher denominations in adding operations.

17. In a machine of the class described the combination with a totalizer, comprising a plurality of denominational elements, of actuators for operating the elements of lower denominations in adding operations and for turning these elements to zero in total printing operations, transfer mechanism for operating the elements of higher denominations in adding operations, type carriers controlled by the actuators in adding and total printing operations, means for turning the totalizer elements of higher denominations to zero in total printing operations, type carriers controlled by the totalizer elements of higher denominations in total printing operations, manipulative means for controlling the last mentioned type carriers in adding operations, means for disabling said turn to zero means for the totalizer elements of higher denominations in adding operations, and means for rendering said disabling means ineffective in a total printing operation.

18. In a machine of the class described the combination with a totalizer comprising a plurality of denominational elements, of actuators for operating the elements of lower denominations in item entering operations and controlled thereby in total printing operations, transfer mechanism for operating the elements of higher denominations, type carriers controlled by said actuators in item entering and total printing operations, manipulative means, type carriers controlled by said manipulative means in item entering operations and operated independently of the totalizer elements in such operations, means controlled by the elements of higher denominations in total printing operations for controlling the last mentioned type carriers, and means for disabling said last mentioned means in item entering operations.

19. In a machine of the class described the combination with a totalizer comprising a plurality of denominational elements, of actuators for operating the elements of lower denominations in item entering operations and controlled thereby in total printing operations, transfer mechanism for operating the elements of higher denominations in item entering operations, type carriers controlled by said actuators in item entering operations and total printing operations, manipulative means, type carriers controlled by said manipulative means in item entering operations and operated independently of the totalizer elements in such operations, means controlled by the elements of higher denominations in total printing operations for controlling the last mentioned type carriers, means for disabling said last mentioned means in item entering operations and means for rendering said disabling means ineffective in total printing operations.

20. In a machine of the class described the combination with a totalizer comprising a plurality of denominational elements, of actuators for operating the elements of lower denominations in adding operations and for turning these elements to zero in total printing operations, transfer mechanism for operating the elements of higher denominations in adding operations, type carriers controlled by the actuators in adding and total printing operations, means for turning the totalizer elements of higher denominations to zero in total printing operations, type carriers controlled by the totalizer elements of higher denominations in total printing operations, manipulative means for controlling the last mentioned type carriers in adding operations, means for disabling said turn to zero means for the totalizer elements of higher denominations in adding operations, and means for preparing the machine for adding or total printing operations and for rendering said disabling means ineffective when the machine is prepared for printing a total.

21. In a machine of the class described the combination with a totalizer, comprising a plurality of denominational elements, of actuators for operating the elements of lower denominations in adding operations and for turning these elements to zero in total printing operations, transfer mechanism for operating the elements of higher denominations in adding operations, type carriers controlled by the actuators in adding and total printing operations, means for turning the totalizer elements of higher denominations to zero in total printing operations, type carriers controlled by the totalizer elements of higher denominations in total printing operations, manipulative means for controlling the last mentioned type carriers in adding operations, means for disabling said turn to zero means for the totalizer elements of higher denominations in adding operations, and a single manipulative device and means controlled thereby for preparing the machine for adding or total printing operations and for rendering said disabling means ineffective when the machine is prepared for printing a total.

22. In a machine of the class described the combination with a totalizer comprising a plurality of denominational elements, of actuators for operating the elements of lower denominations in item entering operations and controlled thereby in total printing operations, transfer mechanism for operating the elements of higher denominations, type carriers controlled by said actuators in item entering and total printing operations, manipulative means, type carriers controlled by said manipulative means in item entering operations and operated independently of the totalizer elements in such operations, means controlled by the elements of higher denominations in total printing operations for controlling the last mentioned type carriers, means for disabling the last mentioned means in item entering operations and means for preparing the machine for item entering or total printing operations and for rendering said disabling means ineffective in total printing operations.

23. In a machine of the class described the combination with a totalizer, comprising a plurality of denominational elements, of actuators for operating the elements of lower denominations in item entering operations and controlled thereby in total and subtotal printing operations, transfer mechanism for operating the elements of higher denominations in item entering operations and in total and subtotal printing operations, manipulative means, type carriers controlled by the manipulative means in item entering operations and operated independently of the totalizer elements in such operations, means controlled by the elements of higher denominations in total and subtotal printing operations for controlling the last mentioned type carriers, and means for disabling in item entering operations said means controlled by the elements of higher denominations in total and subtotal printing operations.

24. In a machine of the class described the combination with a totalizer comprising a plurality of denominational elements, of actuators for operating the elements of lower denominations in item entering operations and controlled thereby in total and subtotal printing operations, transfer mechanism only for operating the elements of higher denominations in item entering operations, type carriers controlled by said actuators in item entering operations and in total and subtotal printing operations, manipulative means, type carriers controlled by the manipulative means in item entering operations, means controlled by the elements of higher denominations in total and subtotal printing operations for controlling the last mentioned type carriers, means for disabling in an item entering operation said means controlled by the elements of higher denominations in total and subtotal printing operations, and means for preparing the machine for item entering and total and subtotal printing operations and for rendering said disabling means ineffective upon total and subtotal printing operations.

25. In a machine of the class described, the combination with a type carrier, of differential mechanism therefor, a set of keys and a set of stops controlling said mechanism, and means for differentially positioning the stops independently of operations of the keys.

26. In a machine of the class described, the combination with a type carrier, of differential mechanism therefor, two sets of stops controlling said mechanism, the stops of one set being selectively operable to control the mechanism and the others being carried bodily by a differentially adjustable element, and means for operating the differentially adjustable element.

27. In a machine of the class described the combination with a totalizer, of actuators for operating the totalizer for different accounting operations, a differentially movable type carrier, keys controlling the type carrier upon certain accounting operations of the totalizer, and a lever for controlling the different accounting operations of the totalizer and for controlling the differential movement of the type carrier upon certain accounting operations.

28. In a machine of the class described the combination with a type carrier, of differential mechanism therefor, keys and a differentially movable lever, the keys being employed to control the differential mechanism while the lever is in a certain one of its positions and the lever being employed for this purpose when it is out of said position, and means preventing the movement of the lever when a key is depressed and depression of a key when the lever is out of said certain position.

29. In a machine of the class described the combination with a type carrier, of a differentially movable member for controlling the positioning of the same, a driving element for said differentially movable member, keys for predetermining the extent of movement of said member, a differentially movable manipulative lever, and a stepped plate positioned by said lever for also predetermining the extent of movement of the differentially movable member.

30. In a machine of the class described the combination with a type carrier, of a differentially movable member for controlling the positioning of the same, a driving element for said differentially movable member, keys for predetermining the extent of movement of said member, a differentially movable manipulative lever, a stepped plate positioned by said lever for also predetermining the extent of movement of said member, and means permitting depression of a key only when the plate is in one of its positions of adjustment and for preventing operation of the lever when a key is depressed.

31. In a machine of the class described the combination with a type carrier, of differential mechanism therefor, keys and a manually and differentially adjustable lever for controlling said mechanism, and means for preventing differential movement of said mechanism if a key is not depressed and the lever is in one of its positions and constructed to be disabled by depression of a key or when the lever is out of said position.

32. In a machine of the class described the combination with a type carrier, of differential mechanism therefor, keys and a manually and differentially adjustable lever for controlling the movement of the differential mechanism, means so constructed that only a key or the lever, as desired, controls the type carrier, and means for preventing differential movement of said differential mechanism when a key is not depressed and the lever is in one of its positions and constructed to be disabled by depression of a key or when the lever is out of said position.

33. In a machine of the class described the combination with a totalizer, of actuators for operating the totalizer for different accounting operations, a differentially movable type carrier, differential mechanism for the type carrier, keys for controlling the differential mechanism in certain accounting operations of the totalizer, a manually and differentially adjustable lever for controlling the different accounting operations of the totalizer and for controlling the movement of the differential mechanism upon certain accounting operations, and means for preventing differential movement of the differential mechanism when a key is not depressed or the lever is in one of its positions and constructed to be disabled by depression of a key or when the lever is out of such position.

34. In a machine of the class described the combination with a type carrier, of differential mechanism therefor, a driving member, a latch for coupling the differential mechanism and the driving member, keys for tripping said latch to control the extent of movement of said differential mechanism, a manually adjustable lever, and a plate moved thereby into position to trip said latch to control the extent of movement of the differential mechanism.

35. In a machine of the class described the combination with a type carrier, of differential mechanism therefor, a driving member, a latch for coupling the differential mechanism and the driving member, keys for tripping said latch to control the extent of movement of the differential mechanism, a manually and differentially adjustable lever, and a stepped plate moved by said lever into position to trip said latch to control the extent of movement of the differential mechanism.

36. In a machine of the class described the combination with a differentially movable member, of a driving element therefor, a latch for coupling the movable member and the driving lever, a manually and differentially adjustable lever, and a stepped member operated by said lever to be positioned to trip the latch at different points in the movement of the driving element.

37. In a machine of the class described the combination with two sets of type carriers, of two devices one for each set of type carriers for operating the sets at different times to take impressions, and means for rendering one of said operating devices effective to operate both sets of type carriers at the same time to take an impression.

38. In a machine of the class described the combination with two sets of type carriers, of two devices one for each set of type carriers for operating the sets at different times to take impressions, means for rendering one of said operating devices effective to operate both sets of type carriers at the same time to take an impression, and a differentially and manually operable lever for controlling said means.

39. In a machine of the class described, the combination with a main operating mechanism, of two sets of type carriers, two devices operated by said mechanism and employed to operate the two sets of type carriers at different times to take impressions, and means for rendering one of said devices ineffective to operate its set of type carriers and for rendering the other operating device effective to operate simultaneously both sets of type carriers.

40. In a machine of the class described the combination with a main operating mechanism, of two sets of type carriers, two cams with corresponding link connections operated by said mechanism for operating the two sets of type carriers at different times to take impressions, and means for operating the link connections of one cam so the operation of the latter is ineffective to operate its corresponding set of type carriers and the other cam is effective to operate both sets of type carriers at the same time.

41. In a machine of the class described the combination with a totalizer, of means for entering items thereon, a set of type carriers constructed to print the items entered on the totalizer, a second set of type carriers constructed to print identifying characters in connection with the items printed by the other set of type carriers, both sets of type carriers being adapted to print the total of the items entered on the totalizer when desired, and means for operating the type carriers at different times when an item is printed and simultaneously when a total is printed.

42. In a machine of the class described the combination with a totalizer, of means for entering items thereon, a set of type carriers constructed to print the items entered on the totalizer, a second set of type carriers constructed to print identifying characters in connection with the printed items, both sets of type carriers being constructed to print the total of the items entered on the totalizer when desired, and means for moving the record material printed upon between the operations of the sets of type carriers when an item is printed.

43. In a machine of the class described the combination with a totalizer, of means for entering items thereon, a set of type carriers for printing the items entered on the totalizer, a second set of type carriers constructed to print identifying characters in connection with the printed items, both sets of type carriers being adapted to print the total of the items entered on the totalizer when desired, means for operating the type carriers at different times when an item is printed and simultaneously when a total is printed, means for differentially shifting the record material between the operations of the sets of type carriers when an item is printed, and manipulative means for controlling the differential shifting of the record material.

44. In a machine of the class described the combination with a totalizer, of means for entering items thereon, a set of type carriers constructed to print the items entered on the totalizer, a second set of type carriers constructed to print identifying characters in connection with the items printed by the other set of type carriers, both sets of type carriers being adapted to print the total of the items entered on the totalizer when desired, means for operating the sets of type carriers at different times when an item is printed and simultaneously when a total is printed, and manipulative means for controlling the totalizer for item entering and total printing operations and for controlling said type carrier operating means.

45. In a machine of the class described the combination with a totalizer, of means for entering items thereon and for operating the totalizer in total and subtotal printing operations, a set of type carriers constructed to print items entered on the totalizer, a second set of type carriers constructed to print identifying numbers in connection with the printed items, both sets of type carriers being adapted to print the total or subtotal from the totalizer when desired, and means for operating said type carriers at different times when an item is printed and simultaneously when a total or subtotal is printed.

46. In a machine of the class described the combination with a plurality of totalizers, of type carriers for printing identifying characters in connection with the printed items, type carriers for printing the items entered on the totalizers, and for printing the totals from the totalizers in connection with certain of the first mentioned type carriers, one of the first mentioned type carriers being designed to print designating characters in connection with the printed totals.

47. In a machine of the class described the combination with a plurality of totalizers, of type carriers for printing identifying characters in connection with the printed items, type carriers for printing the items entered on the totalizers and for printing the totals from the totalizers in connection with certain of the first mentioned type carriers, one of the first mentioned type carriers being designed to print designating characters in connection with the printed totals, and means for controlling the machine for printing items and totals and for controlling the last mentioned type carrier when a total is printed.

48. In a machine of the class described the combination with a plurality of totalizers, of a set of type carriers for printing the items entered on the totalizers, a second set of type carriers for printing identifying characters in connection with the printed items, certain of these latter type carriers being adapted to print the totals on the totalizers in connection with the first mentioned set of type carriers and one of the second set of type carriers being adapted to print identifying characters in connection with the printed totals, and means for operating the sets of type carriers at different times in item entering operations and simultaneously in total printing operations.

49. In a machine of the class described the combination with a plurality of totalizers, of a set of type carriers for printing identifying characters in connection with the printed items, a second set of type carriers for printing the items entered on the totalizers and for printing the totals from the totalizers in connection with certain of the first mentioned type carriers, one of the first mentioned type carriers being designed to print designating characters in connection with the printed totals, means for controlling the machine for printing items and totals and for controlling the last mentioned type carrier when a total is printed, and means controlled by said controlling means for operating the sets of type carriers at different times in item entering operations and simultaneously in total printing operations.

50. In a machine of the class described the combination with a plurality of totalizers, of a set of type carriers for printing on a record strip the items entered on the totalizers, a second set of type carriers for printing identifying characters in connection with the printed items, certain of these latter type carriers being adapted to print the totals on the totalizers in connection with the first mentioned set of type carriers and one of the second set of type carriers being adapted to print identifying characters in connection with the printed totals, means for operating the sets of type carriers at different times in item entering operations and simultaneously in total printing operations, and means for shifting the record strip differentially from a normal position, the total and items being printed while the strip is in its moved position and the identifying characters for the items being printed while the strip is in its normal position.

51. In a machine of the class described the combination with a plurality of totalizers, of type carriers for printing identifying characters on a record strip in connection with the printed items, type carriers for printing the items entered on the totalizers and for printing the totals from the totalizers in connection with certain of the first mentioned type carriers, one of the first mentioned type carriers being designed to print a designating character in connection with the printed totals, means for controlling the machine for printing items and totals and for controlling the last mentioned type carrier when a total is printed, means controlled by said controlling means for operating the sets of type carriers at different times in item entering operations and simultaneously in total printing operations, and means for shifting the record strip differentially from normal position, the total and items being printed while the strip is in its moved positions and the identifying characters being printed in connection with the printed items while the strip is in its normal position.

52. In a machine of the class described the combination with a totalizer, of a set of type carriers for printing the items entered on the totalizers, a second set of type carriers for printing identifying characters in connection with the printed items, certain of these type carriers in conjunction with the first mentioned set of type carriers being adapted to print totals and subtotals from the totalizer and one of the second set of type carriers being constructed to print characters in connection with the printed totals and subtotals.

53. In a machine of the class described the combination with a totalizer, of a set of type carriers for printing the items entered on the totalizer, a second set of type carriers for printing identifying characters in connection with the printed items, certain of these type carriers, in conjunction with the first set of type carriers, being adapted to print totals and subtotals from the totalizer and one of the second set of type carriers being constructed to print characters in connection with the printed totals and subtotals, and means for controlling the machine for printing items, totals and subtotals and for controlling the last mentioned type carrier in total and subtotal operations.

54. In a machine of the class described the combination with a pair of feeding disks, of an eccentric carrying one of said disks, means for moving the eccentric to raise the disk carried thereby into operative relation with the other disk, frictional means carried by the eccentric for operating the disk to feed the record material, and means for operating said frictional means.

55. In a machine of the class described the combination with a main operating mechanism, of feeding disks for record material one of the disks being movable into and out of operative relation with the other, means operated by the operating mechanism for moving said disk into operative relation, means for operating the disks to feed the record material, means for retaining the one disk in operative relation with the other disk during successive operations of the machine, and means for disabling said retaining means when desired to permit the one disk to be moved out of operative relation with the other.

56. In a machine of the class described the combination with a main operating mechanism, of feeding disks for record material one of the disks being movable into and out of operative relation with the other, means operated by the operating mechanism for moving the one disk into operative relation with the other, means for operating the disks to feed the record material, means for retaining said disk in operative relation with the other disk during successive operations of the machine, and manipulative means for disabling said retaining means when desired to permit the one disk to be moved out of operative relation with the other.

57. In a machine of the class described the combination with a main operating mechanism, of feeding disks for record material one of the disks being movable into and out of operative relation with the other, means operated by the operating mechanism for moving the one disk into operative relation with the other, means for operating the disks to feed the record material, means for retaining the one disk in operative relation with the other disk during successive operations of the machine, manipulative means for disabling said retaining means when desired to permit the one disk to be moved out of operative relation with the other, and means for preventing operation of said manipulative means during the operation of the machine.

58. In a machine of the class described the combination with a main operating mechanism, of two record material feeding disks one of which is capable of being moved into and out of operative relation with the other, an eccentric carrying the disk movable into and out of operative relation, means, operated by the main operating mechanism for rotating the eccentric to move the disk carried thereby into operative relation with the other disk, means for rotating the disks when in operative relation, a member carried by the eccentric, a spring operated arm movable into effective relation with said member to retain the eccentric in rotated position during successive operations of the machine, and means for operating said arm when desired to permit the eccentric to be rotated so that the disk carried thereby is moved out of operative relation with the other disk.

59. In a machine of the class described the combination with a main operating mechanism, of record material feeding disks, means operated by the operating mechanism for always moving one of the disks into operative relation with the other, if the disks are not already in that relation, means for retaining the disks in operative relation during successive operations of the machine, and means for disabling said retaining means when desired to permit movement of the one disk out of operative relation with the other.

60. In a machine of the class described the combination with a main operating mechanism, of feeding mechanism including means movable into and out of feeding position, means operated by the main operating mechanism for moving said means into feeding position, a device for retaining said feeding means in feeding position during successive operations of the machine, and means for disabling said retaining means when desired.

61. In a machine of the class described the combination with a main operating mechanism, of record material feeding mechanism including means movable into and out of feeding position, means operated by the operating mechanism for always moving said feeding means into feeding position if the latter is not already in such position, a device for continuously retaining said feeding means in feeding position during successive operations of the machine, and means for disabling said retaining means when desired to permit movement of said feeding means out of feeding position.

62. In a machine of the class described the combination with a main operating mechanism, of record material feeding mechanism including means movable into and out of feeding position, means operated by the operating mechanism for moving said feeding means into feeding position, means for continuously retaining said feeding means in feeding position during successive operations of the machine, manipulative means for disabling said retaining means when desired, and means for preventing operation of said disabling means during operation of the machine.

63. In a machine of the class described the combination with a main operating mechanism, of record material feeding mechanism including means movable into and out of feeding position, means operated by the operating mechanism for always moving said feeding means into feeding position if the latter is not already in such position, a device for continuously retaining said feeding means in feeding position during successive operations of the machine, means for disabling said retaining means when desired to permit movement of said feeding means out of feeding position, and means for preventing operation of said manipulative means during the operation of the machine.

64. In a machine of the class described the combination with a main operating mechanism, of two record material feeding disks, one of which is capable of being moved into and out of operative relation with the other, an eccentric carrying the disk moved into and out of operative relation, means operated by the main operating mechanism for rotating the eccentric to move the disk carried thereby into operative relation with the other disk, frictional means operated by the main operating mechanism for rotating the disks when in operative relation, a member carried by the eccentric, a spring operated arm movable into position to retain the eccentric in its rotated position during successive operations of the machine, and means for operating said arm when desired to permit the eccentric to rotate so that the disk carried thereby is moved out of operative relation with the other disk.

65. In a machine of the class described the combination with two feeding disks, of an eccentric carrying one of said disks, means for rotating said eccentric to move the disk carried thereby into operative relation with the other disk, frictional means carried by the eccentric for rotating the disks forwardly to feed the record material, means for operating the frictional means, and frictional means also carried by the eccentric for preventing backward rotation of the disks.

66. In a machine of the class described the combination with the main operating mechanism, of record material feeding disks, one of which is movable into and out of operative relation with the other, means operated by the operating mechanism for moving the one disk into operative relation with the other and for operating the disks to feed the record material, spring operated means for retaining the one disk in its operative relation with the other during successive operations of the machine, means for positively insuring movement of said retaining means into retaining position, and means for disabling said retaining means when desired to permit movement of the one disk out of operative relation with the other.

67. In a machine of the class described the combination with a main operating mechanism, of two record material feeding disks, of an eccentric for carrying one of the disks, a device operated by the main operating mechanism for rotating said eccentric to move the disk carried thereby into operative relation with the other disk, frictional means carried by the eccentric for rotating the disks, means operated by the operating mechanism for operating the frictional means, and means for adjusting said operating means for the frictional means so that the disks may be operated any desired extent.

68. In a machine of the class described the combination with a main operating mechanism, of differentially movable type carriers, keys for controlling movement of said type carriers, detent means for retaining the depressed keys in depressed position during successive operations of the machine, means for preventing manipulation of the keys during an operation of the machine, record material feeding disks, one of which is movable into operative relation with the other, means for moving the one disk into operative relation with the other, means for retaining the disks in operative relation during successive operations of the machine, means for rotating said disks, and means for disabling said detent means and said retaining means, when desired, to permit movement of the keys to undepressed position and movement of the one disk out of operative relation with the other.

69. In a machine of the class described the combination with a main operating mechanism, of keys, detent means for retaining the depressed keys in depressed position during successive operations of the machine, record material feeding means, constructed to be put in feeding or non-feeding condition, means for putting the feeding means in feeding condition, means for retaining the feeding means in feeding condition during successive operations of the machine, and means for disabling the key detent means and the retaining means, when desired, to release the keys and cause the feeding means to be put in non-feeding condition.

70. In a machine of the class described the combination with a main operating mechanism, of keys, detent means for retaining depressed keys in depressed condition during successive operations of the machine, record material feeding means, constructed to be put in feeding or non-feeding condition, means for putting the feeding means in feeding condition, means for retaining the feeding means in feeding condition during successive operations of the machine, means for disabling the key detent means and the retaining means, when desired, to effect the release of the keys and cause the feeding means to be put in non-feeding condition, and means for preventing operation of the disabling means during the operation of the machine.

71. In a machine of the class described the combination with a main operating mechanism, of keys, detents for retaining the keys in operated position during successive operations of the machine, record material feeding means constructed to be put in feeding or non-feeding condition, means operated by the main operating mechanism for always putting the feeding means in feeding condition if it is not already in such condition, means for retaining the feeding means in feeding condition during successive operations of the machine, and means for operating the detents and the retaining means, when desired, to release the keys and cause the feeding means to be put in non-feeding condition.

72. In a machine of the class described the combination with a main operating mechanism, of keys, detents for retaining the keys in operative position during successive operations of the machine, record material feeding means constructed to be put in feeding or non-feeding condition, means operated by the main operating mechanism for always putting the feeding disk in feeding condition if it is not already in such condition, means for retaining the feeding means in feeding condition during successive operations of the machine, means for disabling the detents and the retaining means, when desired, to release the keys and cause the feeding means to be put in non-feeding condition, and means for preventing operation of said disabling means during the operation of the machine.

73. In a machine of the class described, the combination with a main operating mechanism, of a plurality of keys, detents for retaining the depressed keys in depressed positions during successive operations of the machine, means for disabling said detent means when desired to release the keys, a manually adjustable lever, and means for preventing an operation of said disabling means when said lever is out of one of its positions of adjustment.

74. In a machine of the class described the combination with a main operating mechanism, of a plurality of keys, detent means for retaining the depressed keys in depressed positions during successive operations of the machine, means for disabling said detent means when desired to release the depressed keys, a manually adjustable lever, and means for preventing movement of said lever out of one of its positions of adjustment when said disabling means is in operated position.

75. In a machine of the class described the combination with a main operating mechanism, of a plurality of keys, detents for retaining the depressed keys in depressed positions during successive operations of the machine, means for disabling said detent means when desired to release the keys, a manually adjustable lever, and means for preventing operation of said disabling means when said lever is out of one of its positions of adjustment, and for preventing adjustment of said lever out of said position when said disabling means is in operated position.

76. In a machine of the class described the combination with a main operating mechanism, of totalizing elements, total printing mechanism including type carriers to print the total of the totalizer elements in total printing operations, keys for controlling movement of the type carriers in the adding operations of the machine, means for retaining the depressed keys in depressed position during successive operations of the machine, means controlling the machine for total printing and adding operations, means for disabling said key retaining means when desired, and means for preventing operation of the controlling means to control the machine for total printing operations when one of said keys is depressed or when said disabling means is in operated position.

77. In a machine of the class described the combination with a main operating mechanism, of totalizing elements, total printing mechanism including type carriers for printing the totals on the totalizer elements in total printing operations, keys for controlling movement of the type carriers in adding operations, means for retaining the depressed keys in depressed position during successive operations of the machine, means controlling the machine in total printing and adding operations, means for disabling said key retaining means when desired, and means for preventing operation of the controlling means to control the machine for total printing operations when said disabling means is in operated position.

78. In a machine of the class described the combination with a main operating mechanism, of totalizer elements, total printing mechanism including type carriers for printing the totals on the totalizer elements in total printing operations, keys for controlling movement of the type carriers in adding operations, means for retaining the depressed keys in depressed position during successive operations of the machine, manipulative means controlling the machine in total printing and adding operations, means for disabling said key retaining means when desired, and means for preventing operation of the manipulative controlling means to control the machine for total printing operations when one of said keys is depressed and for preventing operation of a key when said manipulative controlling means has been operated to control the machine for total printing operations.

79. In a machine of the class described the combination with a main operating mechanism, of totalizer elements, total printing mechanism including type carriers for printing the totals on the totalizer elements in total printing operations, keys for controlling the movement of the type carriers in adding operations, means for retaining the depressed keys in depressed position during successive operations of the machine, manipulative means controlling the machine in total printing and adding operations, means for disabling said key retaining means when desired, and means for preventing operation of the manipulative controlling means to control the machine for total printing operations when one of said keys is depressed and for preventing operation of a key when said manipulative controlling means has been operated to control the machine for total printing operations.

80. In a machine of the class described the combination with a main operating mechanism, of totalizing mechanism capable of having different accounting operations, a plurality of keys, locking means for the operating mechanism, normally effective means compelling operation of one of said keys for the purpose of permitting release of the locking means upon certain accounting operations, detent means for retaining the depressed key in depressed condition during a successive number of said certain accounting operations of the machine, means for disabling said detent means when desired, manipulative means for controlling the machine for different accounting operations and for rendering said compelling means ineffective when the machine is prepared for certain accounting operations, and means for preventing depression of a key when said manipulative means has been operated to control the machine for the last mentioned accounting operations and for preventing such operation of the manipulative means when a key is in depressed condition.

81. In a machine of the class described the combination with a main operating mechanism, of totalizing mechanism capable of having different accounting operations, a plurality of keys, locking mechanism for the operating mechanism, normally effective means compelling operation of one of said keys for the purpose of permitting the release of said locking means upon certain accounting operations of the machine, detent means for retaining an operated key in depressed condition during a successive number of said certain accounting operations, means for disabling said detent means when desired, manipulative means for controlling the machine for different accounting operations and for rendering said compelling means ineffective, when the machine is prepared for certain accounting operations, and means for preventing operation of said manipulative means to control the machine for the last mentioned accounting operations when said disabling means is in operated position.

82. In a machine of the class described the combination with an operating mechanism, of locking means therefor, keys, means compelling the conjoint operation of a plurality of said keys for releasing the locking means, and an adjustable manipulative device which when moved to a certain position releases the locking means and when moved to another certain position renders the locking means capable of being released by the operation of one of said keys.

83. In a machine of the class described the combination with an operating mechanism, of locking means therefor, keys, means compelling the conjoint operation of a plurality of said keys in a predetermined sequence for releasing the locking means, and an adjustable manipulative device which when moved to a certain position releases the locking means and when moved to another certain position renders the locking means capable of being released by the operation of one of said keys.

84. In a machine of the class described the combination with a main operating mechanism, of normally effective locking means therefor, keys, means requiring the conjoint operation of a plurality of said keys for releasing the locking means, and an adjustable manipulative device, which when moved to certain positions effects the release of the locking means and when moved to certain other positions renders the locking means capable of operation by the operation of one of said keys.

85. In a machine of the class described the combination with a main operating mechanism, of normally effective locking means therefor, keys, means requiring the conjoint operation of a plurality of said keys in a predetermined sequence for releasing the locking means, and an adjustable manipulative device, which when moved to certain positions effects the release of the locking means and when moved to certain other positions renders the locking means capable of operation by the operation of one of said keys.

86. In a machine of the class described the combination with a normally ineffective operating means, of keys, an adjustable manipulative device movable to different positions, means compelling the conjoint operation of a plurality of said keys when said manipulative device is in one position, the operation of a single key when the lever is moved to another certain position, or the lone movement of the lever to a third position to render the operating mechanism operative.

87. In a machine of the class described the combination with a normally ineffective operating means, of keys, an adjustable manipulative device movable to different positions, means compelling the conjoint operation of a plurality of said keys in a predetermined sequence when said manipulative device is in one position, the operation of a single key when the lever is moved to another certain position, or the lone movement of the lever to a third position to render the operating mechanism operative.

88. In a machine of the class described the combination with a normally ineffective operating mechanism, of keys, a differentially adjustable manipulative device, means compelling the conjoint operation of a plurality of said keys when said manipulative device is in one position, the operation of a single key when the manipulative device is moved to certain positions or the lone movement of the manipulative device to other certain positions to render the operating mechanism operative.

89. In a machine of the class described the combination with a normally ineffective operating mechanism, of keys, a differentially adjustable manipulative device, means compelling the conjoint operation of a plurality of said keys in a predetermined sequence when said manipulative device is in one position, the operation of a single key when the manipulative device is moved to certain positions or the lone movement of the manipulative device to other certain positions to render the operating mechanism operative.

90. In a machine of the class described the combination with an operating mechanism, of locking means therefor, keys, means compelling the conjoint operation of a plurality of said keys for releasing the locking means, an adjustable manipulative device which when moved to a certain position releases the locking means and when moved to another certain position renders the locking means capable of operation by the operation of one of said keys, and means controlled by said manipulative device for locking against operation all of the keys but that key for effecting the release of the machine when the manipulative device is moved to the first mentioned certain position and for locking all of the keys against operation when the manipulative device is moved to the second mentioned position.

91. In a machine of the class described the combination with a main operating mechanism, of normally effective locking means therefor, keys, means requiring the conjoint operation of a plurality of said keys for releasing the locking means, an adjustable manipulative device, which when operated to certain positions effects the release of the locking means and when moved to certain other positions renders the locking means capable of operations by the operation of one of said keys, and means controlled by said manipulative device for locking against operation all of the keys except the key for effecting the release of the machine, when the manipulative device is moved to the first mentioned certain positions, and for locking all of the keys against operation, when the manipulative device is moved to the second mentioned certain positions.

92. In a machine of the class described the combination with a normally ineffective operating means, of keys, a manipulative device movable to different positions, means compelling the conjoint operation of a plurality of said keys when said manipulative device is in one position, the operation of one of said keys when the manipulative device is moved to another position or the lone movement of the manipulative device to a third position to render the operating mechanism operative, and means controlled by said manipulative device for locking against operation all of the keys but the key for effecting the release of the machine when the manipulative device is in its second mentioned position or for locking all of the keys against operation when the manipulative device is moved to the third mentioned position.

93. In a machine of the class described the combination with a normally ineffective operating mechanism, of keys, a differentially adjustable manipulative device, means compelling the conjoint operation of a plurality of said keys when said manipulative device is in one certain position, the operation of one of said keys when the manipulative device is moved into certain positions or the lone movement of the manipulative device to other certain positions to render the operating mechanism operative, and means controlled by said manipulative device for locking against operation all of the keys except the one for rendering the operating mechanism operative, when the manipulative device is moved to the second mentioned certain positions and for locking all of the keys against operation when the manipulative device is moved to the third mentioned certain positions.

94. In a machine of the class described, the combination with an operating mechanism, of locking means therefor, keys, means compelling the conjoint operation of a plurality of said keys for releasing the locking means, an adjustable manipulative device, which when operated to a certain position effects the release of the locking means and when moved to another certain position renders the locking means capable of operation by the operation of one of said keys, and means controlled by said manipulative device for locking against operation all the keys but that key for effecting the release of the machine when the manipulative device is moved to the first mentioned certain position and for locking all of the keys against operation when the manipulative device is moved to the second mentioned position, said means also being constructed to prevent operation of said manipulative device after a key is depressed.

95. In a machine of the class described the combination with a normally ineffective operating means, of keys, a manipulative device movable to different positions, means compelling the conjoint operation of a plurality of said keys when said manipulative device is in one position, the operation of one of said keys when the manipulative device is moved to another position or the lone movement of the manipulative device to a third position to render the operating mechanism operative, and means controlled by said manipulative device for locking against operation all but the key for effecting the release of the machine when the manipulative device is in the second mentioned position and for locking all of the keys against operation when the manipulative device is moved to the third mentioned position, said means also being constructed to prevent operation of said manipulative device after a key is depressed.

96. In a machine of the class described, the combination with a main operating mechanism, of normally effective means for locking the same, a spring normally tending to move the locking means to unlocking position, two devices for restraining the operation of the locking means, a plurality of keys for operating the restraining devices, and a manipulative device, which when operated to a certain position actuates one of the restraining devices so that the subsequent operation of one of said keys may operate the other restraining device to permit the operation of the locking means and when operated to another certain position operates the restraining devices so that the locking means is operated without requiring the operation of one of said keys.

97. In a machine of the class described the combination with a main operating mechanism, of means for normally locking the same, a spring normally tending to move the locking means out of locking position, devices for restraining the operation of the locking means, a plurality of keys for operating the restraining devices, a differentially adjustable manipulative device, which when operated to certain positions actuates one of the restraining devices so that the operation of a single key will permit the operation of the locking means and when operated to other certain positions operates the restraining devices so that the locking means will be operated without requiring the operation of one of said keys.

98. In a machine of the class described the combination with a plurality of totalizers, of actuators therefor, printing mechanism for recording the items entered on the totalizers and the total thereof, means for engaging the totalizers and actuators in item entering operations, a manipulative device for controlling said engaging means to engage selectively any one of the totalizers with the actuators in total printing operations, and normally ineffective devices one for each totalizer and controlled by the totalizers in total printing operations to control the actuators, the manipulative device being constructed to render selectively the normally ineffective device, corresponding to the totalizer to be engaged with the actuators, effective in a total printing operation.

99. In a machine of the class described the combination with a main operating mechanism, of a totalizer, actuating mechanism for the totalizer, a normally effective locking device for the operating mechanism, means for controlling the operating mechanism to cause the actuating mechanism to enter items in the totalizer in one complete operation of the operating mechanism, printing mechanism, means whereby the printing mechanism may be controlled by the totalizer to print a total or subtotal from the latter, means for compelling two complete operations of the operating mechanism to print a total or subtotal, and a manipulative device adjustable to different positions preliminarily to the operation of the machine for controlling said locking device and both the second and last mentioned means.

100. In a machine of the class described the combination with a normally inoperative operating mechanism, of a plurality of groups of keys of different classes operable in a predetermined sequence to render the operating mechanism operable and an element adjustable to different positions to render the operating mechanism operable independently of the keys.

101. In a machine of the class described the combination with a main operating mechanism, of a locking device therefor, a plurality of normally effective restraining devices preventing the operation of the locking device, a plurality of groups of keys of different classes operable in a predetermined sequence to render said restraining device ineffective, and a differentially adjustable setting element for rendering said restraining element ineffective independently of said keys.

102. In a machine of the class described the combination with a main operating mechanism, of a locking device therefor, a plurality of normally effective restraining devices preventing the operation of the locking device, a plurality of groups of keys of different classes operable in a predetermined sequence to render said restraining devices ineffective, and a setting element adjustable to different positions for rendering said restraining devices ineffective independently of said keys.

103. In a machine of the class described the combination with setting elements of several different classes, the setting elements of one class being normally ineffective and the others being normally effective, means controlled by the normally effective elements whereby a setting element of any one of the classes of normally effective elements renders the normally ineffective elements effective, and means preventing an operation of a normally effective element of one class after a normally effective element of another class is operated.

104. In a machine of the class described the combination with setting elements of several different classes, the setting elements of one class being normally inoperable and the others being normally operable, means controlled by the normally operable elements whereby a setting element of any one of the classes of normally operable elements renders the normally inoperable elements operable, and means preventing the operation of a normally operable element of one class after a normally operable element of another class is operated.

105. In a machine of the class described the combination with normally inoperable transaction keys, of normally operable waiters' keys, a normally operable setting element, means under the control of the waiters' keys and the setting element whereby either the waiters' keys or the setting element renders the transaction keys operable, and means preventing the operation of a waiter's key after the setting element has been operated.

106. In a machine of the class described the combination with normally inoperable transaction keys, of normally operable waiters' keys, a normally operable setting element, means under the control of the waiters' keys and setting element whereby either the waiters' keys or the setting element renders the transaction keys operable, and means preventing the operation of a waiter's key after the setting element has been operated and preventing the operating of the setting element after a waiter's key has been operated.

107. In a machine of the class described the combination with a series of waiters' keys, of a series of transaction keys, a total setting element, locking means to prevent the effectual operation of a transaction key until either a waiter's key has been depressed or the total setting element has been operated, and means preventing the operation of a waiter's key after the total setting element is operated and for preventing the operation of the setting element after a waiter's key is operated.

108. In a machine of the class described the combination with a waiter's setting element, of a transaction setting element, a total setting element, interlocking means between the setting elements preventing the effectual operation of the transaction setting element and the waiter's setting element, or the transaction setting element and the total setting element in other than predetermined sequences, and means preventing the operation of the waiter's setting element after the total setting element is operated and for preventing the operation of the total setting lever after the waiter's setting element is operated.

109. In a machine of the class described the combination with setting elements of several different classes, the elements of one class being effectually operable with one of any one of the remaining classes of setting elements in predetermined sequences, of means preventing operation of the machine until the setting elements of two classes have been operated in the proper sequence, and means preventing the operation of a setting element of one of said remaining classes when an element of another of said remaining classes has been operated.

110. In a machine of the class described the combination with setting elements of several different classes, the setting elements of one class being normally ineffective and those of the other classes being normally effective, means requiring the operation of any one of the normally effective setting elements before a normally ineffective element can be rendered effective, and means for preventing the operation of a setting element in any one of the classes of normally effective setting elements if a setting element of another of these classes has been operated.

111. In a machine of the class described the combination with a normally inoperative operating mechanism, of setting elements of several different classes, means controlled by said elements whereby the elements of two classes are operable or an element of a different class is singly operable to render the operating mechanism operable, and means preventing the operation of an element of one of the classes after the singly operable setting element has been operated.

112. In a machine of the class described the combination with a normally inoperative operating mechanism, of setting elements of several different classes, means controlled by said elements whereby the elements of two classes are operable or an element of a different class is singly operable to render the operating mechanism operable, and means for preventing the operation of the singly operable setting element after an element of one of the other classes has been operated and for preventing the operation of an element of one of the last mentioned classes after the singly operable element has been operated.

113. In a machine of the class described the combination with setting elements of several different classes, the elements of one class being effectually operable with one of any one of the other classes of setting elements in predetermined sequences, means preventing operation of the machine until the setting elements of two classes have been operated in the proper sequence or an element of a different class operated singly and means for preventing operation of a setting element of one of the two classes after the singly operable element has been operated.

114. In a machine of the class described the combination with a normally inoperative operating mechanism, of a plurality of groups of keys of different classes operable in a predetermined sequence to render the operating mechanism operable, an element adjustable to different positions to render the operating mechanism operable independently of the keys, and means for preventing the operation of said keys after the setting element has been adjusted to any of said positions.

115. In a machine of the class described the combination with a normally inoperative operating mechanism, of a plurality of groups of keys of different classes operable in a predetermined sequence to render the operating mechanism operable, an element adjustable to different positions to render the operating mechanism operable independently of the keys, and means for preventing adjustment of said setting element to any of said positions after a key of one class has been operated.

116. In a machine of the class described the combination with a normally inoperative operating mechanism, of a plurality of groups of keys of different classes operable in a predetermined sequence to render the operating mechanism operable, an element adjustable to different positions to render the operating mechanism operable independently of the keys, and means for preventing adjustment of said setting element to any of said positions after a key of any one of said classes has been operated.

117. In a machine of the class described the combination with a normally inoperative operating mechanism, of a plurality of groups of keys of different classes operable in a predetermined sequence to render the operating mechanism operable, an element adjustable to different positions to render the operating mechanism operable independently of the keys, and means for preventing adjustment of said setting element to said positions after a key of one class has been operated, and for preventing operation of any one of said keys after the setting element has been adjusted to any one of said positions.

118. In a machine of the class described the combination with a normally inoperative operating mechanism, of a plurality of groups of keys of different classes operable in a predetermined sequence to render the operating mechanism operable, an element adjustable to different positions to render the operating mechanism operable independently of the keys, and means for preventing adjustment of said setting element to any of said positions after a key of any one of said classes has been operated, and for preventing operation of any one of said keys after said setting element has been adjusted to one of said positions.

119. In a machine of the class described the combination with a main operating mechanism, of a locking device therefor, a plurality of normally effective restraining devices preventing the operation of the locking device, a plurality of groups of keys of different classes operable in a predetermined sequence to render said restraining devices ineffective, a setting element adjustable to different positions to render said restraining devices ineffective independently of said keys, and means for preventing adjustment of said setting element to said positions after one of said keys has been operated and for preventing operation of said keys after the setting element has been operated.

120. In a machine of the class described the combination with a main operating mechanism, of a plurality of totalizers, actuating mechanism therefor, a lever, connections between the lever and totalizers to engage and disengage the latter from the actuators, and an adjustable manipulative device adapted to permit a plurality of operations of the machine and to position said connections to engage any one of the totalizers selected by said device with the actuating mechanism during one operation and disengage the totalizer from the actuating mechanism during the succeeding operation of the machine.

121. In a machine of the class described the combination with a main operating mechanism, of a plurality of totalizers, actuating mechanism therefor, a lever, connections between the lever and totalizers to engage and disengage the latter from the actuators, and an adjustable manipulative device adapted to permit a plurality of operations of the machine and to position said connections to engage any one of the totalizers selected by the device with the actuating mechanism during one operation of the machine and disengage said totalizer from the actuating mechanism at different times during the succeeding operation of the machine.

122. In a machine of the class described the combination with a main operating mechanism, of a totalizer, actuating mechanism for the totalizer, printing mechanism controlled by the actuating mechanism, means normally engaging the totalizer with the actuating mechanism and subsequently disengaging the totalizer therefrom during one normal operation of the machine in which items are entered on the totalizer, a manipulative device adjustable to different positions preliminarily to the operation of the machine, and connections between the manipulative device and the engaging means, controlled by the manipulative device so that when the manipulative device is adjusted to different positions the engaging mechanism is rendered effective to engage a totalizer with the actuators at the time of the normal disengaging operation and disengage the totalizer and actuating mechanism at different times during the succeeding operation of the machine.

123. In a machine of the class described the combination with a main operating mechanism, of a totalizer, actuating mechanism therefor, means for controlling the actuating mechanism to enter items on the totalizer in one complete operation of the operating mechanism, printing mechanism, means whereby the printing mechanism may be controlled by the totalizer to print a total or subtotal from the latter, means compelling two complete operations of the operating mechanism to print a total or subtotal and a manipulative device adjusted to different positions preliminarily to the operation of the machine for controlling both the second and last mentioned means when the device is adjusted to certain positions.

124. In a machine of the class described the combination with a plurality of totalizers, of actuating mechanism therefor, printing mechanism for recording the items entered on the totalizer and the totals and subtotals thereof, means for engaging the totalizer with the actuators in item entering operations, a manipulative device for controlling said engaging means to engage selectively any one of said totalizers with the actuators in total and subtotal printing operations, and normally ineffective devices, one for each totalizer, controlled by the totalizers in total and subtotal printing operations to control the actuators, said manipulative device being constructed to render selectively the normally ineffective device, corresponding to the totalizer to be engaged with the actuators, effective in total and subtotal printing operations.

125. In a machine of the class described, the combination with a grand totalizer and a plurality of special totalizers, of a plurality of manipulative devices, there being the same number of manipulative devices as there are totalizers, and mechanism controlled by the manipulative devices for operating the totalizers singly to read or reset or operating the grand totalizer in combination with any desired special totalizer to enter items.

126. In a machine of the class described, the combination with a grand totalizer and a plurality of special totalizers, of totalizer actuating mechanism constructed to operate the totalizers to add, read or reset; means for establishing operative relationship between the actuating mechanism and any single totalizer in reading or resetting or the grand totalizer in combination with any desired special totalizer in item entering; and a plurality of manipulative devices for controlling said means, there being the same number of manipulative devices as there are totalizers.

127. In a machine of the class described, the combination with a grand totalizer and a plurality of special totalizers, of a differentially adjustable lever, a key for each special totalizer, and mechanism controlled by said lever and keys for operating the totalizers singly to read or reset or in combinations to enter items.

128. In a machine of the class described, the combination with a grand totalizer and a plurality of special totalizers, of a differentially adjustable lever, a key for each special totalizer, and mechanism controlled by said lever and keys for operating singly the grand totalizer or any desired one of the special totalizers either to read or reset or operating the grand totalizer in combination with any desired special totalizer to enter items.

129. In a machine of the class described, the combination with a totalizer actuator, of a type carrier, a differentially movable member controlling the setting of the type carrier, means for operating said member 130. In a machine of the class described, the combination with a totalizer, of item entering and total taking mechanism comprising a totalizer actuator, a type carrier, a differentially movable member controlling the setting of the type carrier, means for operating said member independently of the actuator in item entering and in unison with said actuator in total printing, and manipulative devices controlling said means.

131. In a machine of the class described, the combination with a totalizer, of a totalizer actuator, a type carrier, a differentially movable member controlling the setting of the type carrier, means for operating the differentially movable member either independently of the actuator or by means of the actuator as desired, and manipulative devices controlling said means.

132. In a machine of the class described, the combination with a totalizer, of a totalizer actuator, a type carrier, a differentially adjustable member controlling the setting of the type carrier, means for adjusting the differentially movable member independently of the actuator or operatively connecting said member and the actuator whereby to prevent movement of one independently of the other, and manipulative devices controlling said means.

133. In a machine of the class described, the combination with a type carrier, of a differentially movable member controlling the setting of the type carrier, keys normally controlling the movements of said member, a totalizer, total taking mechanism comprising an actuator operated under the control of the totalizer, and means effective in total taking operations only for preventing operation of the keys and operatively connecting the differentially movable member and the actuator.

134. In a machine of the class described, the combination with a totalizer, of a totalizer actuator, total taking mechanism comprising means for operating the actuator under the control of the totalizer, a type carrier, a differentially movable member controlling the setting of the type carrier, key controlled means for operating said member independently of the actuator in item entering, and manipulatively controlled means for preventing operation of said member independently of the actuator in total taking.

135. In a machine of the class described, the combination with a totalizer, of item entering and total taking mechanism comprising actuators having a single step of movement to effect transfers in item entering and a differential movement in total taking, type carriers, movable members controlling the setting of the type carriers, key controlled means for differentially operating said members in item entering whereby to print arbitrary numbers, means for differentially operating the members independently of the keys and in unison with the actuators in total taking, and manipulative devices controlling said means.

In testimony whereof I affix my signature in the presence of two witnesses.

FREDERICK L. FULLER.

Witnesses:
F. E. HAMILTON,
J. B. RICKETTS.

DISCLAIMER.

1,242,170.—*Frederick L. Fuller*, Dayton, Ohio. CASH REGISTER. Patent dated October 9, 1917. Disclaimer filed October 18, 1926, by the assignee by mesne assignments, *The National Cash Register Company.*

Hereby disclaims any structure falling within claims 25, 129, 130, and 131, as set forth more specifically below:

"Claim 25. Your petitioner hereby disclaims any construction falling within the terms of claim 25 in which the control of the keys is effected through the stops.

"Claim 129. Your petitioner disclaims any construction falling within the language of claim 129 wherein the totalizer is operated as a counter to register operations when the differential member is set independently of the actuator.

"Claim 130. Your petitioner disclaims any construction falling within the language of claim 130 wherein the totalizer operates as a counter to register operations when the differentially movable member is set independently of the actuator.

"Claim 131. Your petitioner disclaims any construction falling within the language of claim 131 wherein the totalizer operates as a counter to register operations when the differentially movable member is set independently of the actuator."

[*Official Gazette November 2, 1926.*]